United States Patent
McKinney et al.

(10) Patent No.: US 10,968,090 B2
(45) Date of Patent: Apr. 6, 2021

(54) MODULAR RIB FOR ELEVATING PLATFORM

(71) Applicant: Altec Industries, Inc., Saint Joseph, MO (US)

(72) Inventors: Ryan J. McKinney, Parkville, MO (US); Kyle E. Hoffmann, Saint Joseph, MO (US)

(73) Assignee: ALTEC INDUSTRIES, INC., Saint Joseph, MO (US)

( * ) Notice: Subject to any disclaimer, the term of this patent is extended or adjusted under 35 U.S.C. 154(b) by 184 days.

(21) Appl. No.: 15/619,193

(22) Filed: Jun. 9, 2017

(65) Prior Publication Data

US 2017/0355580 A1    Dec. 14, 2017

Related U.S. Application Data

(60) Provisional application No. 62/348,542, filed on Jun. 10, 2016.

(51) Int. Cl.
  *B66F 11/04*    (2006.01)
  *E06C 9/02*    (2006.01)
  *F16M 13/02*   (2006.01)

(52) U.S. Cl.
  CPC ............ *B66F 11/044* (2013.01); *B66F 11/04* (2013.01); *E06C 9/02* (2013.01); *F16M 13/02* (2013.01)

(58) Field of Classification Search
  CPC .............................. B66F 11/044; B66F 17/006
  USPC ........... 182/2.1–2.11; 248/201, 213.2, 220.1, 248/300, 907, 311.2
  See application file for complete search history.

(56) References Cited

U.S. PATENT DOCUMENTS

| | | | | |
|---|---|---|---|---|
| 3,005,512 A | * | 10/1961 | Vogan | B66F 11/044 182/2.4 |
| 3,357,719 A | * | 12/1967 | McCrea | B60R 3/007 280/163 |
| 3,399,746 A | * | 9/1968 | Lee | E06C 9/04 182/92 |
| 3,477,679 A | * | 11/1969 | Lovitz | F16B 45/00 248/213.2 |
| 3,561,563 A | | 2/1971 | Harsh | |
| 3,590,950 A | | 7/1971 | Wilson | |
| 3,625,305 A | * | 12/1971 | Mueller | B66F 11/044 182/46 |
| 3,695,390 A | | 10/1972 | Leigh | |
| 3,767,007 A | | 10/1973 | Garnett | |
| 3,809,180 A | | 5/1974 | Grove | |

(Continued)

FOREIGN PATENT DOCUMENTS

CA    3006379 A1    6/2017

*Primary Examiner* — Colleen M Chavchavadze
*Assistant Examiner* — Candace L Bradford
(74) *Attorney, Agent, or Firm* — Neo IP

(57) ABSTRACT

Ribs for an elevating platform, the ribs designed and configured to insert through a slot in the sidewall of the elevating platform. The ribs are composed of T-shaped and/or L-shaped portions. Configurations include a T-shaped rib that inserts through the slot; a combination T-shaped and L-shaped rib wherein the T-shaped component inserts through the slot and the L-shaped component is attached on the exterior of the platform, and a double-L-shaped rib, wherein one of the L-shaped components inserts through the slot and the other L-shaped component is attached to it on the exterior of the platform.

13 Claims, 60 Drawing Sheets

(56) References Cited

U.S. PATENT DOCUMENTS

| | | |
|---|---|---|
| 3,825,095 A | 7/1974 | Clark |
| 3,902,568 A * | 9/1975 | Erickson .............. E04G 5/061 |
| | | 182/92 |
| 3,917,026 A | 11/1975 | Hedges |
| 3,937,340 A | 2/1976 | Grove |
| 4,044,856 A | 8/1977 | Stevenson |
| 4,334,594 A | 6/1982 | Jost |
| 4,450,936 A * | 5/1984 | Strom .................. E06C 9/04 |
| | | 182/92 |
| 4,524,475 A | 6/1985 | Valentino |
| 4,537,281 A | 8/1985 | Endres et al. |
| 4,554,995 A | 11/1985 | Schlack |
| 4,605,098 A | 8/1986 | Leuty |
| 4,620,609 A | 11/1986 | Elsten |
| 4,724,924 A | 2/1988 | Breyer et al. |
| 4,753,447 A | 6/1988 | Hall |
| 4,754,841 A | 7/1988 | Koffski |
| 4,763,755 A | 8/1988 | Murray |
| 4,763,758 A | 8/1988 | Moody |
| 4,785,910 A | 11/1988 | Tonkovich |
| 4,838,381 A * | 6/1989 | Michaud .............. B66F 11/044 |
| | | 182/2.3 |
| 4,883,145 A | 11/1989 | Deltatto |
| 4,911,264 A | 3/1990 | McCafferty |
| 4,917,214 A * | 4/1990 | Mlaker ................ B66F 11/044 |
| | | 182/2.2 |
| 4,947,961 A | 8/1990 | Dudley |
| 5,201,629 A | 4/1993 | Simpson et al. |
| 5,269,393 A | 12/1993 | Luscombe |
| 5,611,410 A | 3/1997 | Baillargeon |
| 5,727,645 A * | 3/1998 | Woodling ............. B66F 11/046 |
| | | 182/2.1 |
| 5,813,486 A * | 9/1998 | Smith ................ A62B 35/0068 |
| | | 182/3 |
| 5,868,218 A | 2/1999 | Lawson |
| 5,944,138 A | 8/1999 | Vollmer et al. |
| 6,076,937 A * | 6/2000 | Wood .................. B25H 3/06 |
| | | 362/154 |
| 6,145,619 A | 11/2000 | Risser |
| 6,269,906 B1 * | 8/2001 | Dockter ................ B60R 3/007 |
| | | 182/92 |
| 6,361,003 B1 * | 3/2002 | Keoun ................ B66F 11/044 |
| | | 248/213.2 |
| 6,457,558 B1 | 10/2002 | Ehnes |
| 6,464,037 B2 | 10/2002 | Baldas et al. |
| 6,470,999 B1 | 10/2002 | Schanzle |
| 6,471,004 B2 | 10/2002 | Stringer et al. |
| 6,484,982 B1 * | 11/2002 | Barry .................. E06C 9/04 |
| | | 182/90 |
| 6,491,272 B1 | 12/2002 | Franks |
| 6,767,023 B1 | 7/2004 | Nicholson |
| 6,823,964 B2 | 11/2004 | Goode |
| 6,957,719 B2 | 10/2005 | Ehnes |
| 7,004,285 B2 | 2/2006 | Bailey |
| 7,168,523 B1 | 1/2007 | Tafoya et al. |
| 7,306,280 B1 | 12/2007 | Kraimer |
| 7,748,496 B2 | 7/2010 | Higgins et al. |
| 8,016,074 B2 | 9/2011 | Black et al. |
| 8,091,907 B1 | 1/2012 | Barnett |
| 8,443,936 B1 | 5/2013 | Raymond |
| 8,550,211 B2 | 10/2013 | Higgins et al. |
| 8,550,212 B2 | 10/2013 | Higgins et al. |
| 8,739,928 B2 | 6/2014 | Schneider |
| 9,120,645 B2 | 9/2015 | Penn et al. |
| 9,492,693 B2 * | 11/2016 | Byrd ................ A62B 35/0068 |
| 9,776,845 B2 * | 10/2017 | Minke ............... A62B 35/0068 |
| 9,782,891 B2 * | 10/2017 | Blake ................... B25H 3/06 |
| 9,851,048 B2 * | 12/2017 | Higgins ............... B66F 17/006 |
| 10,124,999 B2 | 11/2018 | Puszkiewicz et al. |
| 2002/0066620 A1 * | 6/2002 | Lindsey ................ E06C 1/34 |
| | | 182/92 |
| 2002/0074186 A1 | 6/2002 | Baldas et al. |
| 2002/0153462 A1 * | 10/2002 | Donahue .............. B62J 17/04 |
| | | 248/316.8 |
| 2003/0213644 A1 | 11/2003 | Chard et al. |
| 2004/0026172 A1 | 2/2004 | Ehnes |
| 2004/0055817 A1 | 3/2004 | Chard et al. |
| 2004/0129496 A1 | 7/2004 | Clark |
| 2005/0006174 A1 | 1/2005 | Terzini |
| 2006/0027422 A1 | 2/2006 | Zhang |
| 2006/0175127 A1 | 8/2006 | Higgins |
| 2007/0007073 A1 | 1/2007 | Keller |
| 2007/0187184 A1 | 8/2007 | Nasuti et al. |
| 2008/0011542 A1 | 1/2008 | Dunican |
| 2008/0084044 A1 | 4/2008 | Dietelbach |
| 2008/0308350 A1 | 12/2008 | Chard et al. |
| 2009/0045011 A1 | 2/2009 | Niemela et al. |
| 2009/0101435 A1 | 4/2009 | Higgins |
| 2009/0260920 A1 | 10/2009 | Cummings |
| 2010/0012431 A1 | 1/2010 | Ehnes |
| 2010/0133043 A1 | 6/2010 | Black et al. |
| 2010/0193286 A1 | 8/2010 | Higgins et al. |
| 2010/0294592 A1 | 11/2010 | Crook et al. |
| 2012/0241250 A1 * | 9/2012 | Eakin ................. C08G 61/08 |
| | | 182/2.2 |
| 2013/0048425 A1 | 2/2013 | Thompson |
| 2013/0240297 A1 | 9/2013 | Aquino et al. |
| 2013/0256058 A1 | 10/2013 | Borghi |
| 2013/0292203 A1 | 11/2013 | Cummings |
| 2013/0306404 A1 | 11/2013 | Higgins et al. |
| 2013/0313040 A1 | 11/2013 | Cummings et al. |
| 2013/0319792 A1 | 12/2013 | Christian et al. |
| 2014/0138183 A1 * | 5/2014 | Chard ................. B66F 17/006 |
| | | 182/46 |
| 2014/0353082 A1 | 12/2014 | Cummings |
| 2015/0008073 A1 | 1/2015 | Cummings et al. |
| 2015/0027808 A1 | 1/2015 | Baillargeon et al. |
| 2015/0075906 A1 | 3/2015 | Chard |
| 2015/0144426 A1 | 5/2015 | Hao et al. |
| 2016/0075543 A1 | 3/2016 | Lombardo et al. |
| 2016/0137471 A1 | 5/2016 | Dittus et al. |
| 2016/0368738 A1 * | 12/2016 | Minke ................. B66F 11/04 |
| 2018/0126627 A1 * | 5/2018 | McKinney ........... B29C 48/0022 |
| 2018/0362313 A1 | 12/2018 | Bonnefoy et al. |
| 2019/0031480 A1 * | 1/2019 | McKinney ............ B66F 11/044 |
| 2019/0119090 A1 | 4/2019 | Maisonnette et al. |

\* cited by examiner

PRIOR ART
Current (bond to outside)
Alternative (bond to inside)
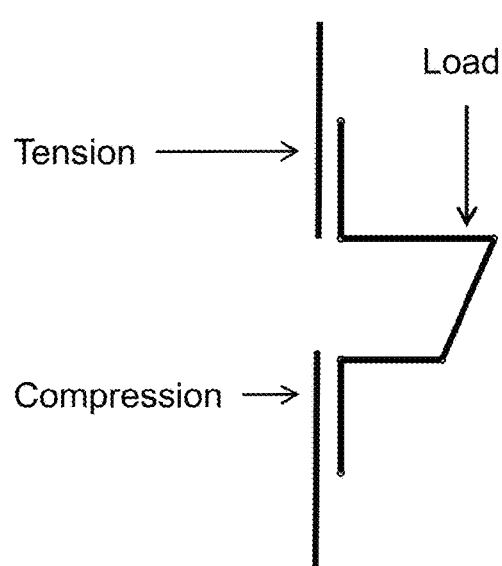
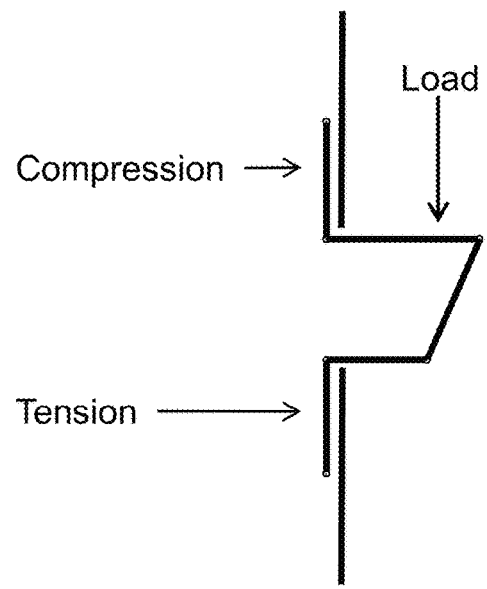
FIG. 3A
FIG. 3B

220

230

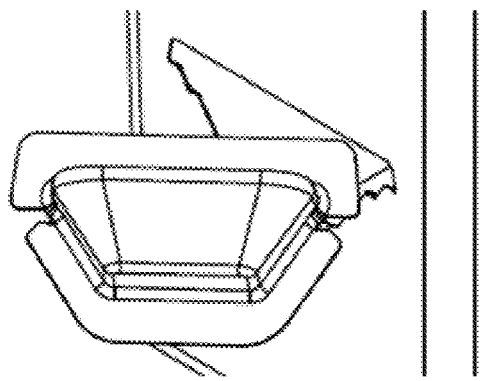
FIG. 9A: Move step into place
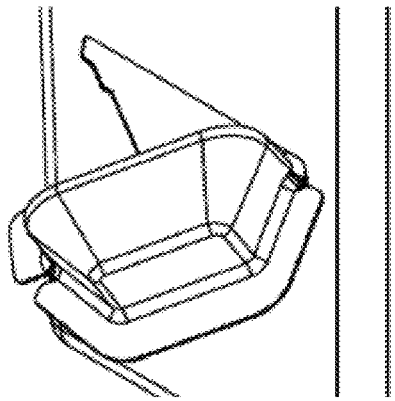
FIG. 9B: Insert step notch into cutout notch
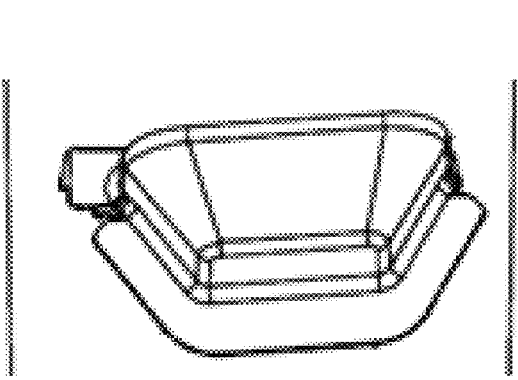
FIG. 9C: Rotate step to insert other half of flange
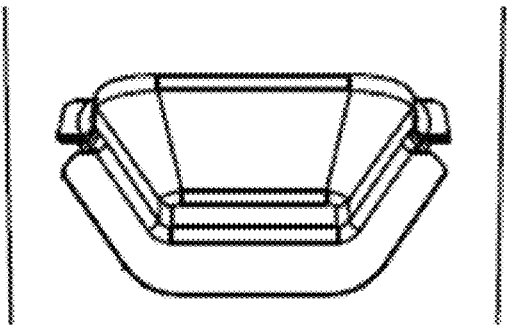
FIG. 9D: Center step in opening
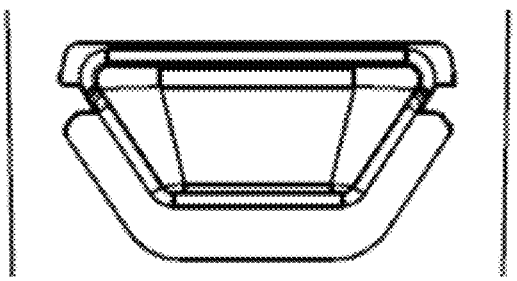
FIG. 9E: Lower step until it locks in place Cut slots in platform Inside flange seals all around opening when bonded Glue on outer rib

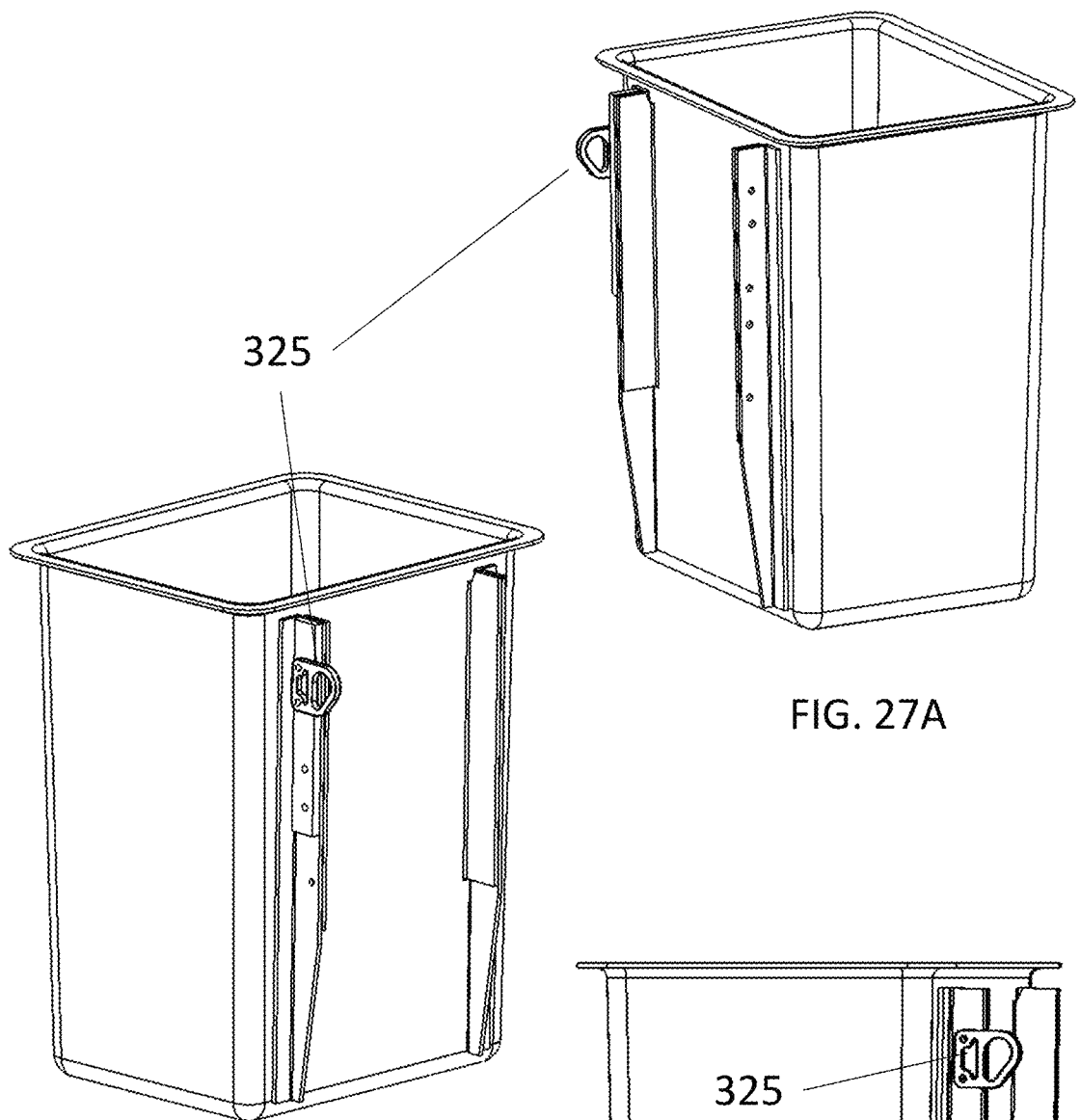
FIG. 27A
FIG. 27B
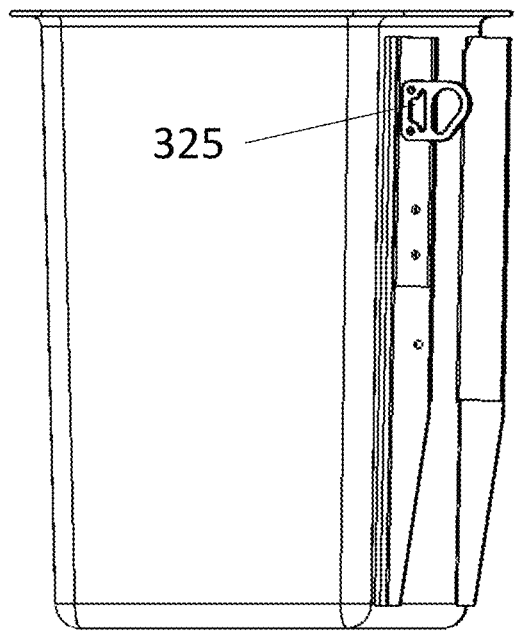
FIG. 27C

325

FIG. 30B
FIG. 30A
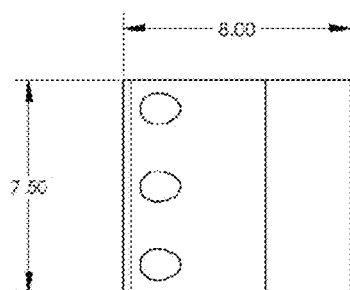
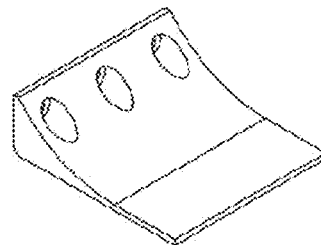
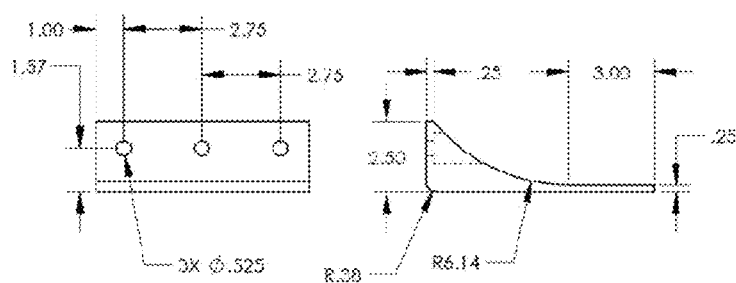
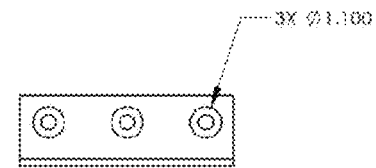
FIG. 30C
FIG. 30D
FIG. 30E Valve mounting plate

420

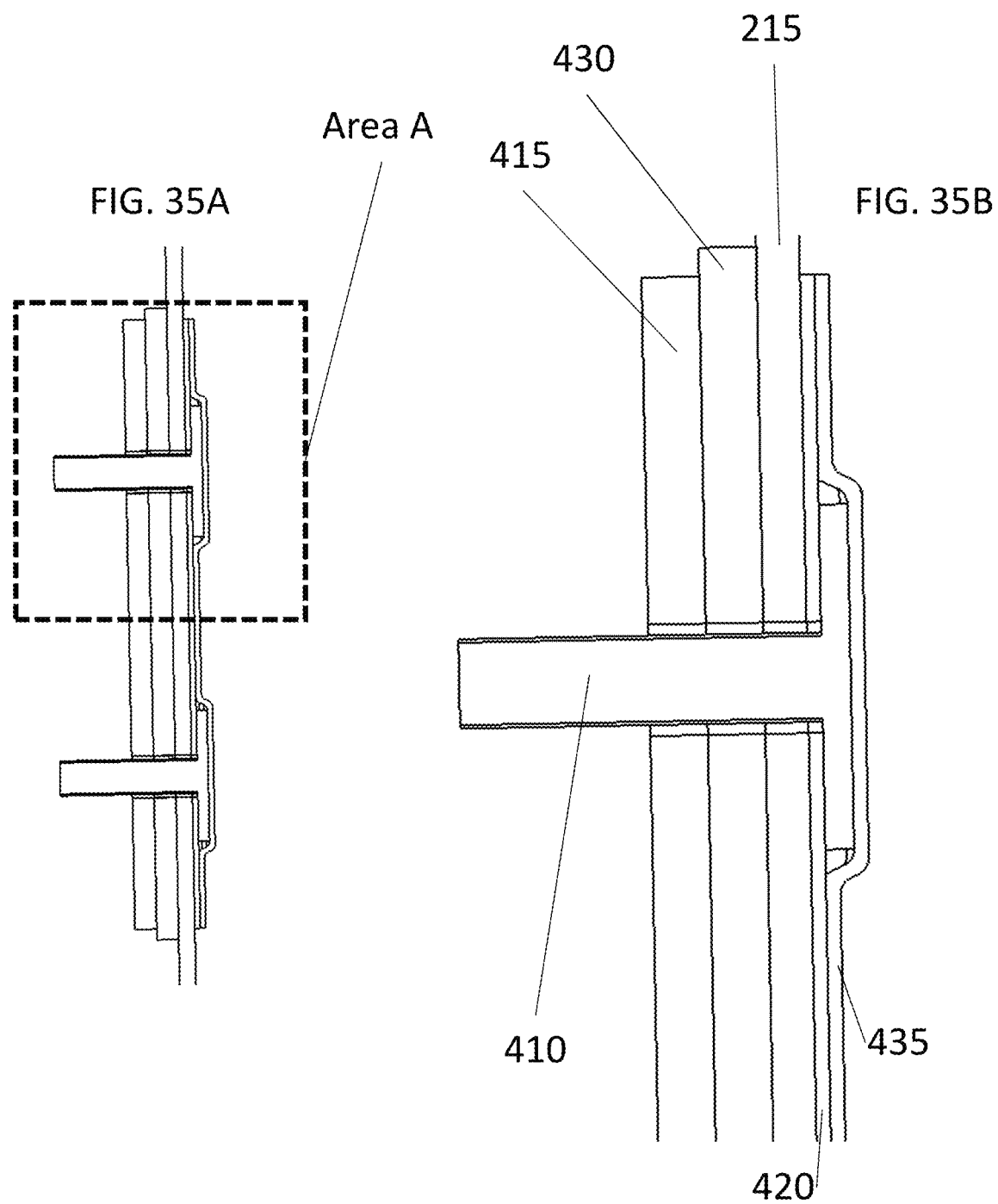

440

415

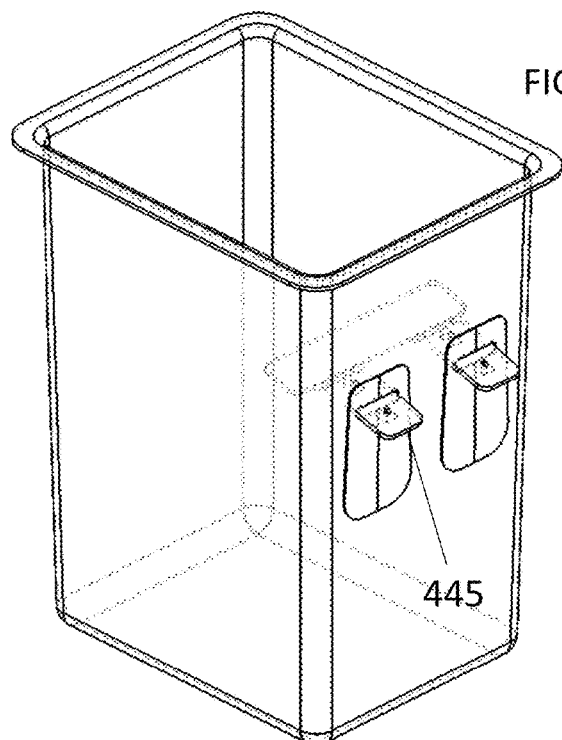
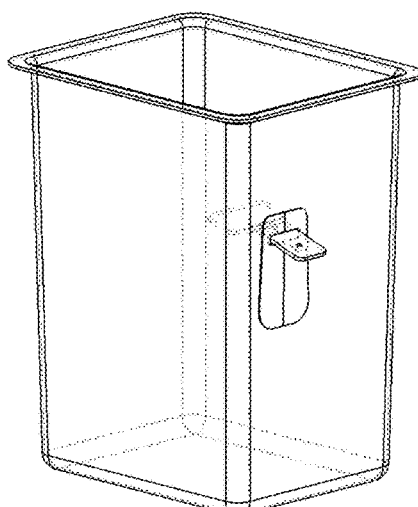
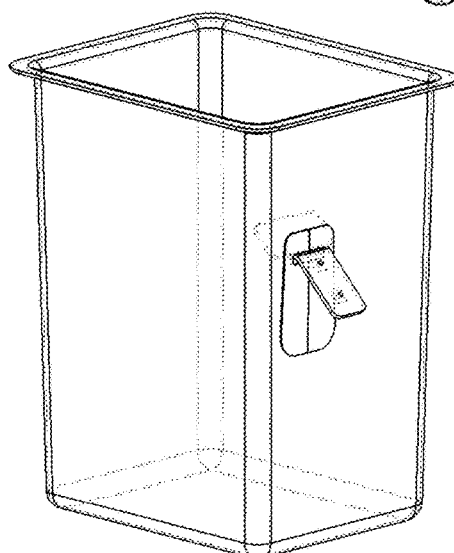
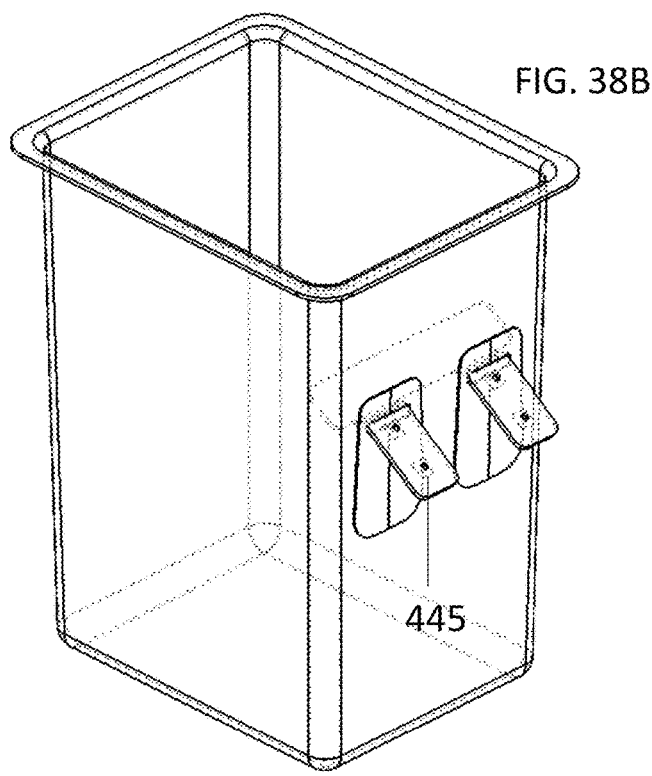
FIG. 38A
FIG. 38C
FIG. 38B
FIG. 38D

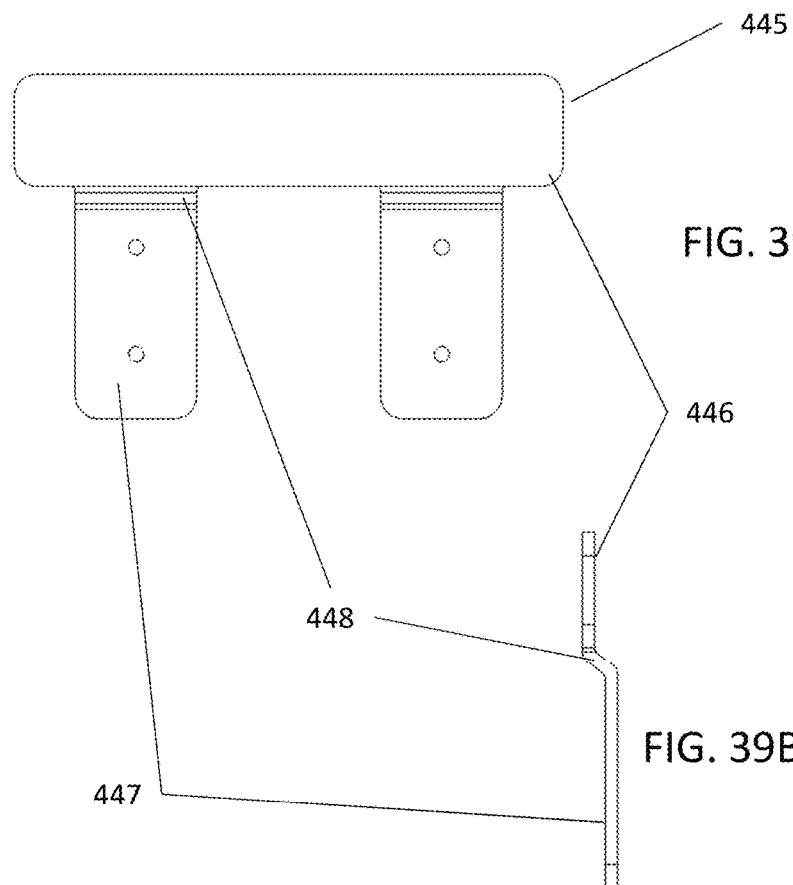
FIG. 39A
FIG. 39B
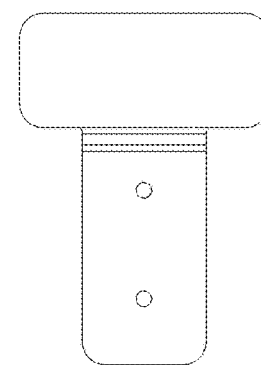
FIG. 39D
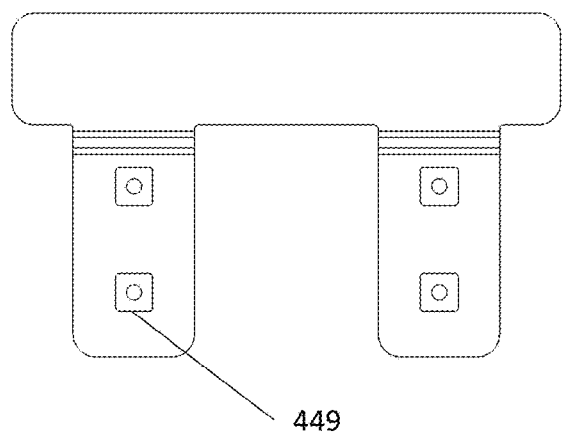
FIG. 39C
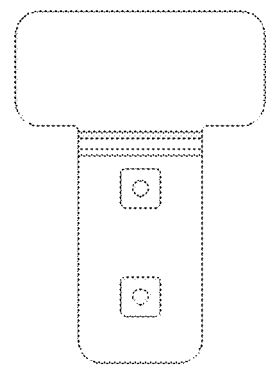
FIG. 39E FIG. 39J
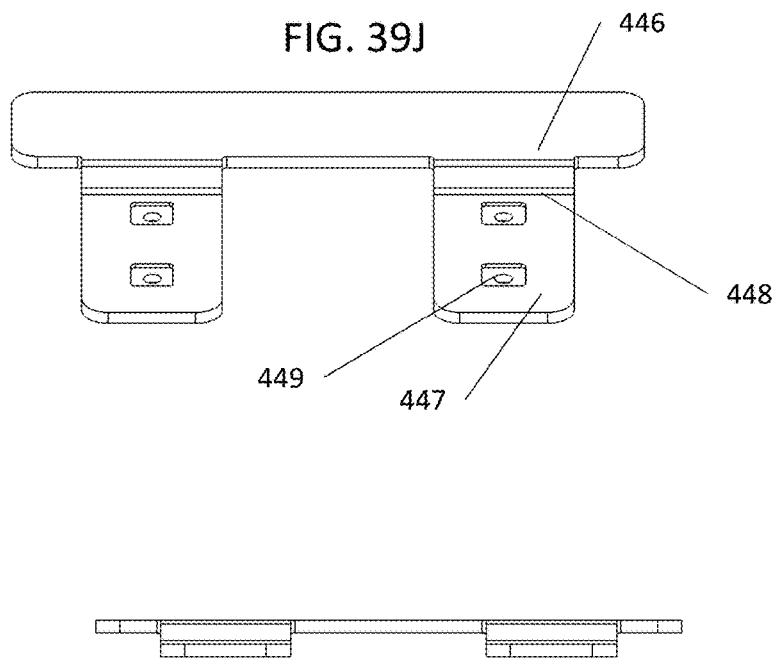
FIG. 39M
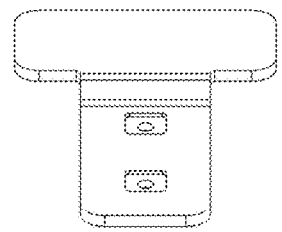
FIG. 39K
FIG. 39N
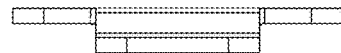
FIG. 39L
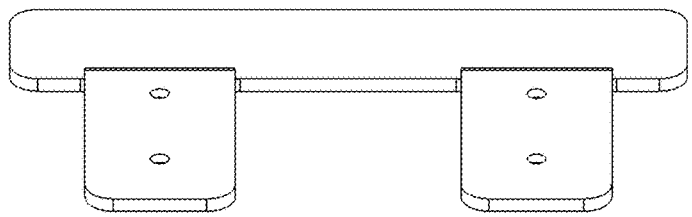
FIG. 39O
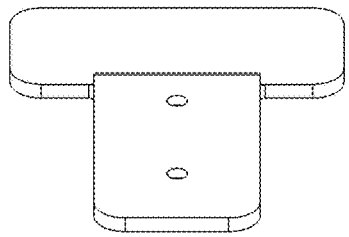

PRIOR ART

410

447

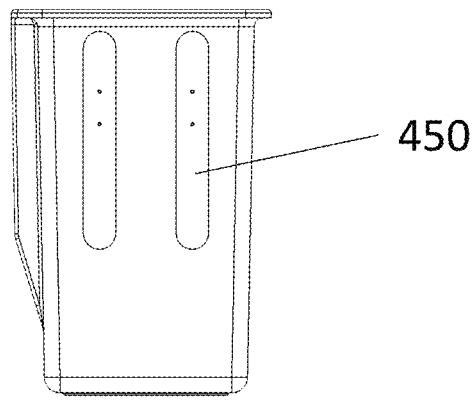
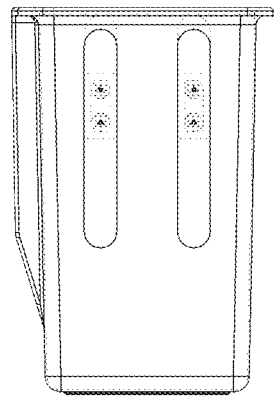
FIG. 44A  FIG. 44B
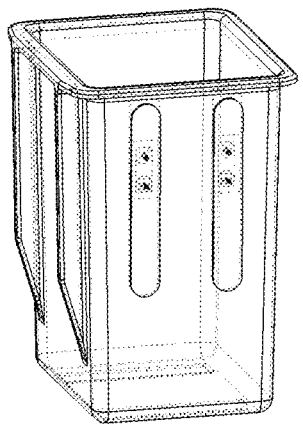
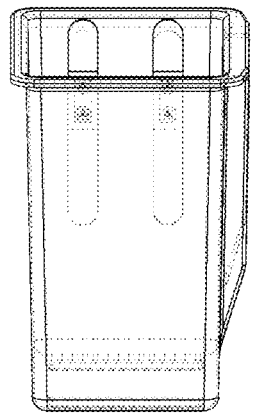
FIG. 44C  FIG. 44D

455

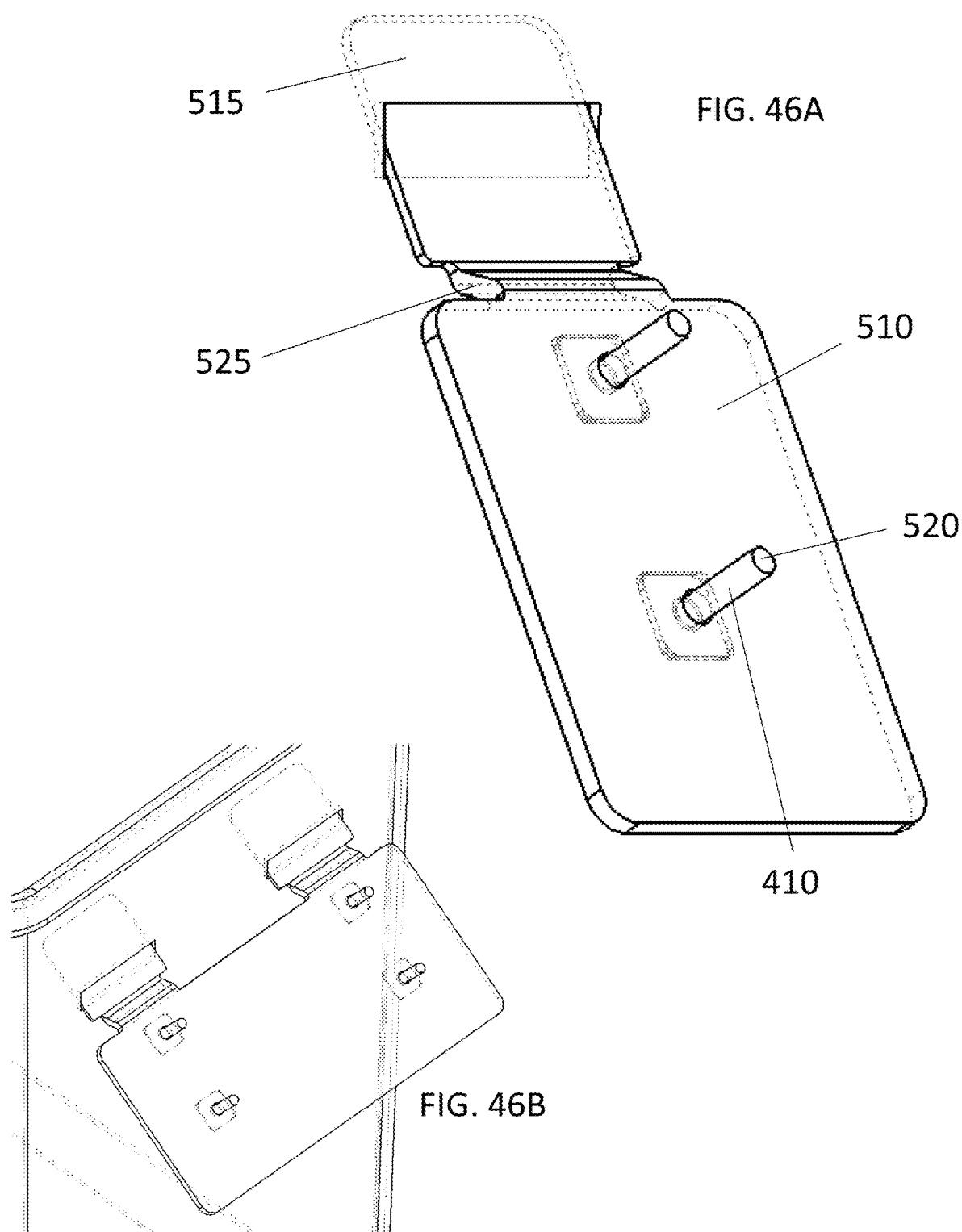

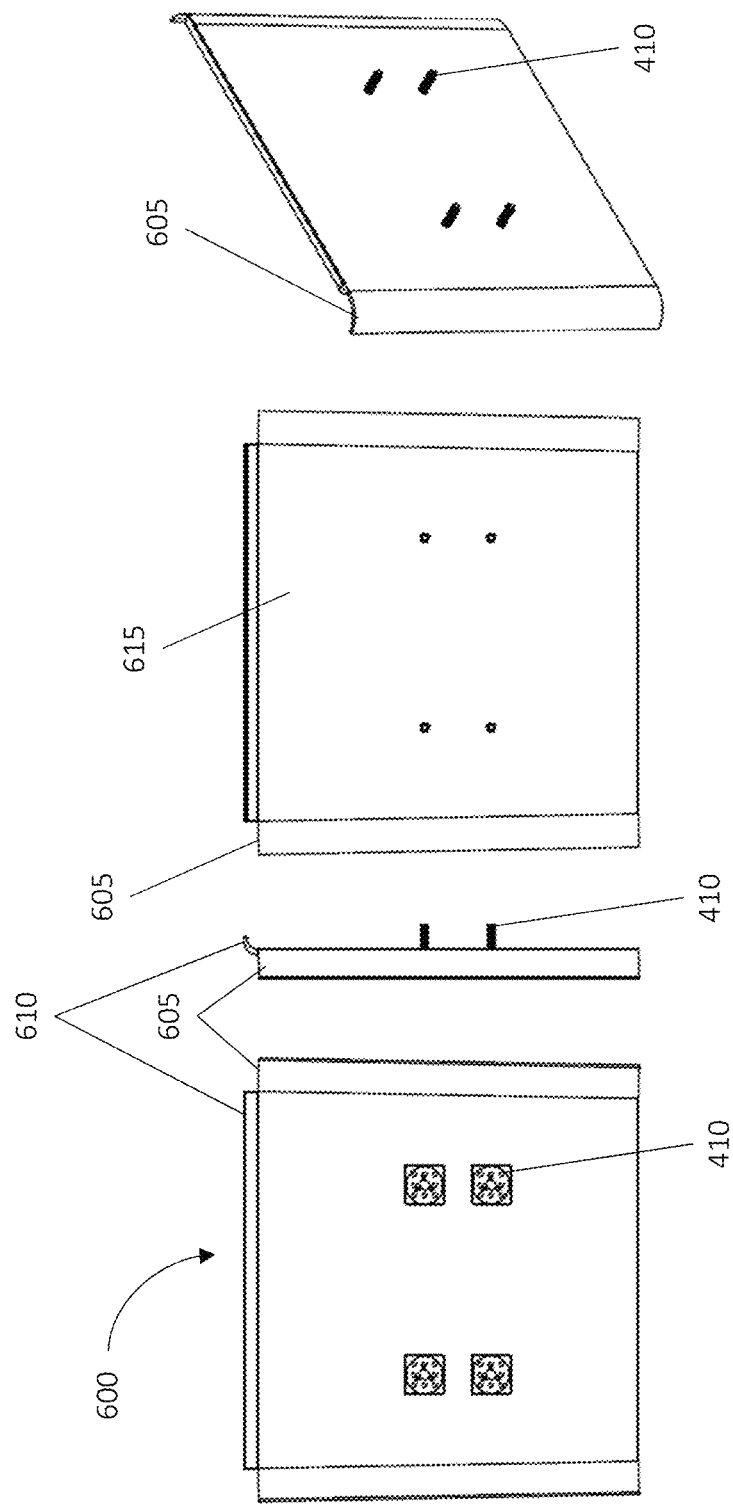

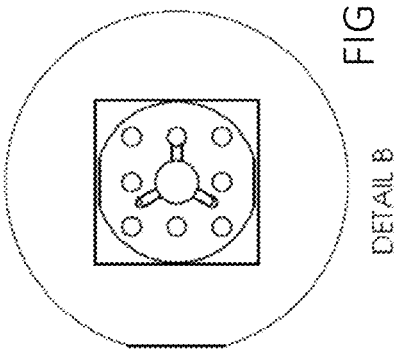
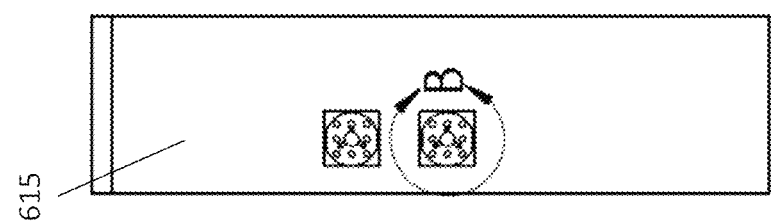
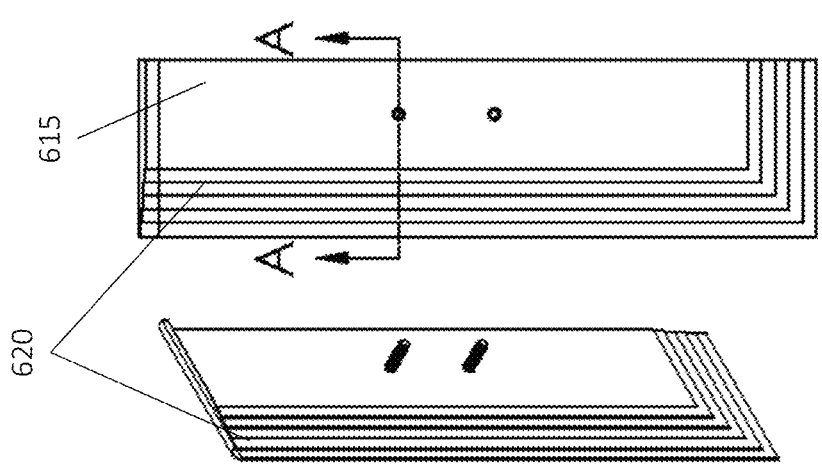
FIG. 53A    FIG. 53B    FIG. 53C    FIG. 53D    FIG. 53E    FIG. 53F

MODULAR RIB FOR ELEVATING PLATFORM

CROSS REFERENCES TO RELATED APPLICATIONS

This application claims priority from one or more U.S. patent applications: it claims priority to and the benefit of U.S. Provisional Patent Application No. 62/348,542, filed Jun. 10, 2016, which is incorporated herein by reference in its entirety.

BACKGROUND OF THE INVENTION

1. Field of the Invention

The present invention relates to elevating platforms, and more specifically to elevating platforms used with utility trucks.

2. Description of the Prior Art

It is generally known in the prior art to provide elevating platform with steps, ribs valve mounting plates and some transparency.

Prior art patent documents include the following:

U.S. Pat. No. 3,917,026, Aerial platform utility enclosure assembly, filed Jan. 16, 1975, allegedly describes a modular three-part preformed lightweight synthetic resin panel assembly comprising an aerial platform utility enclosure designed to be installed upon the outer structural surfaces of the frame members of an otherwise unenclosed aerial platform cage, wherein each respective panel member of the utility enclosure has an outwardly extending integrally molded tool and equipment storage compartment, with one such compartment being further provided with interiorly affixed laterally positioned rib panels to support transparent plastic accessory and parts drawers, wherein also the utility enclosure design is such that, when installed, there is no reduction in the available preexisting aerial platform operator/worker occupancy space.

U.S. Pat. No. 5,611,410, Aerial platform enclosure apparatus, filed Jul. 11, 1995, allegedly describes an aerial platform utility enclosure designed to be easily installed upon an unenclosed aerial platform bucket. The enclosure protects the worker from environmental elements without reducing visibility out of the bucket because a polycarbonate plastic such as LEXAN is used to cover the entire enclosure. Upper and lower structural components of the enclosure are constructed out of a non-conductive material. The lower structural component is firmly attached to the bucket while rotation of the upper structure and the protective cover in a full circle allows the worker to have greater access to his surroundings without having to reposition the bucket.

U.S. Pat. No. 6,470,999, Ergonomic insert for aerial bucket, filed Oct. 2, 2000, allegedly describes an ergonomic insert that reduces the risk of low-back injury to workers in aerial buckets. A combination of an ergonomic insert, an aerial bucket and means for stabilizing said ergonomic insert within the aerial bucket is also disclosed. Finally, a method for using such an ergonomic insert is also disclosed. The ergonomic insert comprises a nominally non-deformable material having foot-receiving surfaces and capable of bearing a worker's weight. Various means for supporting the ergonomic insert in a vertical position are disclosed. The method for using the ergonomic insert comprises placing the ergonomic insert into the aerial bucket from above. The ergonomic insert is positioned between the worker and the work to be performed. The worker then places a foot on one of the foot receiving surfaces prior to or while performing the work.

U.S. Pat. No. 4,883,145, Ergonomic aerial basket, filed Jan. 25, 1989, allegedly describes a simple apparatus that reduces the risk of low-back injury to workers in elevated, partially enclosed, aerial baskets. The preferred embodiment basically comprises a circular well within the floor of the basket that is surrounded by a raised footrest platform adapted to receive on foot of the worker. Between the footrest platform and a base of the well is a cylindrical wall that prohibits forward movement under the footrest platform. In operations, when the worker has to perform manual handling tasks outboard of the basket, one foot is raised out of the well and extended forward onto the footrest platform, while the other foot remains below and behind the raised foot, on the base of the well. The worker has thereby adopted a forward leaning posture instead of a forward bending posture. Consequently, the worker retains the optimal curvature of the spine, while achieving a biomechanical advantage that reduces the work demand on the lower back.

U.S. Pat. No. 4,763,758, Scuff pad with step, filed Dec. 22, 1986, allegedly describes a scuff pad with step which resides interiorly of an aerial lift bucket, or bucket liner if provided, at the bottom thereof and which includes a base portion and an upwardly extending portion extending upwardly of the base portion of a predetermined distance, the base portion has a top surface for being engaged by the shoes of said person upon standing in said bucket or liner to prevent scuffing, and the upwardly extending portion has a top surface providing a step which facilitates climbing out of said bucket or liner by the workman.

U.S. Pat. No. 6,491,272, Step assembly with a removable step for hollow poles and the like, filed Aug. 9, 2001, allegedly describes a pole step assembly with a removable step for hollow poles and the like. The step assembly includes a mounting subassembly with a mounting stud and a mounting plate with inter-engaging flat surfaces that limit relative rotational movement of the mounting stud and mounting plate about the axis of the subassembly. A clamp is provided to limit radial movement of the subassembly relative to the pole. The mounting stud of the subassembly optionally also may include a handle portion that captivates the components of the subassembly and facilitates ease of installation of the subassembly. The handle also may break away and be removed after installation of the subassembly. The step is mounted to the subassembly and may include flat surfaces that inter-engage with further flat surfaces on the mounting plate to limit rotation of the step about its longitudinal axis.

U.S. Pat. No. 3,561,563, Portable post step, filed Aug. 14, 1969, allegedly describes an integral rigid catwalk metal sheet bent along a transverse fold line to provide a post engaging portion and a step portion, the post engaging portion having a laterally inwardly extending notch for engaging the post. The post is engaged by opposing edges of the notch wherein one of the edges is the inner edge portion of the step portion. The step is placed on the post from the side and the weight of the step portion causes the unit to pivot downwardly bringing the opposing edges of the notch into engagement with the post thereby locking it in place. The post engaging portion forms an obtuse angle with the step portion and the step portion is normally positioned in a horizontal plane. A series of vertically spaced apart steps may be placed on a post and extend alternately from the post at angles of 90* to each other. Oppositely facing concave portions may be formed in the opposing edge portions for matingly engaging the rounded peripheral edge of a round post.

U.S. Pat. No. 4,763,755, Bucket release assembly for aerial device, filed Jun. 3, 1987, allegedly describes a release assembly for an aerial device for pivotally releasing a worker's bucket from an upright orientation to a horizontal orientation. The assembly consists of protrusions from the worker's bucket and a rotatable latch plate for selectively engaging and disengaging the protrusions.

U.S. Pat. No. 5,722,505, Man platform for an aerial boom, filed Jun. 8, 1995, allegedly describes a man-lifting platform for mounting on an aerial boom comprising a frame adapted to be pivotally connected to the distal end of the aerial boom. The frame has a pair of sleeves on opposite sides thereof and a pair of rods in the sleeves. The rods are secured to the man-lifting platform and generally parallel fashion. A power cylinder is connected between the frame and the man-lifting platform whereby the man-lifting platform may be moved the length of the rods by actuation of the cylinder.

U.S. Pat. No. 5,944,138, Leveling system for aerial platforms, filed Sep. 3, 1997, allegedly describes a system for leveling a personnel carrying platform mounted on the end of an elongated vehicle mounted boom. A pendulum controlled hydraulic valve controls the application of fluid pressure to a pair of cylinders equipped on their ends with a series of links extending along a drum connected to the platform mounting pin. When the platform deviates from a level position, one of the cylinders is retracted to turn the platform mounting pin in a direction to correct the deviation. An interlock valve disables the platform leveling system unless the boom is being moved. A manual override valve allows the platform to be tilted for storage or other reasons.

U.S. Pat. No. 8,550,211, Aerial work assembly using composite materials, filed Sep. 23, 2008, allegedly describes an aerial work assembly including components having composite materials including a fabric-reinforced resin for providing electrically non-conductive assembly, by insulating and/or isolating conductive components.

U.S. Pat. No. 8,550,212, Aerial work assembly using composite materials, filed Apr. 16, 2010, allegedly describes an aerial work platform assembly, comprising a platform shaft retaining assembly; a mounting bracket connected to the platform shaft retaining assembly; and a platform connected to the mounting bracket; wherein the platform shaft retaining assembly, mounting bracket, and platform are constructed from the same or differing composite materials comprising a fabric-reinforced resin. Optionally, the fabric-reinforced resin includes a preform fabric having a conformable three-dimensional weave, and the resin is a dielectric resin selected from either epoxy, epoxy vinyl ester, vinyl ester, polyester, or phenolic.

U.S. Pat. No. 4,334,594, Aerial device, filed Sep. 27, 1979, allegedly describes an articulated aerial device which includes a workman's basket suspended from a movable beam. The basket is attached to the movable beam by an attaching means which selectively permits the basket to rotate for permitting easy access to an injured workman therein.

US Publication 20090101435, Aerial work assembly using composite materials, filed Sep. 23, 2008, allegedly describes an aerial work assembly including components having composite materials including a fabric-reinforced resin for providing electrically non-conductive assembly, by insulating and/or isolating conductive components.

US Publication 20100193286, Aerial Work Assembly Using Composite Materials, filed Apr. 16, 2010, allegedly describes an aerial work platform assembly, comprising a platform shaft retaining assembly; a mounting bracket connected to the platform shaft retaining assembly; and a platform connected to the mounting bracket; wherein the platform shaft retaining assembly, mounting bracket, and platform are constructed from the same or differing composite materials comprising a fabric-reinforced resin. Optionally, the fabric-reinforced resin includes a perform fabric having a conformable three-dimensional weave, and the resin is a dielectric resin selected from either epoxy, epoxy vinyl ester, vinyl ester, polyester, or phenolic.

US Publication 20130306404, Aerial work assembly using composite materials, filed Jul. 24, 2013, allegedly describes an aerial work assembly including components having composite materials including a fabric-reinforced resin for providing electrically non-conductive assembly, by insulating and/or isolating conductive components.

US Publication 20150075906, System for restraining a worker at a utility platform of an aerial device, filed Nov. 25, 2014, allegedly describes a restraint system for restraining a worker to a platform of an aerial device comprises a restraint liner and a platform strap. The restraint liner includes four sidewalls, a floor, a lip, an interior anchor, and an exterior anchor. The floor may be coupled to one end of the four sidewalls, while the lip may be coupled to the opposing end of the four sidewalls and may extend therefrom. The interior anchor may be positioned on an interior surface of a first sidewall and operable to couple to a liner strap coupled to a worker. The exterior anchor may be positioned on an exterior surface of the first sidewall. The platform strap may be coupled to the exterior anchor and operable to couple to the platform.

US Publication 20090045011, Self-powered lift apparatus, filed Aug. 8, 2008, allegedly describes a self-powered lift apparatus includes a support base, a hitch member, a mast, a movable lift boom, and a power unit. Optionally, the lift apparatus may also include at least one movable stabilizer or support leg. The hitch member is coupled to the support base and is adapted to be received by a hitch receiver on a vehicle. The hitch receiver on the vehicle may provide any one of a hitch socket, a three-point hitch, or a universal mount on a skid-steer vehicle. The lift apparatus is powerable solely by the power unit mounted at the lift apparatus and is operable to move the movable lift boom to lift a person or another implement, without reliance on any power supplied from the vehicle. Optionally, the lift apparatus is at least partially supported in a cargo bed of the vehicle.

US Publication 20140138183, System for restraining a worker at a utility platform of an aerial device, filed Nov. 20, 2012, allegedly describes a restraint system for restraining a worker to a platform of an aerial device comprising a restraint liner and a platform strap. The restraint liner includes four sidewalls, a floor, a lip, an interior anchor, and an exterior anchor. The floor may be coupled to one end of the four sidewalls, while the lip may be coupled to the opposing end of the four sidewalls and may extend therefrom. The interior anchor may be positioned on an interior surface of a first sidewall and operable to couple to a liner strap coupled to a worker. The exterior anchor may be positioned on an exterior surface of the first sidewall. The platform strap may be coupled to the exterior anchor and operable to couple to the platform.

US Publication 20120241250, Aerial Work Platforms and Aerial Work Platform Assemblies Comprised of Polymerized Cycloolefin Monomers, filed Mar. 26, 2012, allegedly describes an aerial work platform assembly that includes: a) a platform shaft retaining assembly; b) a mounting bracket connected to the platform shaft retaining assembly; and c) a platform connected to the mounting bracket. The platform shaft retaining assembly includes two concentric apertures for installation of a pivot shaft therein; the mounting bracket having an upper gusset member and a center gusset member that are bonded together and that include horizontal portions to which the pivot shaft is bonded; upper and lower platform pins; a valve bracket; a platform bracket; and upper platform pins that provide for pivoting on a lower platform pin and tilting down of the platform thereby. At least one of the platform shaft retaining assembly, the mounting bracket, the platform, the upper and lower platform pins, and the valve bracket are molded from at least one monomer having at least one norbornene functionality, such as polydicyclopentadiene.

US Publication 20060175127, Aerial work platform assembly using composite materials, filed Feb. 10, 2005, allegedly describes an aerial work platform assembly, comprising a platform shaft retaining assembly; a mounting bracket connected to the platform shaft retaining assembly; and a platform connected to the mounting bracket; wherein the platform shaft retaining assembly, mounting bracket, and platform are constructed from the same or differing composite materials comprising a fabric-reinforced resin. Optionally, the fabric-reinforced resin includes a preform fabric having a conformable three-dimensional weave, and the resin is a dielectric resin selected from either epoxy, epoxy vinyl ester, vinyl ester, polyester, or phenolic.

SUMMARY OF THE INVENTION

The present invention further relates to a modular reinforcing rib system for elevating platforms. It is an object of this invention to provide a modular reinforcing rib system for an elevating platform, wherein the rib system has a mechanical interlock with the elevating platform.

Thus, in one embodiment, the present invention is directed to a modular reinforcing rib system with a first zone and a second zone, each with a sidewall contact portion; the sidewall contact portion of the first rib zone is positioned inside of the elevating platform whereas the sidewall contact portion of the second rib zone is positioned outside the platform. The first rib zone extends through the at least one sidewall cutout in the platform sidewall and joins with the second rib zone on the outside of the platform sidewall. The ribs are composed of T-shaped and/or L-shaped components and designed and configured to insert through a slot in the sidewall of an elevating platform. Configurations include a T-shaped rib, a combination T-shaped and L-shaped rib, and a double-L-shaped rib.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 3A is a side view of a prior art platform step design. FIG. 3B is a side view of another prior art platform step.

FIGS. 9A-E provide various perspective views of a method for assembling a step in the sidewall according to the present invention. FIG. 9A shows the step being moved into place in the cutout. FIG. 9B shows the step notch being inserted into the cutout notch. FIG. 9C shows the step being rotated to insert the other half of the flange. FIG. 9D shows the step being centered in the cutout. FIG. 9E shows the step lowered into place to lock into the cutout.

FIG. 11B is a bottom-front perspective view of the rib. FIG. 11C is a front view. FIG. 11D is a rear perspective view.

FIG. 12A shows a double-L design formed from two individual L-shaped portions. FIG. 12B shows a pultruded double L design with a stem that is double the thickness of the arms. FIG. 12C shows another pultruded double L design with a stem that is the same thickness as the arms. FIG. 12D is a cutaway portion of a cross-section view of a double-L design installed in a platform.

FIG. 14A shows a front perspective view of a first rib. FIG. 14B shows a front perspective view of a second rib that is paired with the first rib. FIG. 14C shows the rib in a transparent platform; the rib on the right is partially installed and the rib on the left is fully installed.

FIG. 17A is an exterior perspective view of a platform with one rib installed in the platform. FIG. 17B is the view of FIG. 17A with a semi-transparent platform.

FIG. 17C is an exterior side view of a pair of ribs installed in the platform. FIG. 17D is the view of FIG. 17C with a semi-transparent platform. FIG. 17E is an exterior perspective view of a pair of ribs installed in the platform. FIG. 17F is the view of FIG. 17E with a semi-transparent platform. FIG. 17G is a top perspective view of the platform showing an interior of a pair of ribs installed. FIG. 17H is the view of FIG. 17G with a semi-transparent platform. FIG. 17I is an exterior perspective view of a platform with two different types of ribs.

FIGS. 27A-C are perspective views of the rib of FIGS. 25-26 with a lanyard bracket attached. FIG. 27A is a front perspective view of the rib of FIGS. 25-26 installed in a platform with a lanyard bracket attached. FIG. 27B is an opposite front perspective view FIG. 27A. FIG. 27C is a side perspective view of FIG. 27A.

FIG. 28A is a front perspective view of the rib of FIGS. 25-26 installed in a platform with a lanyard bracket attached. FIG. 28B is a partial top perspective view of the rib of FIGS. 25-26 installed in a platform with a lanyard bracket attached.

FIGS. 30A-E show different views of the lanyard bracket support of FIG. 29. FIG. 30A is a bottom front perspective view. FIG. 30B is a left side view. FIG. 30C is a rear view. FIG. 30D is a bottom view. FIG. 30E is front view.

FIG. 32A is a front view. FIG. 32B is a front perspective view. FIG. 32C is a bottom front perspective view.

FIG. 35A is a side view of a mounting plate according to the present invention.

FIG. 35B is a magnified view of area A of FIG. 35A.

FIGS. 38A and B are perspective views of the installation of a double mounting plate according to the present invention. FIG. 38A is shows the double mounting plate partially inserted in a semi-transparent platform. FIG. 38B shows the double mounting plate fully inserted.

FIGS. 38C and D are perspective views of the installation of a single mounting plate according to the present invention. FIG. 38C is shows the single mounting plate partially inserted in a semi-transparent platform. FIG. 38D shows the single mounting plate fully inserted.

FIG. 39A is a front view of the plate of FIGS. 38A and B.
FIG. 39B is a side view of the plate of FIGS. 38A and B.
FIG. 39C is a rear view of the plate of FIGS. 38A and B.
FIG. 39D is a front view of the plate of FIGS. 38C and D.
FIG. 39E is a rear view of the plate of FIGS. 38C and D.
FIG. 39J is a rear bottom perspective view of the plate of FIGS. 38A and B.
FIG. 39K is a bottom view of the plate of FIGS. 38A and B.
FIG. 39L is a front bottom perspective view of the plate of FIGS. 38A and B.
FIG. 39M is a rear bottom perspective view of the plate of FIGS. 38C and D.
FIG. 39N is a bottom view of the plate of FIGS. 38C and D.
FIG. 39O is a front bottom perspective view of the plate of FIGS. 38C and D.

FIG. 41A is a top perspective view. FIG. 41B is a side view. FIG. 41C is a bottom perspective view.

FIGS. 44A-K are various views of a vertically elongated rectangular mounting plate system installed in a platform according to the present invention. FIG. 44A is a front view of the plate installed in a platform. FIG. 44B is a front view of the plate installed in a semi-transparent platform. FIG. 44C is a front perspective view of the plate installed in a semi-transparent platform. FIG. 44D is a rear perspective view of the plate installed in a semi-transparent platform. FIG. 44E is a rear perspective view of the plate installed in a platform. FIG. 44F is a top perspective view of the plate installed in a semi-transparent platform. FIG. 44G is another top perspective view of the plate installed in a platform. FIG. 44H is a side view of the plate installed in a semi-transparent platform. FIG. 44I is a cross-sectional side view of the plate installed in a semi-transparent platform. FIG. 44J is a close-up view of the cross-section side view of FIG. 44I. FIG. 44K is another close-up view of the cross-section side view of FIG. 44I.

FIG. 46A is a perspective exterior view of a single-upper-section mounting plate according to the present invention partially installed in a transparent platform.

FIG. 46B is a perspective exterior view of a double-upper-section mounting plate according to the present invention partially installed in a transparent platform.

FIG. 50A is a rear view of a mounting plate with tabs according to the present invention.

FIG. 50B is a side view of the mounting plate of FIG. 50A.

FIG. 50C is a front view of the mounting plate of FIG. 50A.

FIG. 50D is a perspective view of the mounting plate of FIG. 50A.

FIG. 51A is a rear view. FIG. 51B is a cross-sectional side view. FIG. 51C is a close-up view of the head of a stud inserted in a plate. FIG. 51D is a close-up, cross-sectional side view of a stud and surrounding plate.

FIG. 52A is a front view; FIG. 52B is a side view, FIG. 52C is a top perspective view, and FIG. 52D is a bottom perspective view.

FIGS. 53A-F show another mounting plate embodiment that utilizes tabs. FIG. 53A is a side perspective view. FIG. 53B is a front view. FIG. 53C is a side view. FIG. 53D is a rear view. FIG. 53E is a cross-sectional side view. FIG. 53F is a close-up rear view of a stud inserted in the plate.

FIG. 54A is a front view. FIG. 54B is a side view. FIG. 54C is a bottom perspective view.

DETAILED DESCRIPTION

Clear Platform

Figure 1:
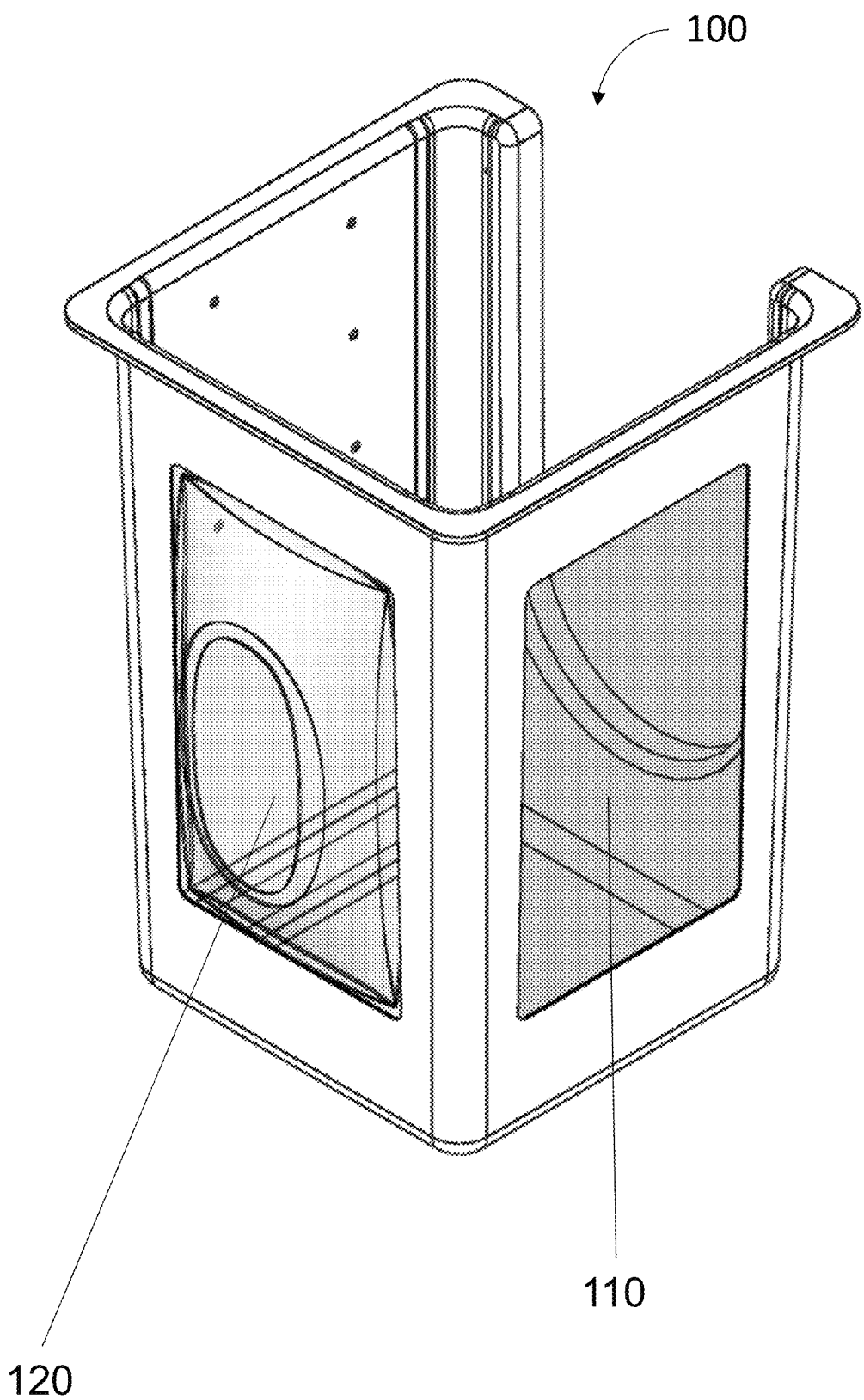
FIG. 1 provides a perspective view of an elevating platform with transparent sidewalls according to the present invention.

Typical prior art platforms are opaque and an operator cannot see through them. If the platform is being used in a tight space or the operator needs to see what is just outside the platform, the clear platform increases the operator's visibility of his surroundings. When a platform is opaque there is an increased probability of the operator striking an object with the platform because of reduced visibility.

Referring now to the drawings in general, the illustrations are for the purpose of describing a preferred embodiment of the invention and are not intended to limit the invention thereto.

The invention is directed to elevating platforms with walls, panels, knee spaces, floors, doors and combinations thereof made of clear or transparent and/or translucent materials to provide high visibility to the operator. The platform is constructed using optically clear or translucent materials, either in strategic locations or having an entirely clear platform, thereby giving the operator enhanced visibility around the platform, resulting in better performance. The present invention also increases operator safety and extends the life of platforms by making it easier for the operator to avoid running the platform into objects.

Figure 2:
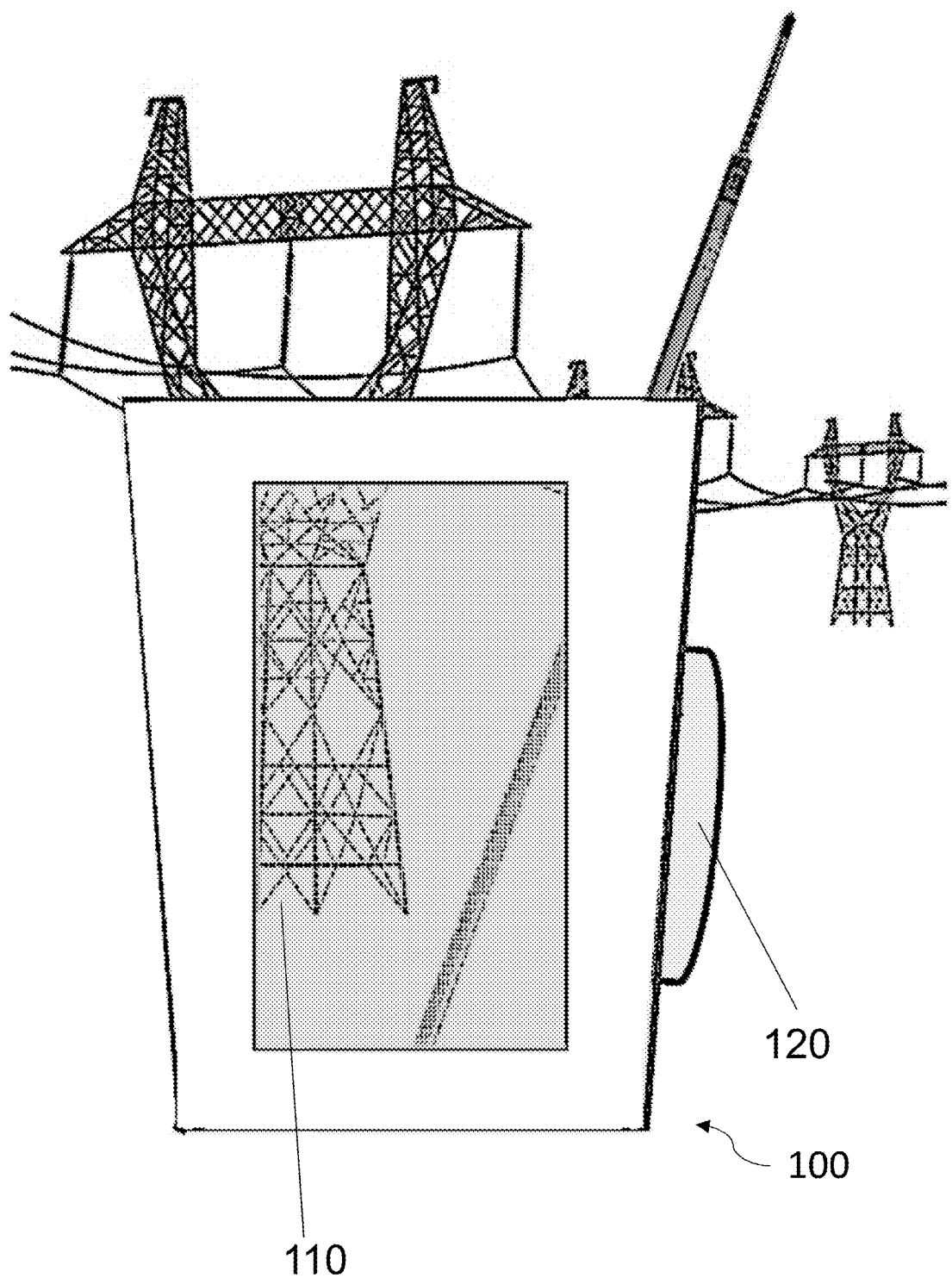
FIG. 2 provides a side view of an elevating platform made of transparent materials according to the present invention.

The present invention provides for different combinations of materials to achieve the enhanced visibility. Some example configurations are as follows: Using a standard, opaque fiberglass platform, generally described as 100 in FIG. 1, sections of one or more walls are cut out and a clear, transparent panel 110 or panels are attached. The clear replacement section is a planar shape or an outwardly bulbous shape 120 which provides space for the knees of a squatting operator. In another configuration, the platform door is constructed of clear material. In yet another configuration, the platform is constructed in the typical fashion, but a resin system with a reflectance and refractive index similar to glass is used, yielding an entirely clear platform with similar image displacement as glass (FIG. 2).

The clear materials are attached to a typical fiberglass platform by adhesive bonding, mechanical fastening, and combinations thereof. If the fiberglass platform is made to be clear, a resin is chosen to match the reflectance and refractive index of the glass, resulting in a composite laminate that is optically clear and with similar image displacement as glass. The clear material has a refractive index of between about 1.3 and 1.7, a reflectance between about 70 and 100, negligible scattering and negligible absorbance.

For translucent designs, the translucent material is preferably between about 30% and about 70% light transmission. More preferably, the % light transmission is about 40-60%. In another embodiment, the % light transmission is about 50%. An example preferred embodiment is white polycarbonate with a % light transmission of between about 30% and about 70%. The make and model of an example preferred white translucent polycarbonate is Sabic Lexan XL102UV.

Alternatively, a fiber reinforced thermoset resin with a clear gel coat may be used to produce an entirely translucent platform structure. Translucent components such as panels, knee spaces, and doors could then be attached to the translucent platform structure. These translucent components may be made from Polycarbonate, Acrylic, Nylon, Polypropylene, fiber reinforced thermosets, and unreinforced thermosets.

Alternatively, polycarbonate, acrylic, nylon, polypropylene, fiber-reinforced thermosets, and unreinforced thermosets may be used to produce an entirely translucent platform.

In another alternative embodiment, a platform structure is made with fiberglass, an optically clear thermoset resin, and a translucent gel coat to allow light transmission but maintain privacy.

Alternatively, a reinforced thermoplastic such as Vectorply EPP-W 1500 or Vectorply EPP-W 2200 may be used to create an entire platform or platform components such as a panel, knee space, or door. The Vectorply products are a fiberglass reinforced polypropylene and they become translucent after they are processed during manufacturing of platforms and platform components.

In a preferred embodiment, the resins are acrylic-modified resins such as POLYLITE 32030-00 and 32030-10, manufactured by REICHHOLD, Research Triangle Park, N.C., USA. In one embodiment, the acrylic-modified resins include polyester resins. Preferably, the acrylic-modified resins are low-viscosity resins, low-reactivity resins, and UV-stabilized resins. Any clear or translucent thermoplastic or thermoset, impact-resistant polymer, such as polycarbonate, can be used without departing from the scope of the invention.

The invention is thus directed to an elevating platform with at least one wall; and further including at least one panel, at least one knee space, and/or at least one door. The at least one wall, the at least one panel, the at least one knee space, and/or the at least one door is formed of a clear or translucent material, thereby providing an elevating platform which provides for greater visibility to an operator. In another embodiment, the elevating platform includes at least one clear or translucent section in the at least one wall, wherein the remainder of the at least one wall is constructed out of a different material than the at least one clear or translucent section. The at least one clear or translucent section is attached to the elevating platform by adhesive bonding and/or mechanical fastening. The at least one clear or translucent section is a planar shape or a knee space formed by an outwardly bulbous shape using clear or translucent material. The knee space provides space for at least one knee of a squatting operator. In another embodiment, the entire elevating platform is constructed using fiberglass and a clear or translucent resin system such that the elevating platform is entirely clear or translucent. The clear resin system has a refractive index between about 1.3 and about 1.7. The translucent resin system has a % light transmission of between about 30% and about 70%. The clear or translucent material is fiber-reinforced thermosets, unreinforced thermosets, fiber-reinforced thermoplastics, and/or unreinforced thermoplastics. The translucent resin system is preferably white polycarbonate.

Platform Step

The present invention is further directed to a step for use in elevating platforms. Steps are located on the sidewall of a platform, and the operator uses them as an aid to get into and out of the platform. Typical prior art steps have a flange all around the step that is bonded to the outside of the platform wall (FIG. 3A). When a load is applied to the step (e.g. an operator stands on it), the bondline on the upper portion of the step flange is in tension (step is trying to pull away from the platform wall). The bondline on the lower portion of the step flange is in compression (trying to push into the platform wall). Failures typically initiate on the portion of the bondline that is in tension, and not on the portion of the bondline in compression.

In an alternative prior art embodiment (FIG. 3B), a cutout is made in the platform wall, and a step is inserted through it from the inside. The flange of the step is bonded to the inside of the platform wall. In this embodiment, the top bondline is in compression and the bottom bondline is in tension (the step is being pushed into the platform).

Both of these embodiments rely on the strength of the adhesive, rather than on the structural strength of the components.

Figure 4:
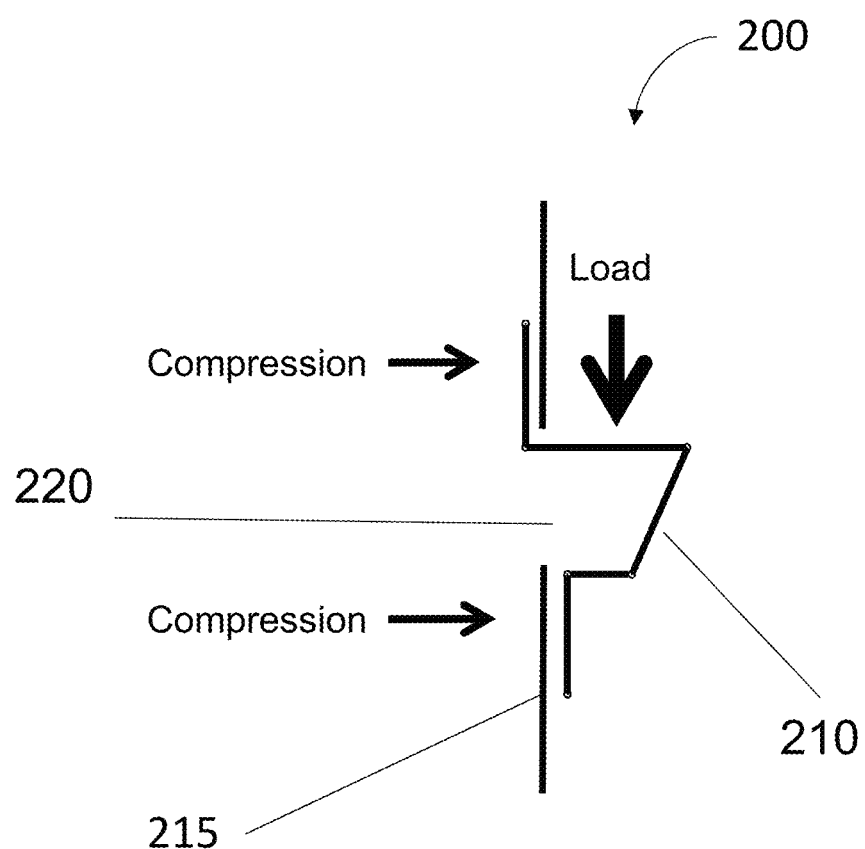
FIG. 4 provides a side view of a platform step design according to the present invention.
Figure 5:
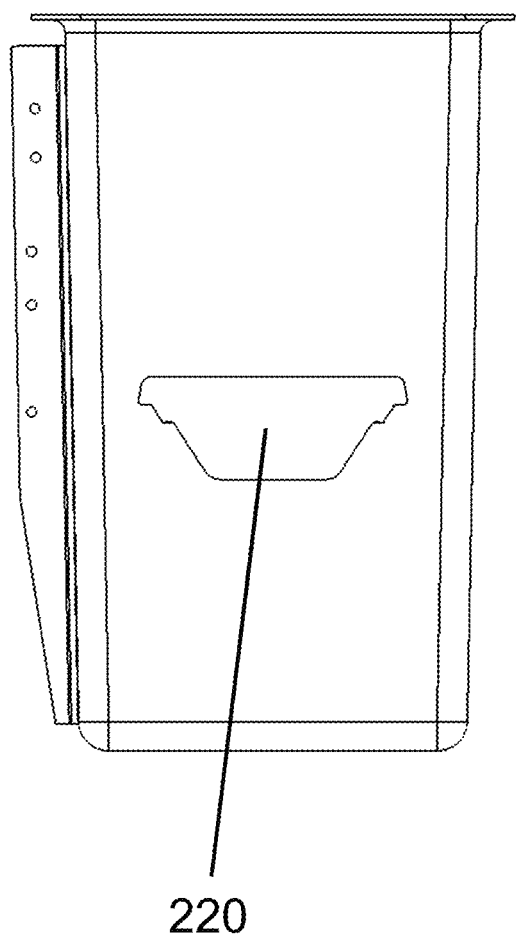
FIG. 5 provides a side view of a platform with a step cut-out according to the present invention.
Figure 6:
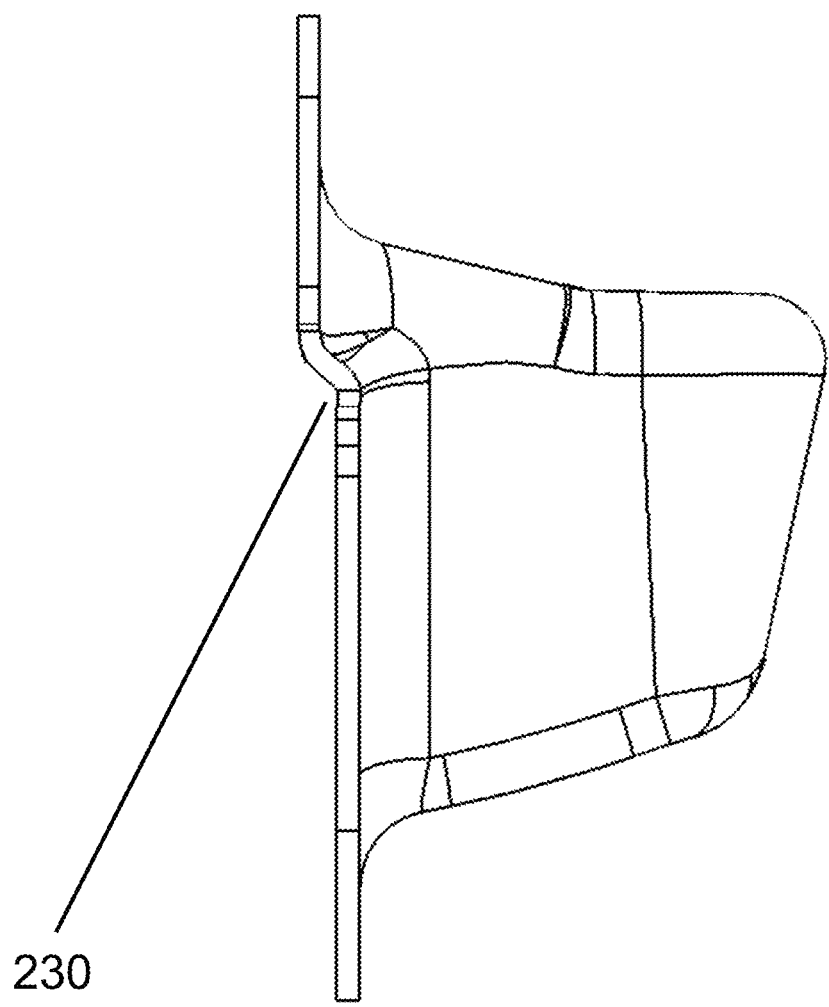
FIG. 6 provides a side view of a step according to the present invention.
Figure 7:
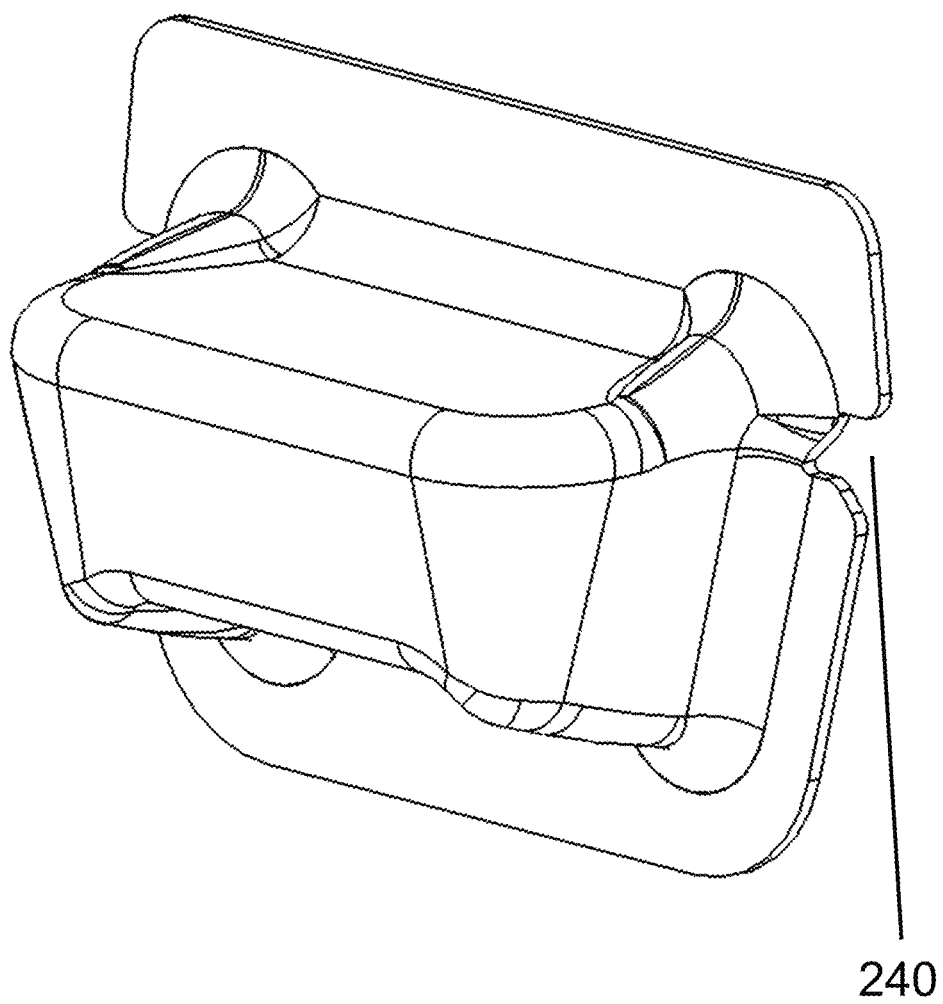
FIG. 7 provides a front perspective view of a step according to the present invention.
Figure 8:
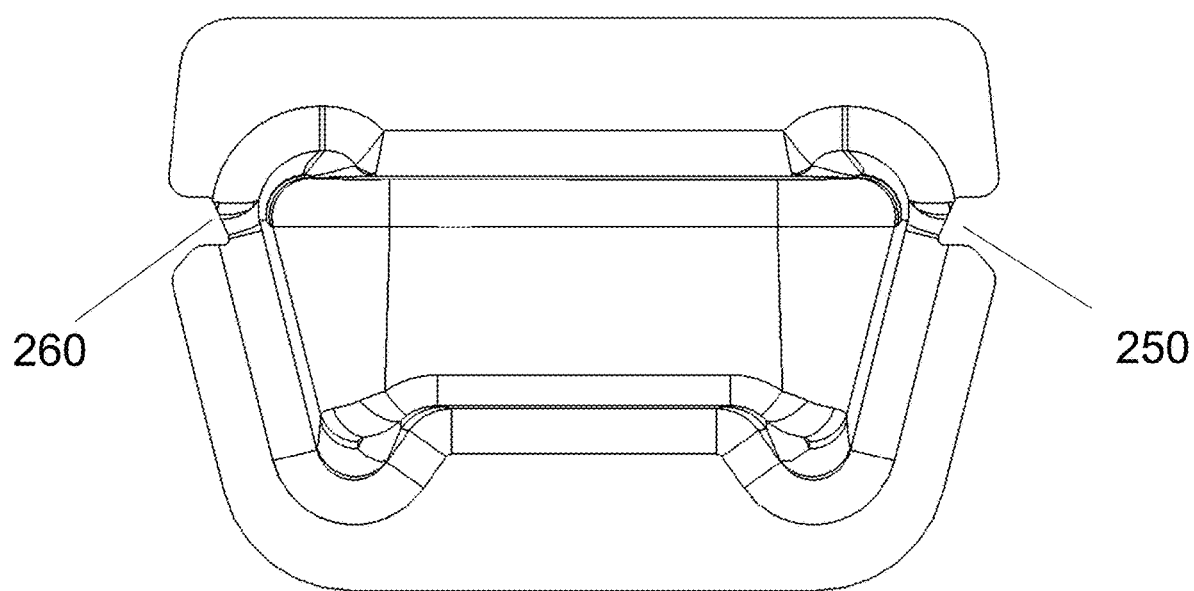
FIG. 8 provides a front view of a step according to the present invention.

The present invention eliminates the weakness of the prior art by having both the top and bottom bondlines in compression. As shown in FIG. 4, the present invention provides for a specifically designed platform cutout 220 in the sidewall 215 of the platform that the step fits into. The system, generally shown as 200 in FIG. 4, includes a step 210 that is specifically designed and configured to lock into the cutout 220 (FIG. 5). The step includes at least one transition 230 (FIG. 6) and at least one notch 240 (FIG. 7). The notch and opposite margin are designed such that when the step is inserted into the cutout with the bottom of the notch touching the sidewall, the opposite top flange 250 (FIG. 8) clears the cutout and is moved into the platform by pivoting the step around the notch. The step transition 230 is designed and configured such that the top and bottom flanges fully contact the inner and outer sidewall, respectively. This contact serves to provide more surface contact area between the step and the sidewall. This design provides that the upper portion of the flange compresses against the inside of the platform wall and the lower portion of the flange compresses against the outside of the platform wall, thus causing both portions to be under compression, rather than tension. Thus, all loads on the step are compressive loads.

Preferably, a second notch 260 is provided on the margin opposite the first notch, such that when the step is centered, a portion of the second side margin extends over the sidewall, covering it. This coverage provides for a seal of the cutout. Some platform assemblies that include a platform step are used with insulating liners and other platform assemblies that include a platform step are not used with insulating liners. According to ANSI A92.2—2015 Section 4.9.5.1, platforms for use with insulating liners shall not have drain holes or access openings. Therefore the platform step cutout must be sealed if the platform is going to be used with an insulating liner. The platform step is fixed to platforms the same way if the platform is or is not going to be used with an insulating liner, therefore the step cutout must always be sealed.

To mount the step in the cutout (FIGS. 9A-E), the step is first moved into place (FIG. 9A). A step notch is inserted into the cutout notch (FIG. 9B). The step is then rotated to completely insert the top flange into the cutout (FIG. 9C). The step is centered in the cutout opening (FIG. 9D). The step is then lowered until it locks into place (FIG. 9E).

Different designs and configurations can be used without departing from the scope of the invention.

In another embodiment, the invention is thus directed to a step for an elevating platform with a sidewall, the step includes a top flange, a bottom flange, and a transition. The top flange and the bottom flange are joined by the transition; and the step is configured to insert into a cutout in the platform sidewall. The bottom flange is configured to contact an outer surface of the platform sidewall when the top flange contacts an inner surface of the sidewall. In one embodiment, the step includes a first step notch in a first side of the transition, configured such that when the first step notch is inserted into a first cutout notch of the cutout in the platform sidewall, the top flange of the platform step is operable to be inserted into the cutout of the sidewall and the platform step is operable to be pivoted via the first step notch in the first cutout notch such that the top flange contacts the inner surface of the sidewall. Another embodiment includes a second step notch in a second side of the transition; the platform step operable to lock into the elevating platform by positioning the top flange such that the top flange contacts the inner surface of the sidewall, positioning the first step notch in the first cutout notch, and positioning the second step notch in a second cutout notch. The top flange is configured such that when the platform step is locked into the platform sidewall and adhered to the elevating platform with adhesive, the top flange of the platform step covers the cutout, thereby sealing it. The platform step is also configured such that when the platform step is locked into the platform sidewall, the top flange of the platform step compresses the inner surface of the sidewall and the bottom flange of the platform step compresses the outer surface of the sidewall, thus providing compressive bonds between the platform step and the sidewall.

In yet another embodiment, the invention is also directed to an elevating platform with a cutout to receive the top flange of the step as previously described. The elevating platform includes a first cutout notch configured such that when the first step notch is inserted into a first cutout notch of the cutout, the top flange of the platform step is operable to be inserted into the cutout of the sidewall and the platform step is operable to be pivoted via the first step notch in the cutout notch such that the top flange contacts an inner surface of the sidewall. The elevating platform and step are operable to lock together by positioning the top flange such that the top flange contacts the inner surface of the sidewall, positioning the step notch in the cutout notch, and positioning a second step notch in a second cutout notch. The top flange and the cutout are configured such that when the platform step is locked into the elevating platform and adhered to the elevating platform with adhesive, the top flange of the platform covers the cutout, thereby sealing it. The platform cutout and platform step are configured such that when the platform step is locked into the elevating platform, the top flange of the platform step compresses the inner surface of the sidewall and the bottom flange of the platform step compresses an outer surface of the sidewall, thus providing compressive bonds between the platform step and the sidewall. In one embodiment, the cutout includes a top cutout portion and a bottom cutout portion, wherein the top cutout portion is wider than the bottom cutout portion; and the platform step includes a first side notch and a second side notch. The top flange and the cutout are configured such that when the first side notch is in contact with the first sidewall at the bottom cutout portion, the top cutout portion is operable to receive the top flange. Then, the first side notch and the second side notch are operable to lock into the bottom cutout portion of the cutout, thereby locking the platform step into the elevating platform. The top flange and the cutout are configured such that when the platform step is locked into the elevating platform and adhered to the elevating platform with adhesive, the top flange of the platform step covers the cutout, thereby sealing it.

Platform Rib

Currently multiple platform sizes and shapes are manufactured via Light Resin Transfer Molding (LRTM) with molded-in ribs or via hand layup with molded-in ribs. There are several disadvantages associated with this construction. The molded-in ribs necessary to provide structural support are thick, which adds unnecessary weight to the platform. Quality issues related to molded-in ribs occur because this design is difficult to manufacture. For example, it is difficult to spray gel coat in a uniform thickness in the mold rib cavity. It is also difficult to consistently place fiberglass in the mold rib cavity. Some molded-in ribs have foam cores, and gel coat cracking can occur more easily in ribs with foam cores when compressive forces are applied such as when platform mounting studs are tightened.

Furthermore, platforms can't be stacked during shipping due to the molded-in ribs. The rib cavities in the platform mold suffer damage faster than other areas of the mold. The molded-in ribs are also required to have a slight draft so the platform can be de-molded. It is preferable if the ribs don't have a draft for mounting purposes.

A minimum of three large objects; plug, master tool, and tool are required to manufacture a platform with a single style of molded-in ribs. For example, the five different styles of 1-man platforms currently offered by Altec, Inc. require eight different plugs, master tools, and tools for a total of 24 large objects. These items take up a lot of storage space. They are also more likely to be neglected because there are so many of them to keep track of. If the 1-man platform was made with pultruded ribs according to the present invention and if it were consolidated to one platform height then it would only require 1 plug, 1 master tool, and 1 tool to produce all of the platform rib styles currently offered.

The present invention provides for a new elevating platform support system that does not use molded-in ribs, but rather uses externally-applied reinforcement ribs that address the problems described previously. The support system is inherently safer than existing external rib designs because it uses a mechanical interlock that prevents the ribs from separating from the platform if the adhesive between the platform and ribs fails. A critical feature of the mechanical interlock is that part of the rib is inside of the platform and part of the rib is outside of the platform, thus locking the rib into the platform.

Figure 10:
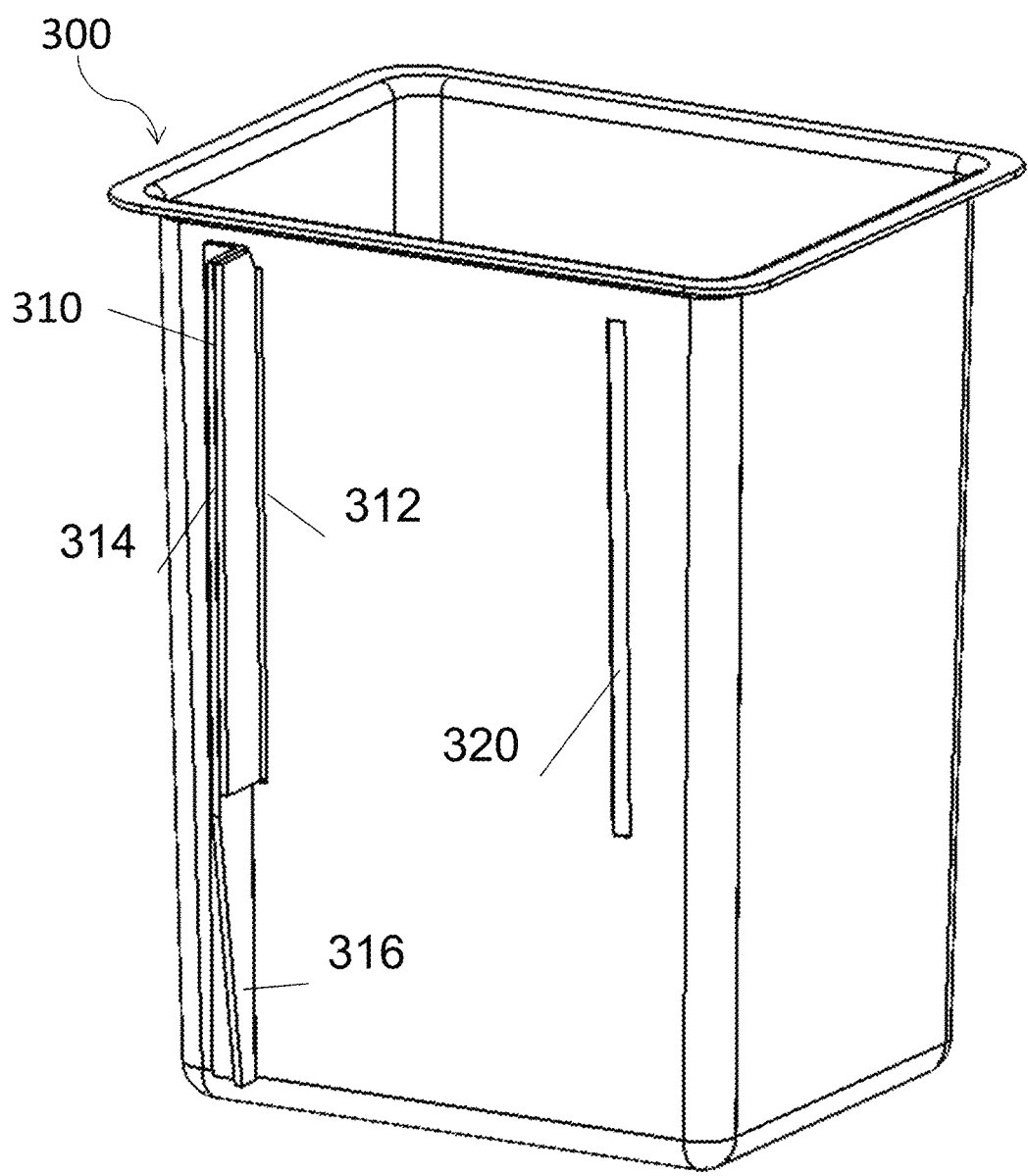
FIG. 10 shows a platform with a reinforcing rib according to the present invention.
Figure 11A:
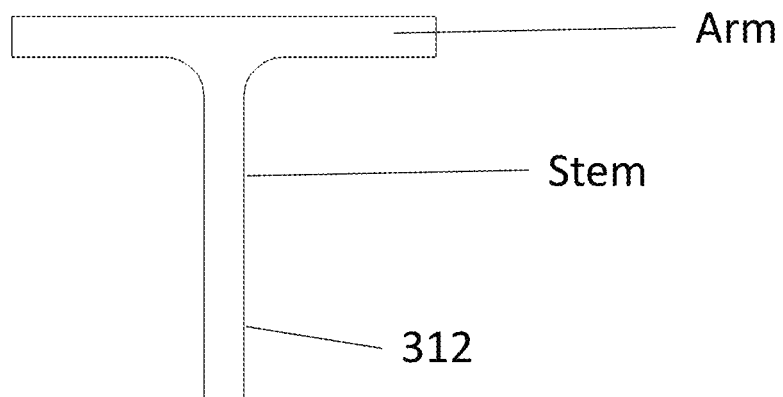
FIG. 11A shows a top-down view of a T-shaped reinforcing rib design according to the present invention.
Figure 11B:
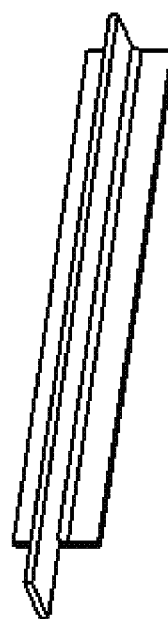
FIGS. 11B-D show various perspective views of the reinforcing rib of FIG. 11A.
Figure 11C:
Figure 11D:
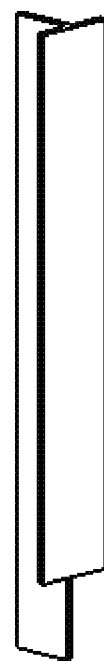

The platform support system, generally described as 300 in FIG. 10, includes reinforcement ribs 310 that are fitted into slots 320 in the platform basket sidewall 215. In a preferred embodiment, the ribs are T-shaped 312 (FIGS. 11A-D). FIG. 11A shows a cross-sectional view of a T-shaped rib according to the present invention.

The example embodiment shown in FIGS. 11A-D was constructed as follows: A 8"×4"×⅜" Series 500 I-beam manufactured by Strongwell (Bristol, Va., USA) was cut in half so two "T" shapes existed. The portion of the rib on the interior of the platform was approximately 26" long. The rib was cut so about 4" near the bottom of the rib would "hook" onto the outside of the platform. Two 0.75" wide slots about 26" long were cut in the platform sidewall and the T-shapes were bonded to the inside of the platform. The rib portion on the exterior of the platform was approximately 30" long.

Figure 12A:
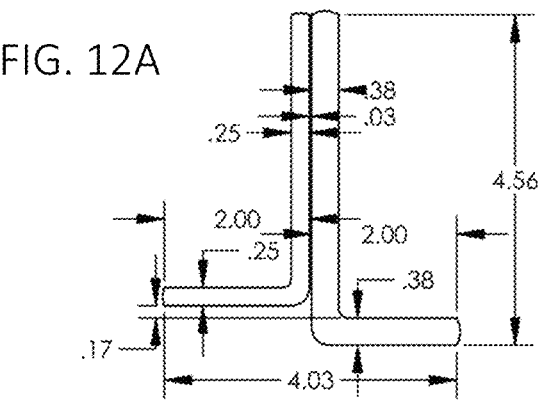
FIGS. 12A-D show diagrams of another reinforcing rib design according to the present invention.
Figure 12B:
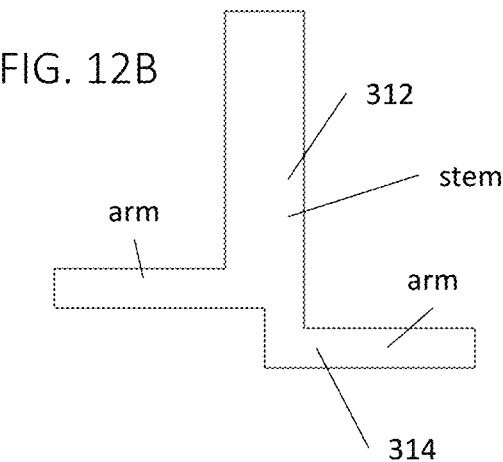
Figure 12C:
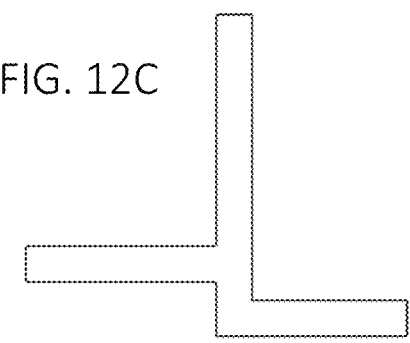
Figure 12D:
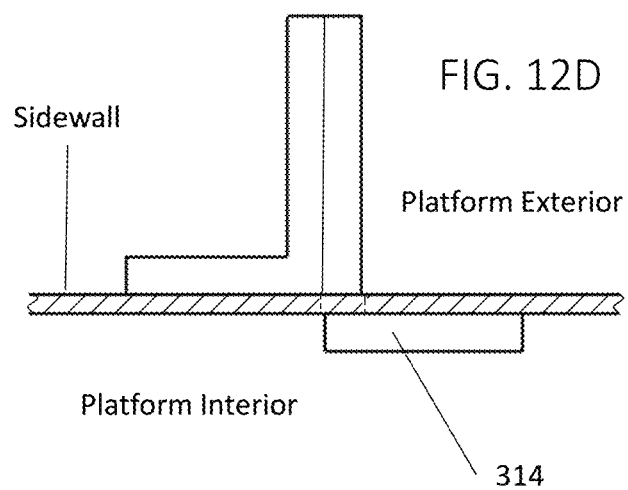
Figure 13A:
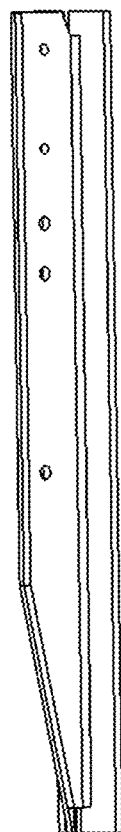
FIG. 13A shows a front side perspective view of the reinforcing rib of FIGS. 12A-D.
Figure 13B:
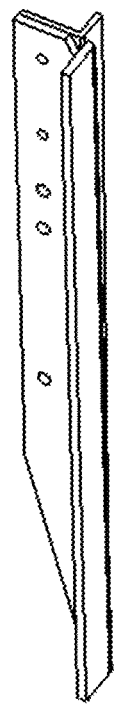
FIG. 13B shows a rear side perspective view of the reinforcing rib of FIG. 12A-D.

In another preferred embodiment, the ribs are an off-set double-L configuration 314, shown in cross-sectional view in FIGS. 12A-D. This latter configuration is formed by bonding two L-shaped ribs 314 (FIG. 12A, units in inches), or by pultrusion or a similar method (FIGS. 12B and C), whereby the thickness of each of the rib sections is varied to give a lighter rib with adequate strength. FIG. 12D shows a cutaway portion of cross section view 12D (from FIG. 17C)

of a double-L rib installed in a platform. Perspective views of the ribs of FIG. 12A-D are shown in FIGS. 13A and B.

Figure 14A:
FIGS. 14A-C show another double-L design rib according to the present invention.
Figure 14B:
Figure 14C:
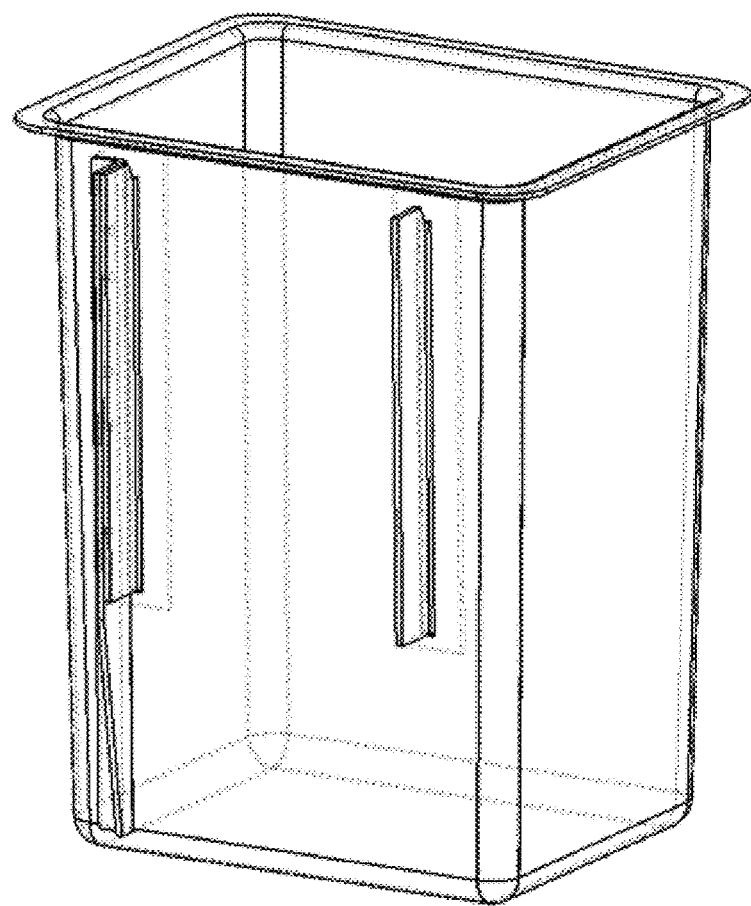

FIGS. 14A-C show another double-L design rib according to the present invention. FIGS. 14A and B show perspective views of the rib only. FIG. 14C shows the rib in a transparent platform; the rib on the right is partially installed and the rib on the left is fully installed. The exterior "L" shape preferably extends between about 1 and about 13 inches beyond the bottom of the slot to provide extra support.

Figure 15:
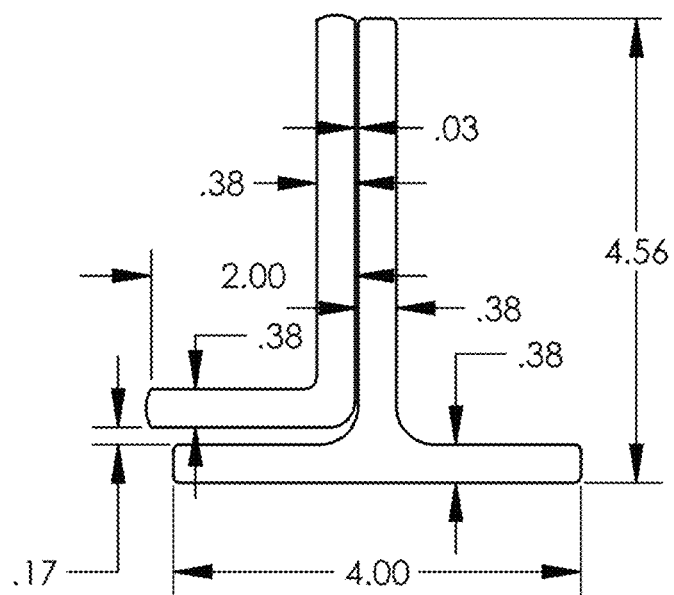
FIG. 15 shows a top-down view of yet another reinforcing rib design according to the present invention.
Figure 16:
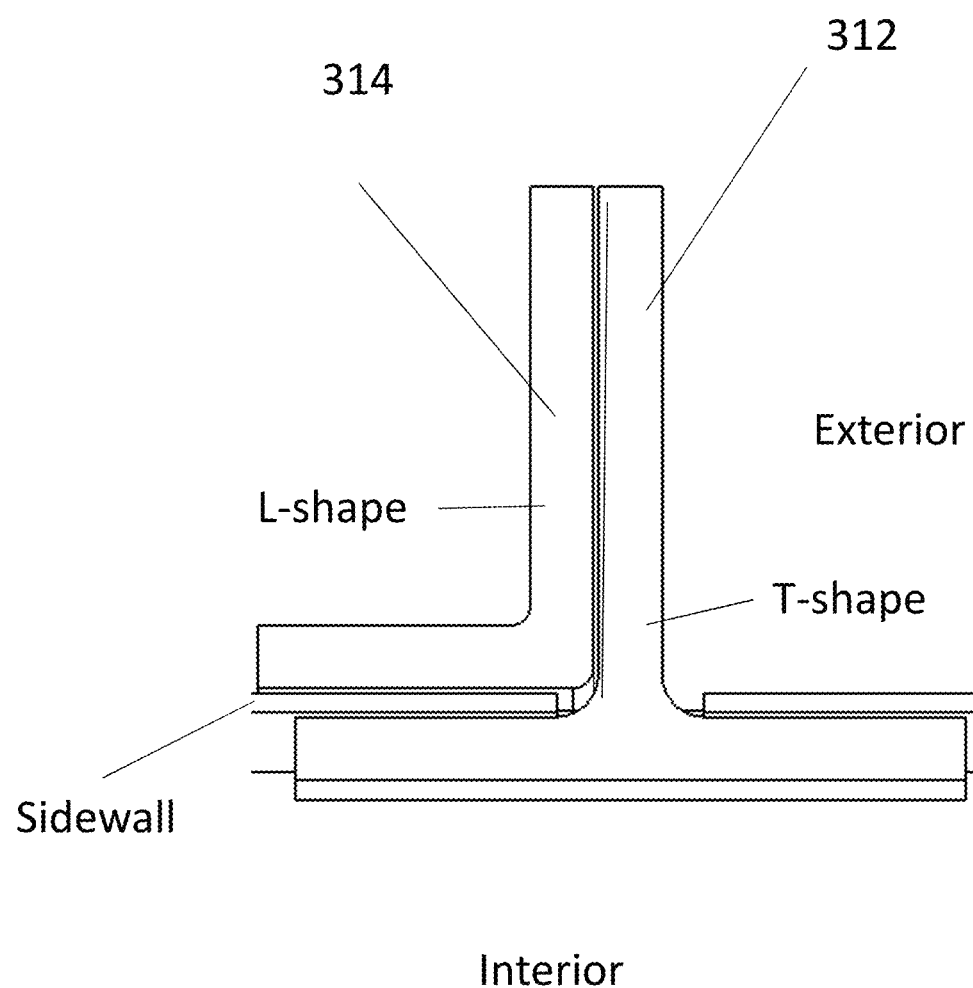
FIG. 16 shows a top-down view of the reinforcing rib design of FIG. 15 installed in a platform sidewall.

In a preferred embodiment (FIGS. 15 and 16), a rib is formed from a T-shaped component 312 combined with an L-shaped component 314. T-shape and L-shape cross-sections are described as each having an arm and a stem. Herein an arm of a letter is defined as a horizontal stroke not connected on one or both ends and a stem is defined as a primary vertical stroke (see http://typedia.com/learn/only/anatomy-of-a-typeface/for a description of typeface anatomy).

The T-shaped component 312 is inserted through a slot in the platform wall from the interior of the platform, such that it is extending outward, whereupon the stem of the L-shaped component 314 is bonded to it on the exterior of the platform.

Figure 17A:
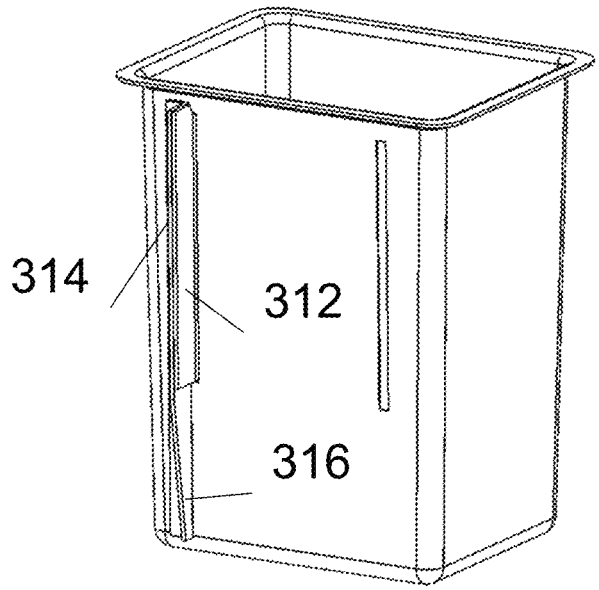
FIGS. 17A-I are various views of reinforcing ribs installed in a platform according to the present invention.
Figure 17:
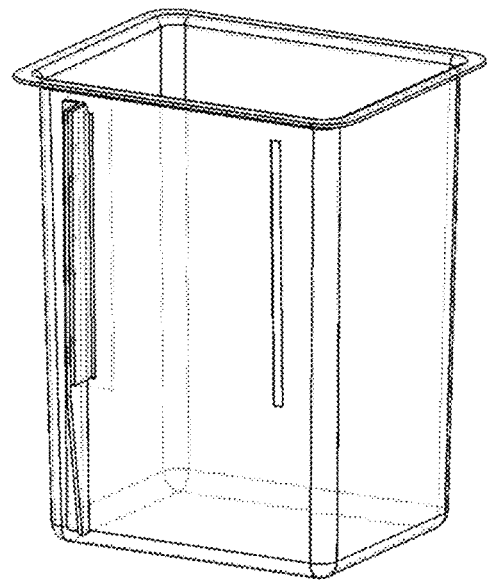
Figure 17C:
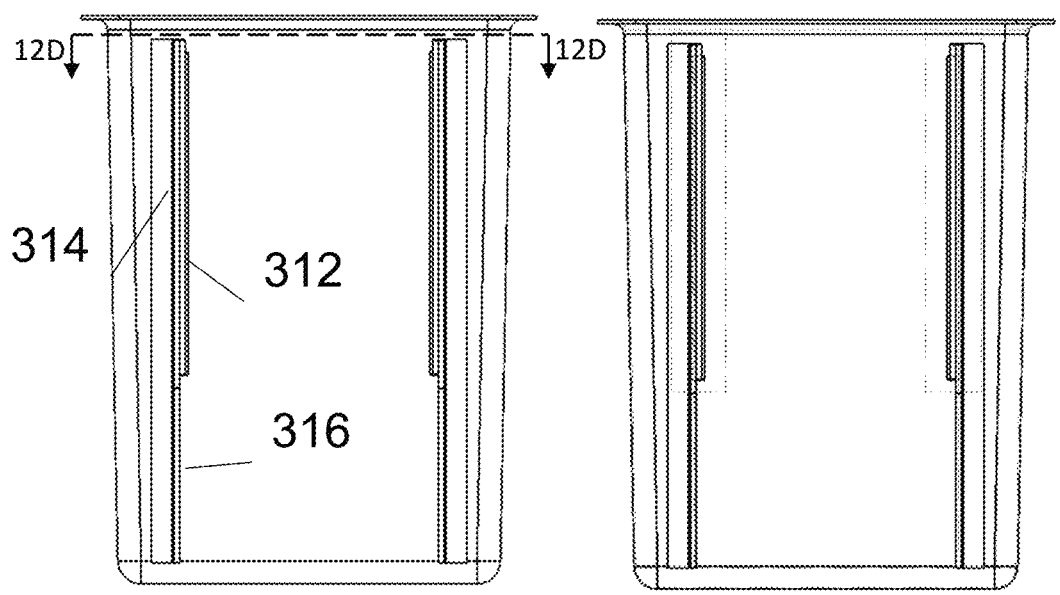
Figure 17D:
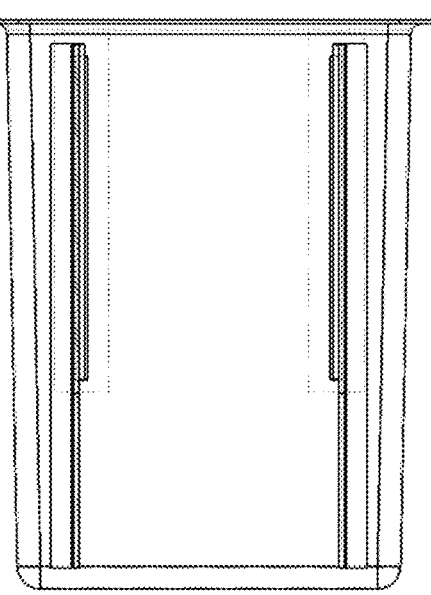
Figure 17E:
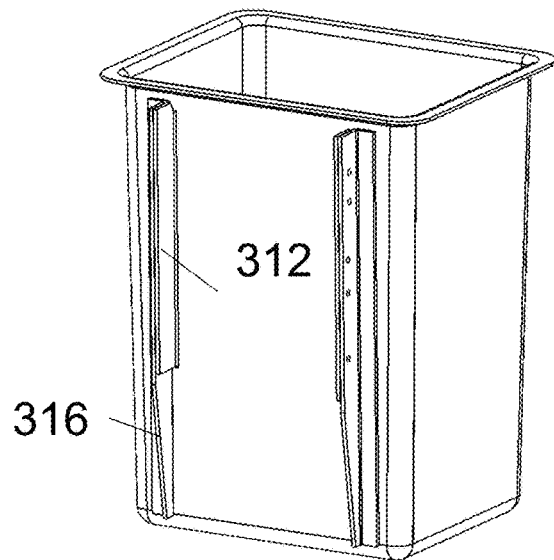
Figure 17F:
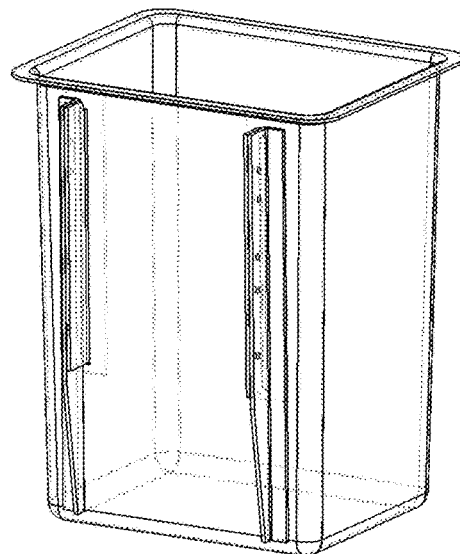
Figure 17G:
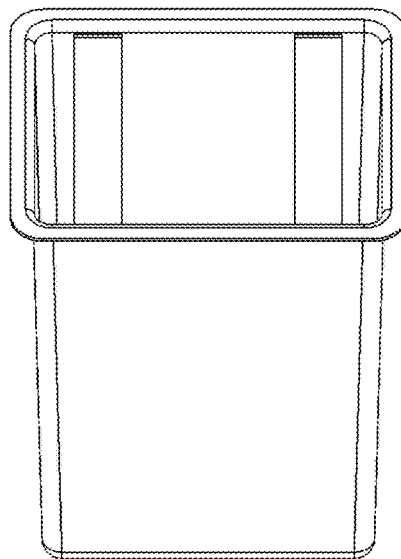
Figure 17H:
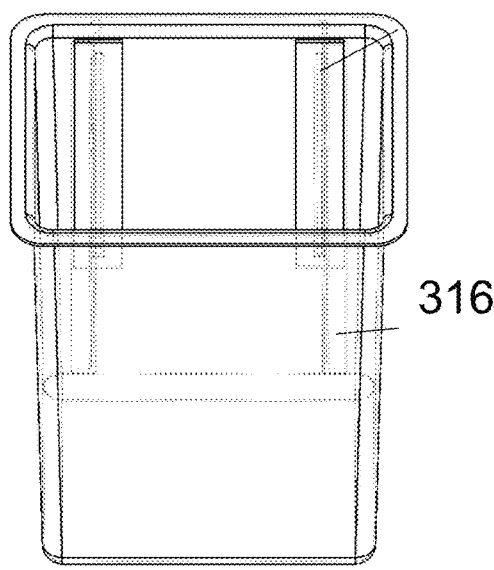
Figure 17I:
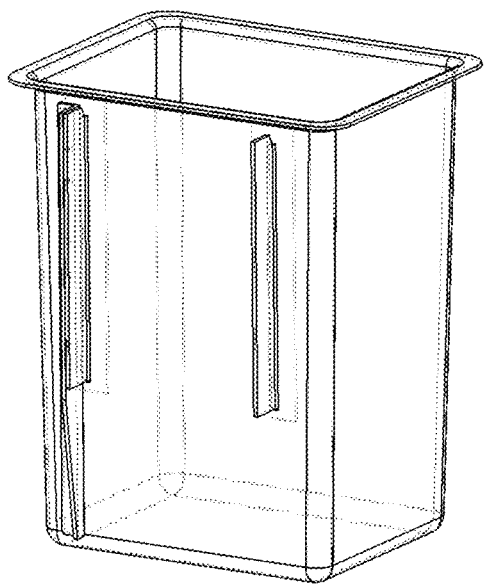

In another embodiment (FIGS. 17A-I), the L-shaped component 314 bonded on the exterior of the platform extends below the cutout in the platform wall that accepts the T-shaped component 312 from the inside of the platform. This extension 316 allows the platform to more effectively transfer compressive stress to the L-shaped component near the outside bottom of the platform. FIGS. 17A-I show various stages of construction of the embodiment. FIGS. 17A, C, E and G show views wherein the platform is solid. FIGS. 17 B, D, F, H and I show views wherein the platform is transparent.

The example embodiment shown in FIGS. 17A-I, 18A-C and 19A-C is constructed as follows:

An 8"×4"×3/8" Series 1500 SuperStructural I-beam manufactured by Creative Pultrusions (Alum Bank, Pa., USA) is cut in half so two "T" shapes existed. Two 0.88" wide slots are cut in the platform sidewall and the T shapes are bonded to the inside of the platform with a portion of the "T" protruding through the slots in the platform wall. The T-shaped component is 28" long and the portion that protrudes through the platform wall is 26.25" long. This design allows the top and bottom of the "T" to completely cover the slot cut in the platform wall to ensure a seal of the cutout. A 3"×3"×0.375" Series 1500 SuperStructural equal leg angle manufactured by Creative Pultrusions (Alum Bank, Pa., USA) is bonded to the exterior of the platform and to a portion of the T-shaped component that protrudes through the platform wall. The "L" shape is initially 36.5" long and is cut to taper near the bottom of the platform. The "L" shape preferably extends between about 1 and about 13 inches beyond the bottom of the slot. The "L" is further trimmed so that the portion in contact with the platform is only 2" wide instead of 3" wide as it is manufactured. In one embodiment, the portion of the "L" that contacts the platform is trimmed even further when required, such as when the rib is close to the side of the platform and there isn't enough area to bond a 2" wide portion. The reduced width provides adequate strength while reducing weight and the amount of adhesive required for bonding it to the platform wall. Additionally, a notch 317 is cut into the top of the stem of the T at the top of the T-shaped rib component for the following reasons:

Whenever material is removed from a component, for example by cutting a slot in it, the physical strength of that component is decreased by some amount. In an effort to minimize the strength reduction caused by the slots in the platform wall there was a desire to maintain as large of a distance as possible between the top of the slot and the platform flange.

It is desirable for the top of the "T" inside of the platform to completely cover the slot cut in the platform wall. In order to achieve this, the portion of the "T" inside of the platform must extend up past the slot cut in the platform wall. It is important that the upper portion of the "T" inside of the platform, that covers the top of the slot, doesn't extend up past the beginning of the radius where the platform wall transitions to the platform flange. This is important to minimize the interference of the portion of the rib inside of the platform with a platform liner that is inserted into the platform. Some platforms have mounting holes drilled in their ribs near the top of the rib only a few inches below the platform flange. Therefore, it is necessary for the top of the "T" rib on the outside of the platform to be no more than approximately 1.5" from the bottom of the platform flange.

Figure 18A:
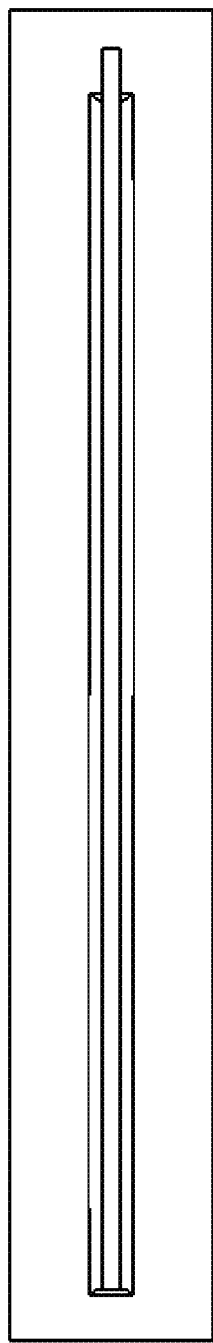
FIG. 18A is a front view of a T-shaped rib according to the present invention.
Figure 18B:
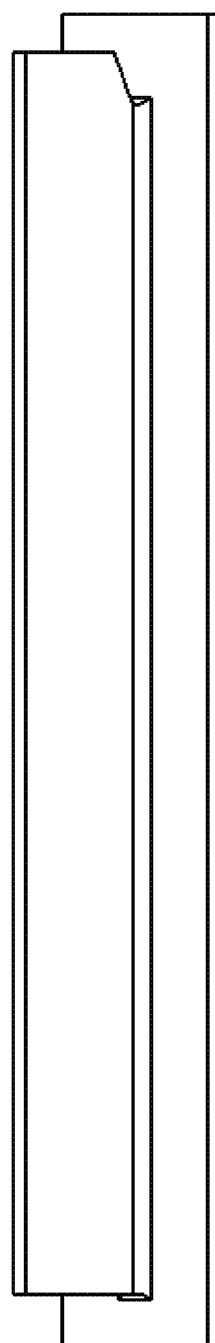
FIG. 18B is a front perspective view of the rib of FIG. 18A.
Figure 18C:
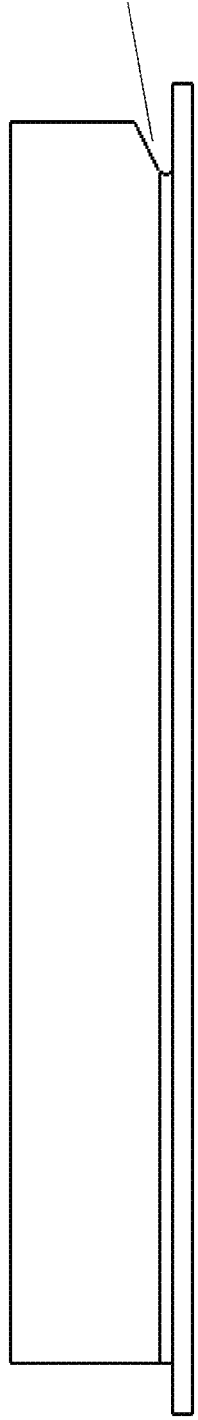
FIG. 18C is a side view of the rib of FIG. 18A.
Figure 19A:
FIG. 19A is a front view of an L-shaped rib according to the present invention.
Figure 19B:
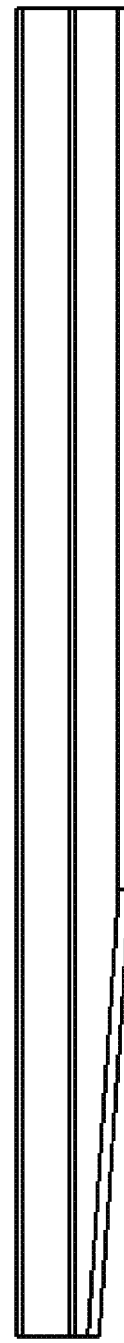
FIG. 19B is a front perspective view of the rib of FIG. 19A.
Figure 19C:
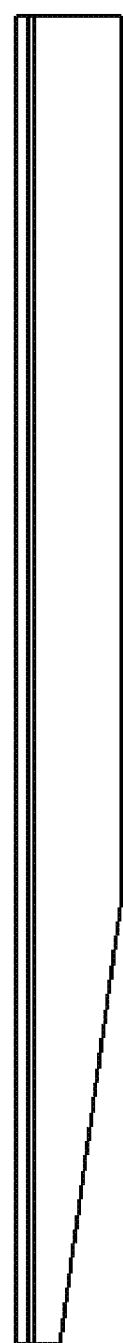
FIG. 19C is a side view of the rib of FIG. 19A.

FIGS. 18A-C show the "T" shape utilized in FIG. 17. In a preferred embodiment, the thickness of the various flat parts of the "T" shape are 3/8 inch. FIGS. 19A-C show the "L" shape utilized in FIG. 17. In a preferred embodiment, the "L" shape flat parts are 3/8 inch thick.

Figure 20A:
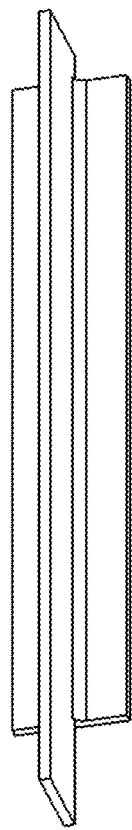
FIG. 20A is a front perspective view of another T-shaped rib according to the present invention.
Figure 20B:
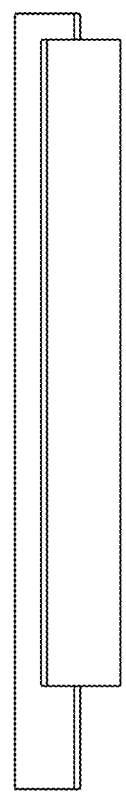
FIG. 20B is a rear perspective view of the rib of FIG. 20A.
Figure 20C:
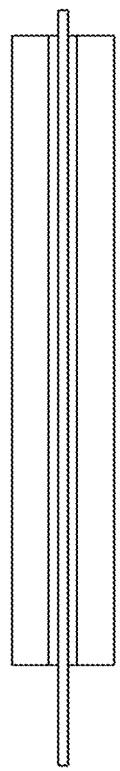
FIG. 20C is a front view of the rib of FIG. 20A.
Figure 21:
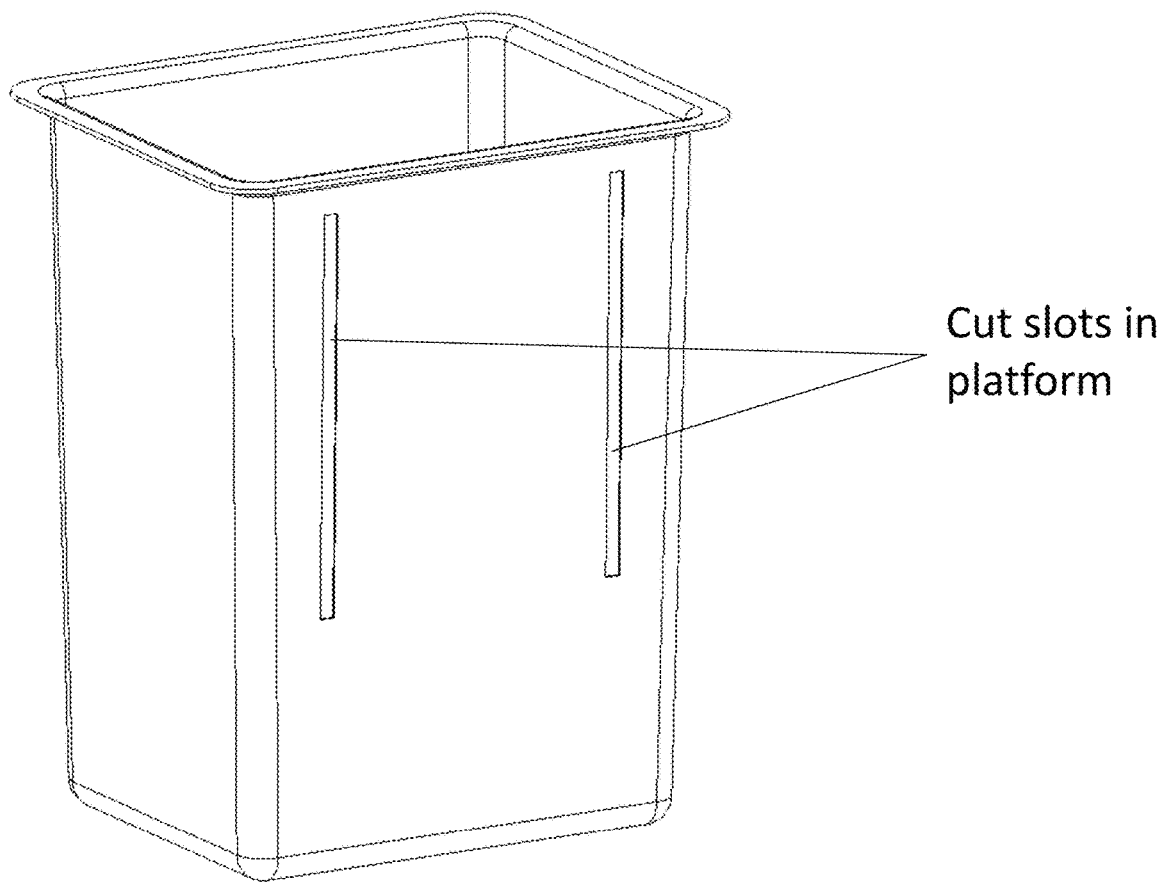
FIG. 21 is a perspective view of a platform with slots for receiving reinforcing ribs according to the present invention.

Another example embodiment, shown in FIGS. 20A-C, is similar to the previous embodiment, with the addition that the rib portion on the exterior of the platform also extends above the interior rib portion at both ends. In other words, the stem of the "T" extends beyond the arm of the "T" at both ends of the rib. In this manner the rib "hooks" onto both the top and the bottom exterior of the platform. The dimensions of the slot and rib are adjusted so that the exterior portion of the rib fits through the slot when the longer extension end is inserted through the slot and moved to its limit.

Another example embodiment has the arm extending vertically beyond the stem of the T at both ends of the rib. One benefit of this design is that the arm completely covers the slot in the platform wall.

In another embodiment, the T stem is notched at the top of the rib so that the stem extends vertically beyond the arm while the arm still covers the slot near the top of the platform.

Yet another embodiment is for a rib that has a stem that extends above the arm at the top of the rib and the arm extends below the stem at the bottom of the rib. This design allows the arm to completely cover the slot in the platform wall while reducing the tendency of the arm to separate from the platform wall near the top of the rib during loading scenarios such as "side push" which occurs when the side of a platform is accidentally pushed into a tree.

When the stem of the T-shaped portion extends vertically beyond the arm of the T at the top of the rib, this is beneficial during scenarios when a load is being applied to the bottom of the platform (like when the platform is accidentally slammed into the ground). In this scenario, the stem of the T above the arm of the T on the inside of the platform is in compressive contact with the platform wall and this prevents the arm of the T from separating from the inside wall of the platform due to a tension force (i.e., the rib being pushed into the platform near the top of the platform).

When the stem of the T-shaped portion extends vertically beyond the arm of the T at the bottom of the rib, this is beneficial during scenarios when a vertical load is being applied to the inside of the platform (like when an operator is standing in the platform.) In this scenario, the stem of the T below the arm of the T on the inside of the platform is in compressive contact with the platform wall and this prevents the arm of the T from separating from the inside wall of the platform due to a tension force (i.e., the rib being pushed into the platform near the bottom of the platform).

In general, when the stem of the T on the outside of the platform extends above or below the arm of the T on the inside of the platform, the stem is allowed to support more force than would otherwise be supported by the arm or by the adhesive. This occurs because the stem has a greater section modulus than the arm.

Figure 22:
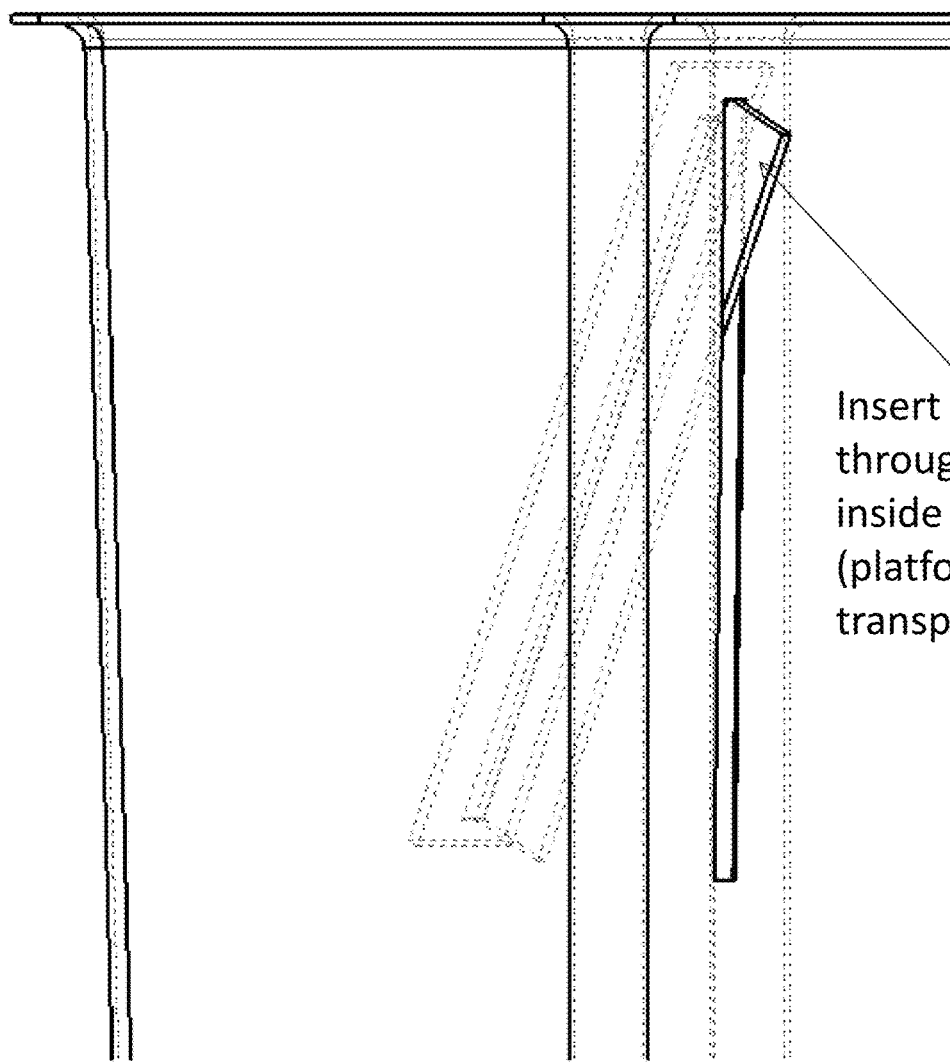
FIG. 22 is a perspective exterior view of a T-shaped rib being inserted into one of the slots of FIG. 21.
Figure 23:
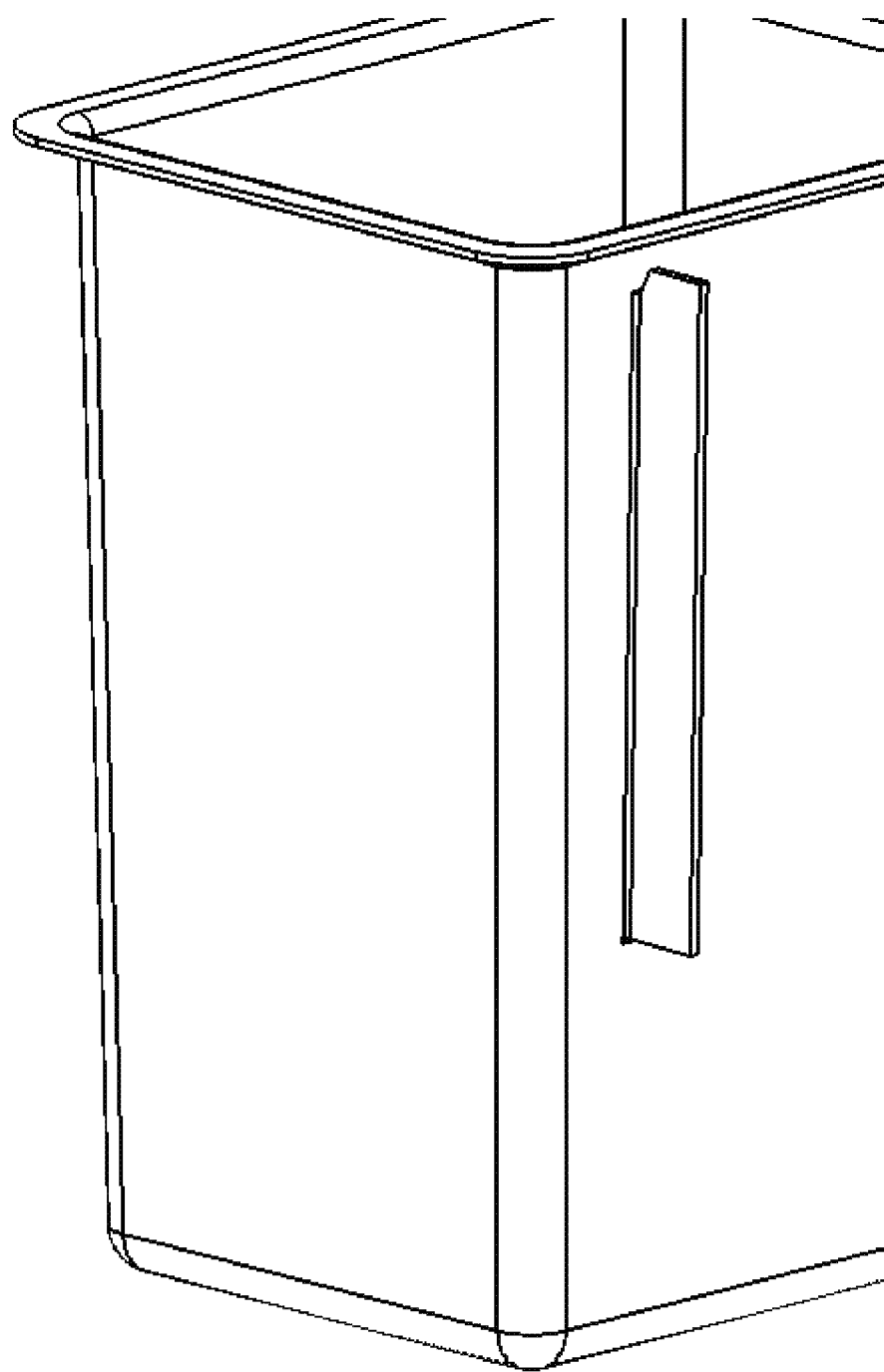
FIG. 23 is a perspective exterior view of the T-shaped rib of FIG. 22 in position in the slot.
Figure 24:
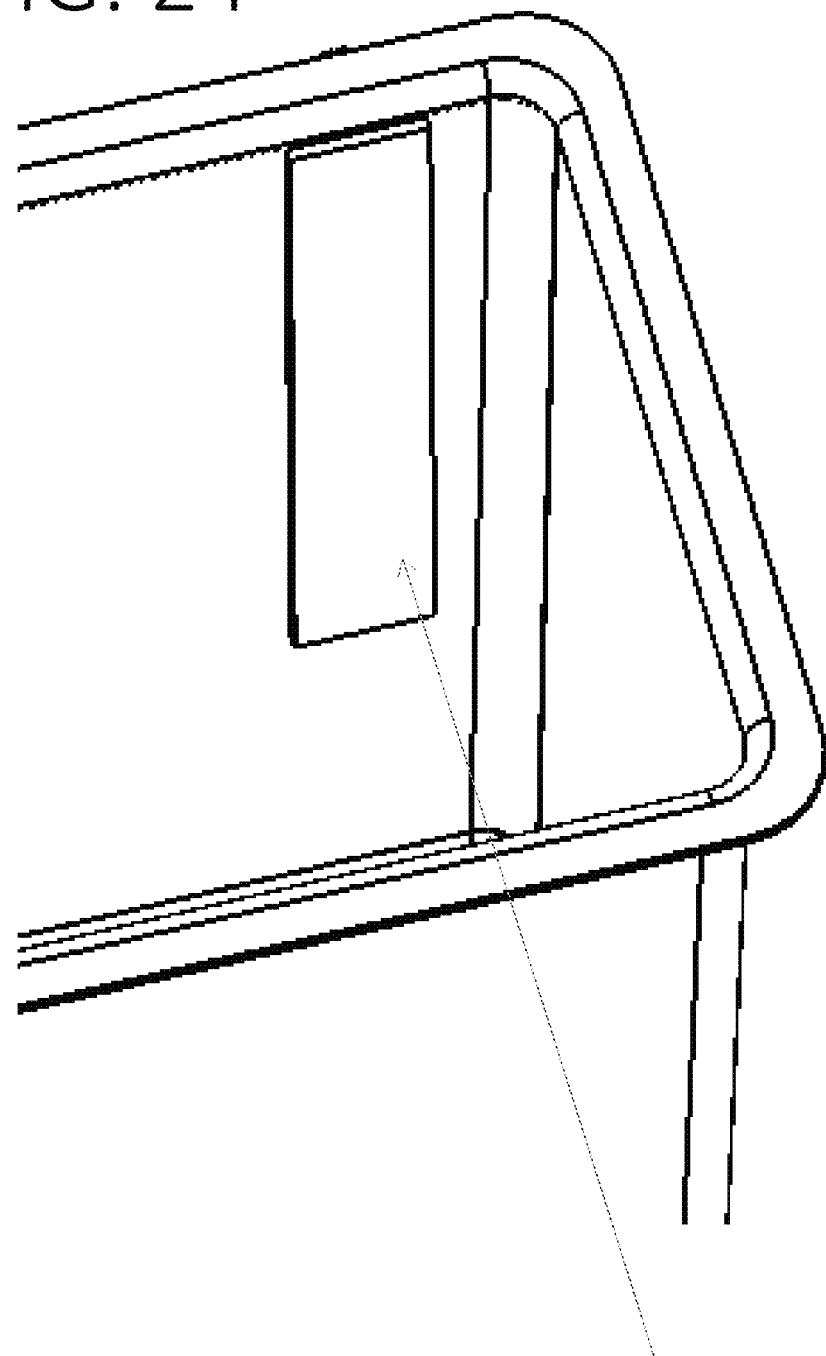
FIG. 24 is a perspective interior view of the rib of FIG. 22 in position in the slot.
Figure 25:
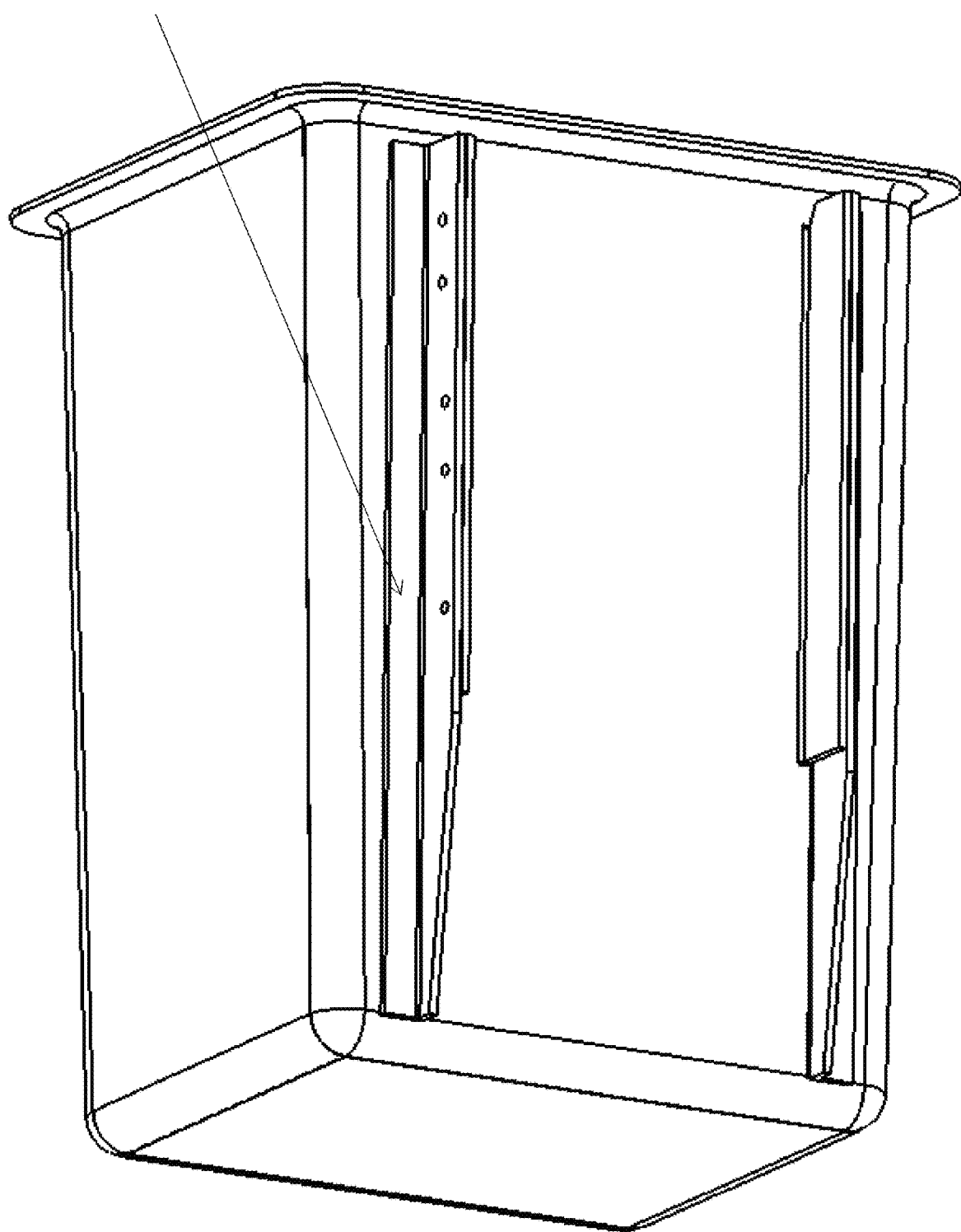
FIG. 25 is a perspective exterior view of the rib of FIG. 22 with an L-shaped rib applied.
Figure 26:
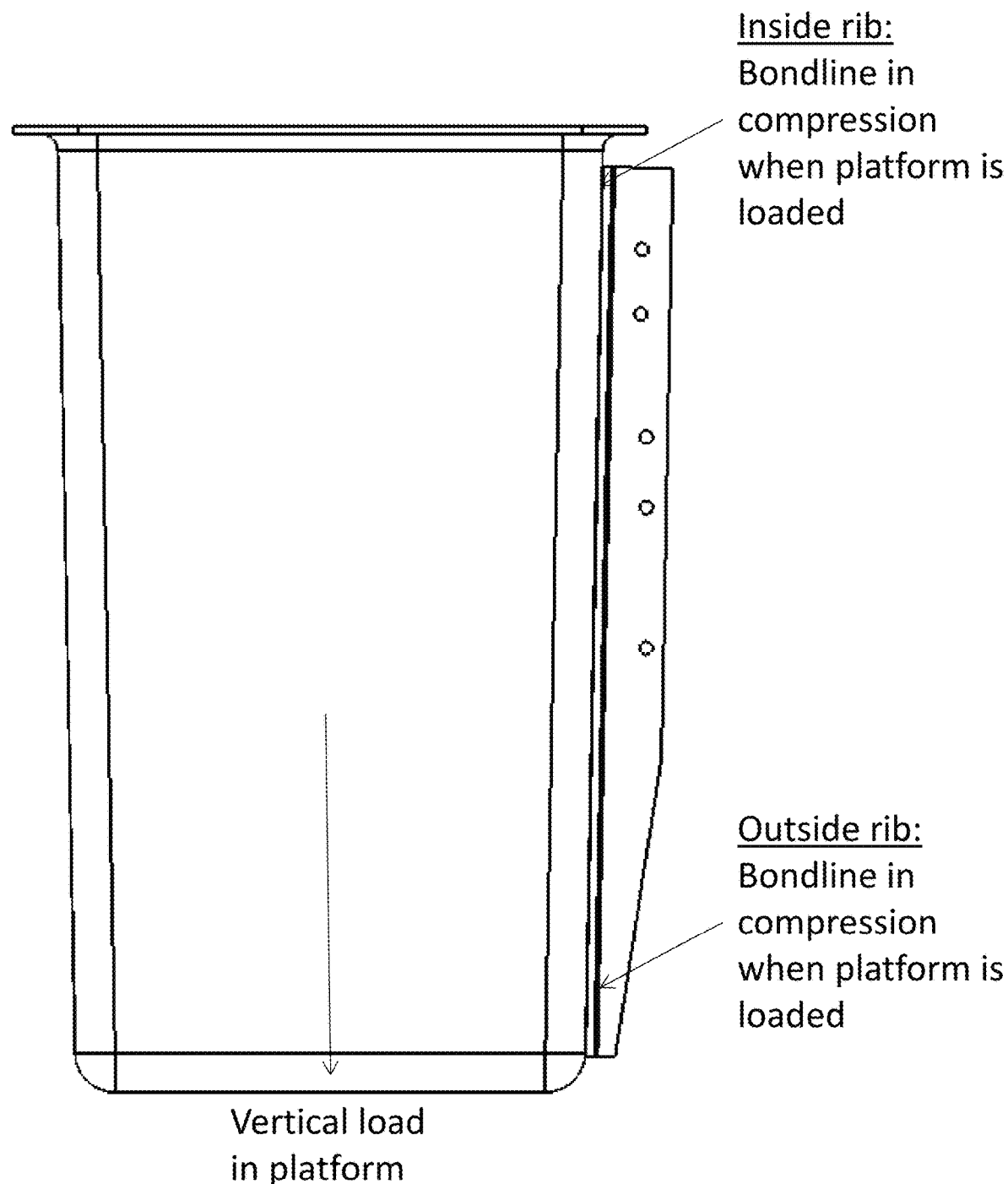
FIG. 26 is a side view of the rib of FIG. 25, with areas of compression noted.
Figure 28A:
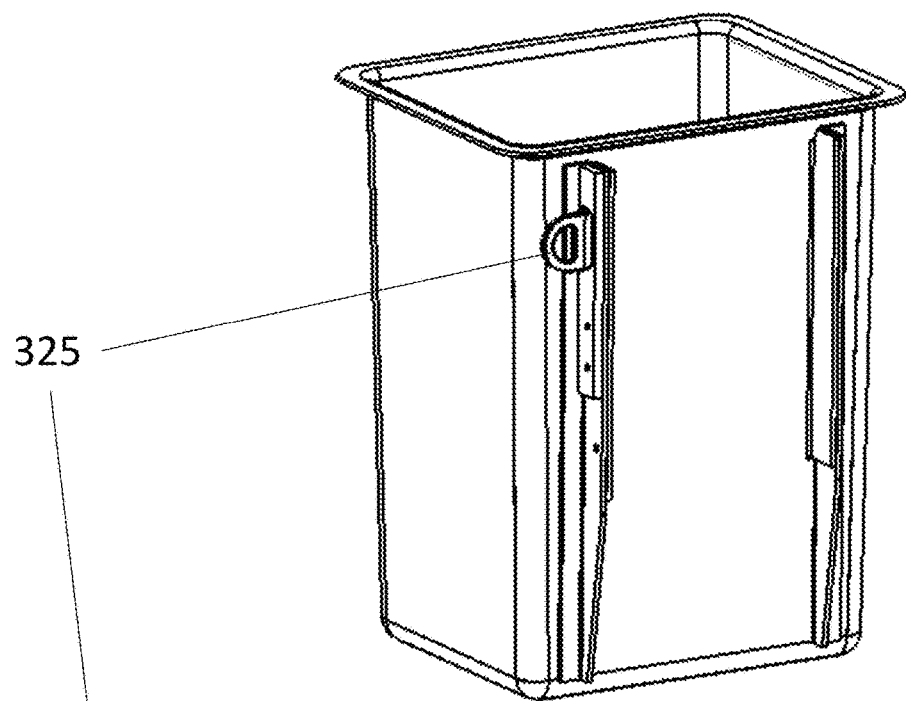
FIGS. 28A-B are perspective views of the rib of FIGS. 25-26 with another lanyard bracket attached.
Figure 28B:
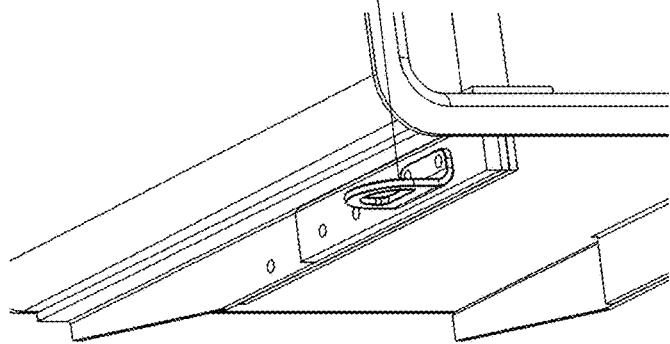

FIGS. 21-26 show the assembly steps of the embodiment of FIG. 17. Slots are cut into the platform (FIG. 21), whereupon the inner ribs are inserted through the slots (FIG. 22). The inner rib is glued to the platform (FIG. 23, exterior view; FIG. 24, interior view). The outer rib is next glued in place (FIG. 25). FIG. 26 shows the compression forces acting on the rib.

Figure 29:
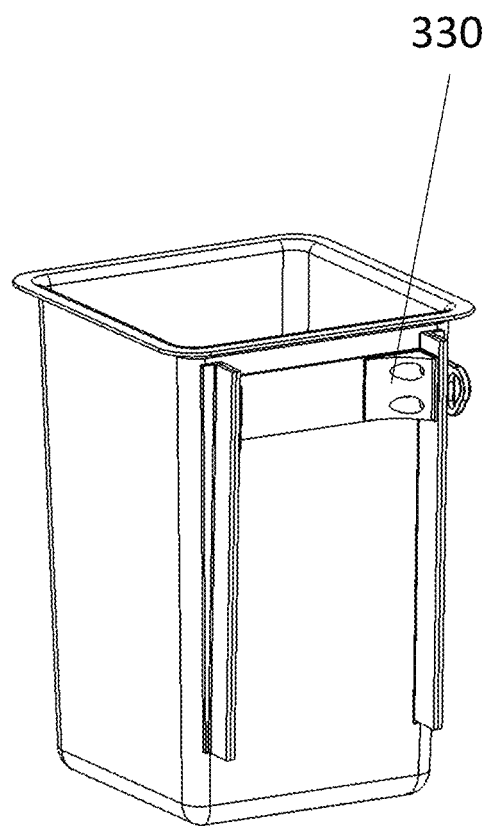
FIG. 29 shows the elevating platform of FIGS. 28A-B with a lanyard bracket support.

In another embodiment, a lanyard anchor bracket reinforcement section 325 is attached to rib (FIGS. 27A-C and FIGS. 28A-B). In one embodiment, the lanyard anchor bracket reinforcement section 325 is constructed out of an unreinforced thermoplastic. In exemplary embodiments, the lanyard anchor bracket reinforcement section is constructed of nylon and/or urethane. However, other materials including reinforced thermoplastics and thermoset are also used for the lanyard bracket. The lanyard anchor bracket reinforcement section ensures connection between the platform mounting bracket and the lanyard anchor bracket even if the platform rib breaks between these two structures. FIG. 29 shows the embodiment of FIG. 27 further including a brace 330 to reinforce the lanyard anchor bracket. FIGS. 30A-E show various views of the brace.

Figure 31:
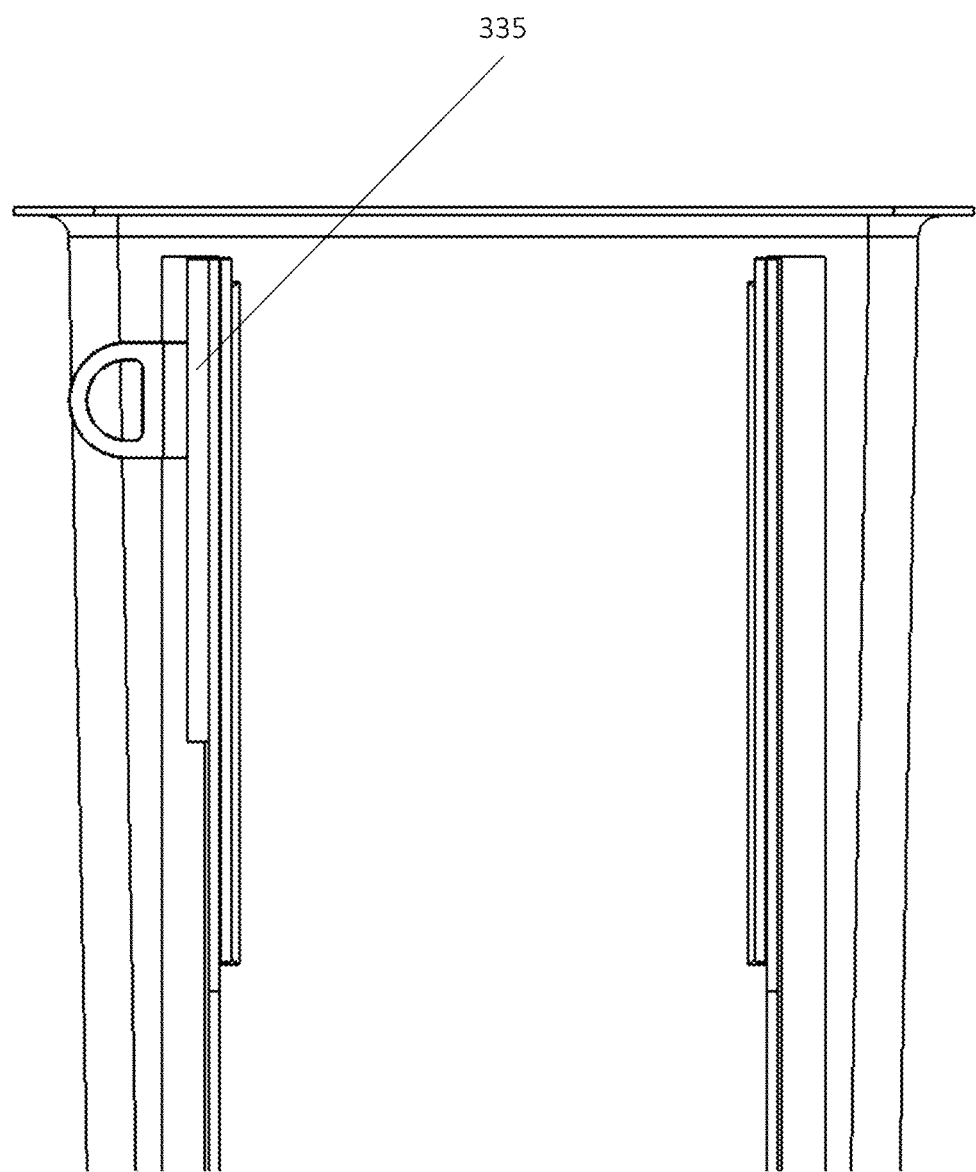
FIG. 31 shows a 0.75" thick urethane bar affixed as a lanyard bracket support.

FIG. 31 shows a 0.75" thick urethane bar 335 affixed as a lanyard bracket support.

In yet another embodiment, the present invention is directed a T- and L-shaped rib including a T-shaped portion that has a T-shaped cross-section with an arm and a stem and an L-shaped portion that has an L-shaped cross-section with an arm and a stem; the arm of the T-shaped portion is positioned inside the elevating platform and contacts an inner surface of the sidewall of the platform; the arm of the L-shaped portion is positioned outside the elevating platform and contacts an outer surface of the sidewall; the stem of the T-shaped portion extends through the sidewall slot and the stem of the L-shaped portion is external to the sidewall and extends beyond the top and bottom of the sidewall slot; and the stems of the T-shaped and L-shape portions are adhered to each other. In one embodiment, this rib further including a notch in the top of the rib in the stem of the T-shape portion at the conjunction of the stem and the arm; the notch configured such that the arm and the stem of the T-shape slide over the sidewall via the notch. Preferably, the arm of the T-shaped portion extends vertically beyond the sidewall slot at both ends when installed in the elevating platform and the L-shaped portion extends between about 1 and about 13 inches beyond the bottom of the slot. The rib is preferably formed of fiber-reinforced thermosets, unreinforced thermosets, fiber-reinforced thermoplastics, and/or unreinforced thermoplastics.

Another rib according to the present invention is a double-L-shaped rib including a first L-shaped portion and a second L-shaped portion, both portions having an L-shaped cross-section with an arm and a stem; the arm of the first L-shaped portion contacts an outer surface of the sidewall of the platform and the arm of the second L-shaped portion contacts an inner surface of the sidewall; the arm of the second L-shaped portion extends vertically beyond the sidewall slot at both ends; the stem of the second L-shaped portion extends through the sidewall slot and the stem of the second portion is external to the sidewall; and the stems of the portions are adhered to each other or the rib is pultruded. In one embodiment, the arm of the second L-shaped portion extends vertically beyond the sidewall slot at both ends when installed in the elevating platform. The rib preferably includes a notch in the top of the rib in the stem of the second L-shaped portion at the conjunction of the stem and the arm; the notch is configured such that the second L-shape portion slides over the sidewall via the notch. In another embodiment, the stem of the second L-shape portion at the top of the rib extends above the sidewall slot. The first L-shaped portion extends between about 1 and about 13 inches beyond the bottom of the slot. The rib is preferably formed of fiber-reinforced thermosets, unreinforced thermosets, fiber-reinforced thermoplastics, and/or unreinforced thermoplastics.

Mount System

Figure 32A:
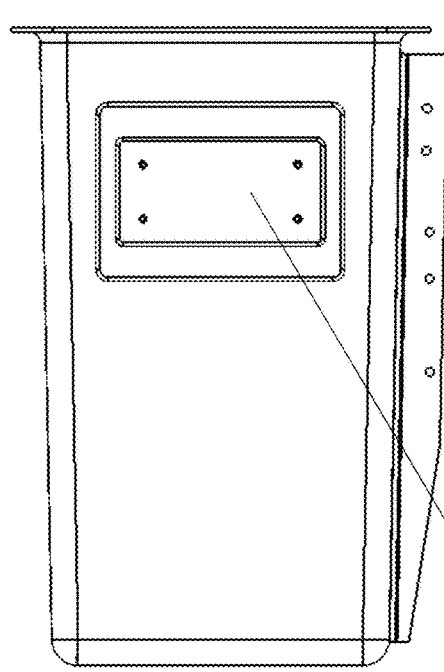
FIG. 32A-C show different views of a PRIOR ART mounting plate.
Figure 32B:
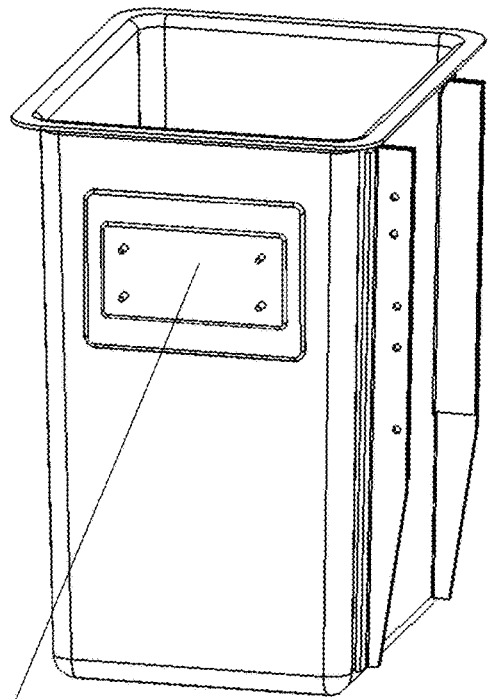
Figure 32C:
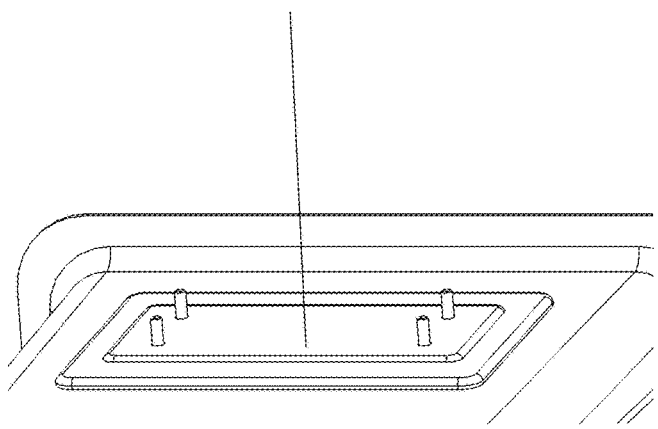

The present invention further provides for a mounting plate, system and method. Current mounting plates (FIG. 32) consist of flat fiberglass plates that have metal reinforcement encapsulated inside of the fiberglass with studs protruding from the fiberglass plate. These mounting plates are typically bonded to the exterior of platforms. When a load is applied to the mounting plate the adhesive at the top is in tension and the adhesive at the bottom is in compression. There is a greater potential for a traditional mounting plate to separate from a platform near the top of the plate where the adhesive is in tension. Other reasons why relying on adhesive as a primary joining mechanism is not preferred pertain to quality risks such as improper adhesive application, improper adhesive mixing, and improper adhesive mix ratios.

The present invention is directed to a system and method to mount components to a platform wall utilizing a joining mechanism that relies on the structural strength of the platform and the component instead of adhesive or other fasteners. The attachment method is applicable to any component that needs to be attached to a platform. An example embodiment is a valve mounting plate. The purpose of a valve mounting plate is to provide a mounting location on a platform wall for a controller assembly. The controller assembly is used by the operator to direct the movement of the platform while the operator is inside of the platform.

A common feature among the mounting systems of the present invention is that some portion of the mounting system is located inside and another portion is located outside of the platform via an opening in the platform wall. This is the design feature that allows the mounting system to be mechanically locked into a platform wall without adhesive.

Another benefit of the new mounting systems are their reduced size and weight. The reduced size also allows less adhesive to be used due to the reduced bonding surface area that is now allowed due to the redirection of stress into the platform wall and mounting plate.

Thus the present invention relies on the structural strength of the platform wall and the mounting plate to hold the two together. Adhesive is not the primary joining mechanism in this invention.

Figure 33:
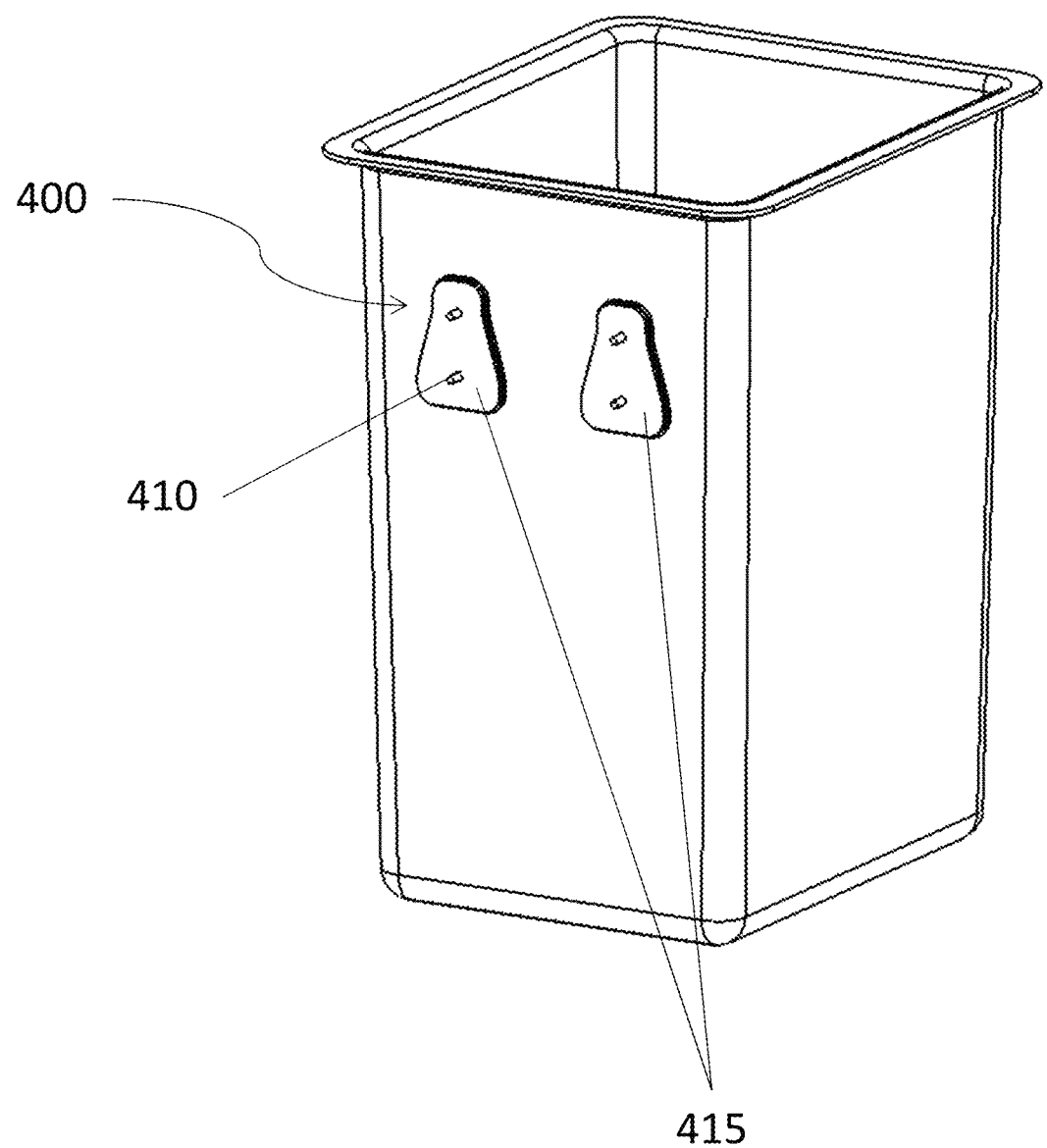
FIG. 33 is an exterior view of a mounting plate according to the present invention.
Figure 34:
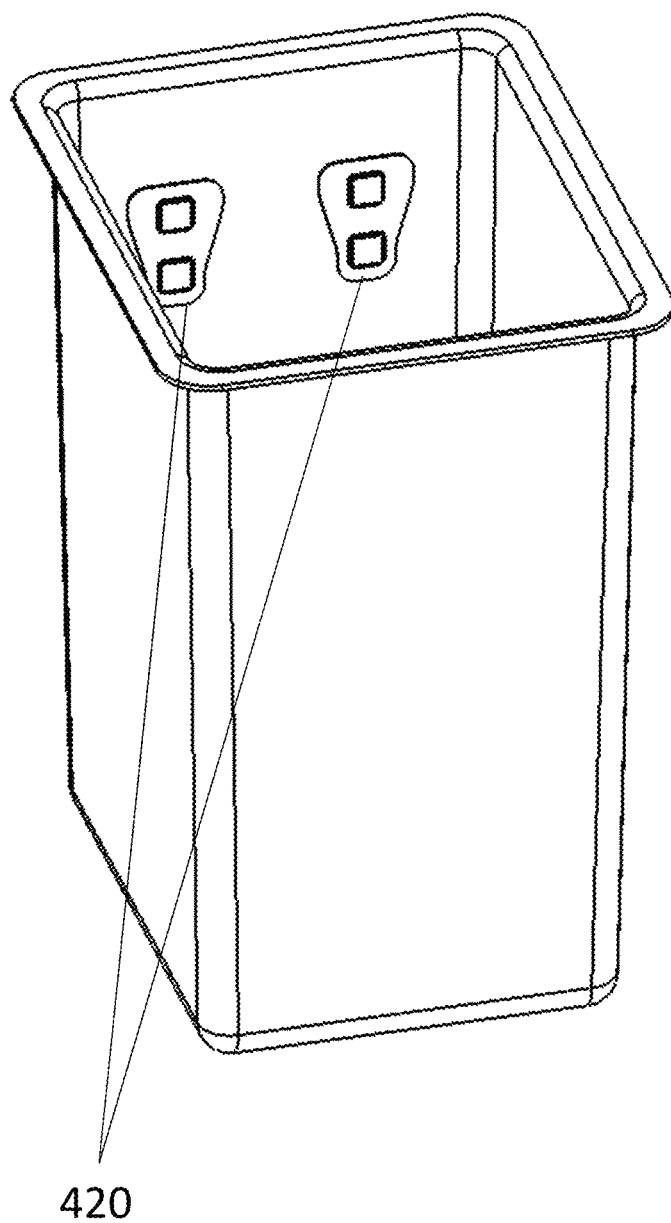
FIG. 34 is an interior view of a mounting plate according to the present invention.
Figure 36A:
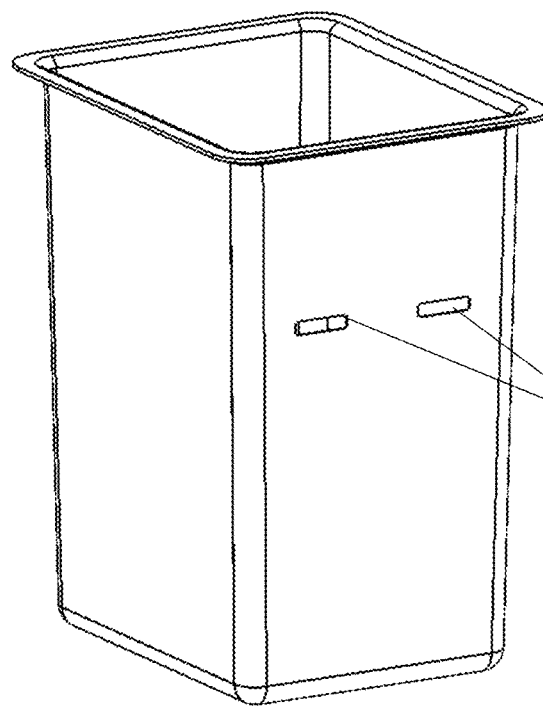
FIG. 36A shows a platform with two slots for mounting a mounting plate according to the present invention.
Figure 36B:
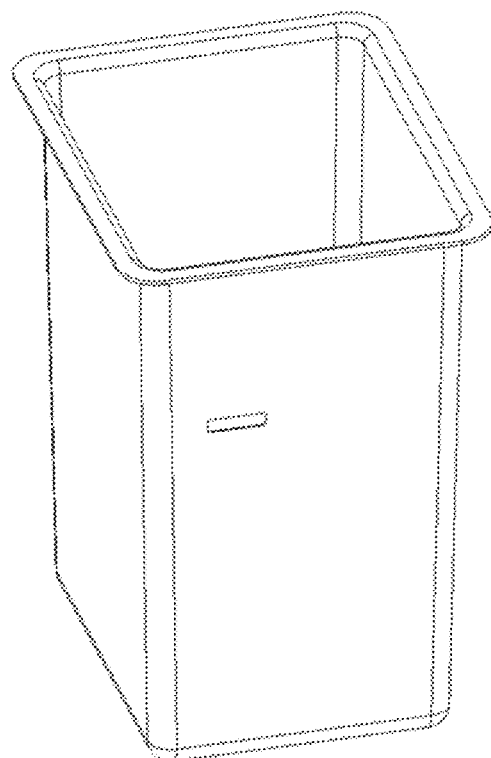
FIG. 36B shows a platform with one slot for mounting a mounting plate according to the present invention.
Figure 37A:
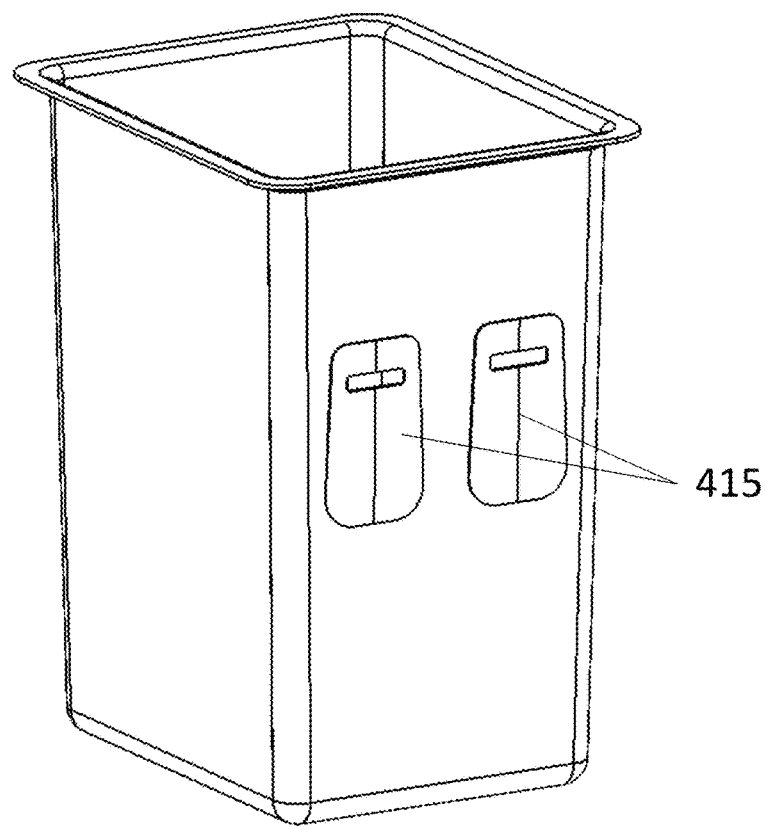
FIG. 37A shows a platform with one slot with reinforcing pads for mounting a mounting plate according to the present invention.
Figure 37B:
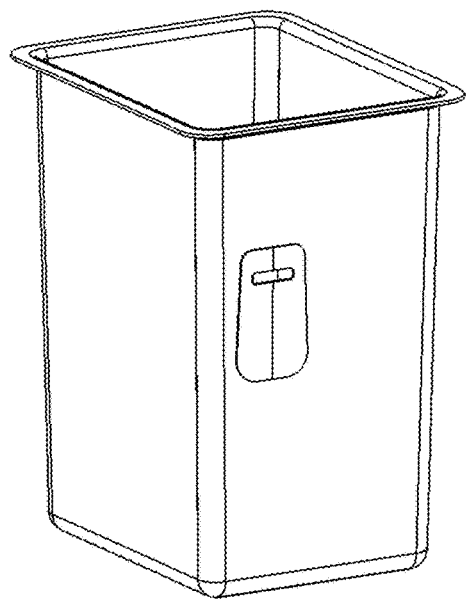
FIG. 37B shows a platform with one slot for mounting a mounting plate according to the present invention.

A first mounting plate example, generally described as 400, is shown in FIG. 33. This embodiment includes four studs 410 that protrude perpendicularly through the platform wall. These four studs are used to secure the controller mounting bracket to the mounting plate. The embodiment includes exterior reinforcement 415, which is wider at the bottom in order to spread out the compression load. Preferably, the bottom of the external reinforcement is between about 50% and about 100% wider than the top and the ratio of the height to the width of the wide end between about 1.4 and 2.33. Internal reinforcement 420, shown in FIG. 34, is wider at the top and the ratio of the height to the width of the wide end between about 1.4 and 2.33, also to spread out the compression load. Preferably, the top of the internal reinforcement is between about 50% and about 100% wider than the bottom. FIGS. 35A and B show cross-sectional views of the embodiment. FIG. 35B is a magnification of section A in FIG. 35A. The figures include the studs 410, the internal reinforcement 420, the external reinforcement 415, platform sidewall 215. Additionally, a spacer 430 and a dielectric cover 435 are included. The spacer is preferably silicone and the dielectric cover is preferably a non-conductive thermoplastic, such as polycarbonate.

FIGS. 36-43 show an alternative embodiment of the present mounting system. In this embodiment, one or more slots 440 are created in the platform sidewall (FIGS. 36A and B). External reinforcement 415 is attached (FIGS. 37A and B) and a mounting plate 445 is inserted through the slots (FIGS. 38A-O, with transparent platform) and rotated into position. The mounting plate 445 includes a top section 446, a bottom section 447 and a transition 448 (FIGS. 39A-O).

Figure 39F:
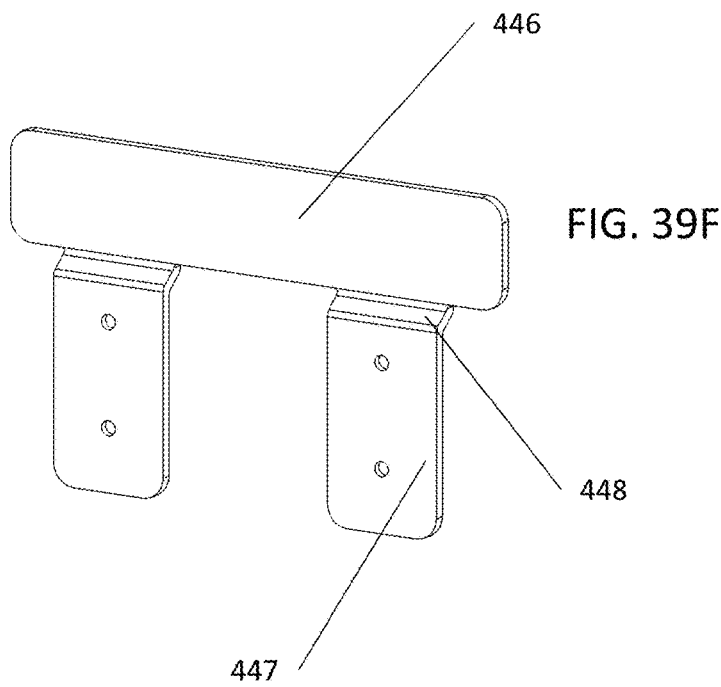
FIG. 39F is a front perspective view of the plate of FIGS. 38A and B.
Figure 39H:
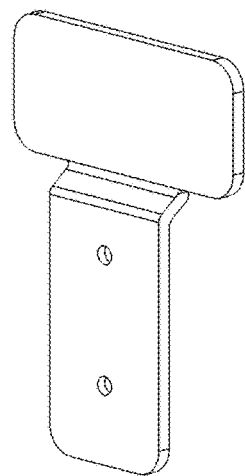
FIG. 39H is a front perspective view of the plate of FIGS. 38C and D.
Figure 39G:
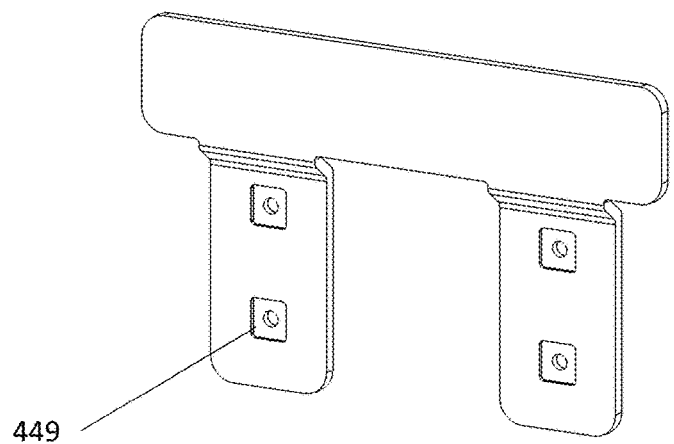
FIG. 39G is a rear perspective view of the plate of FIGS. 38A and B.
Figure 39I:
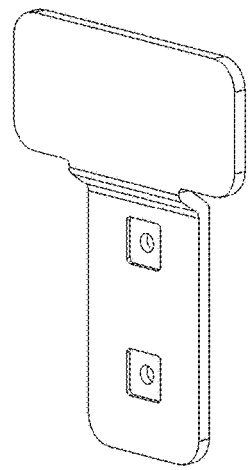
FIG. 39I is a rear perspective view of the plate of FIGS. 38C and D.
Figure 40A:
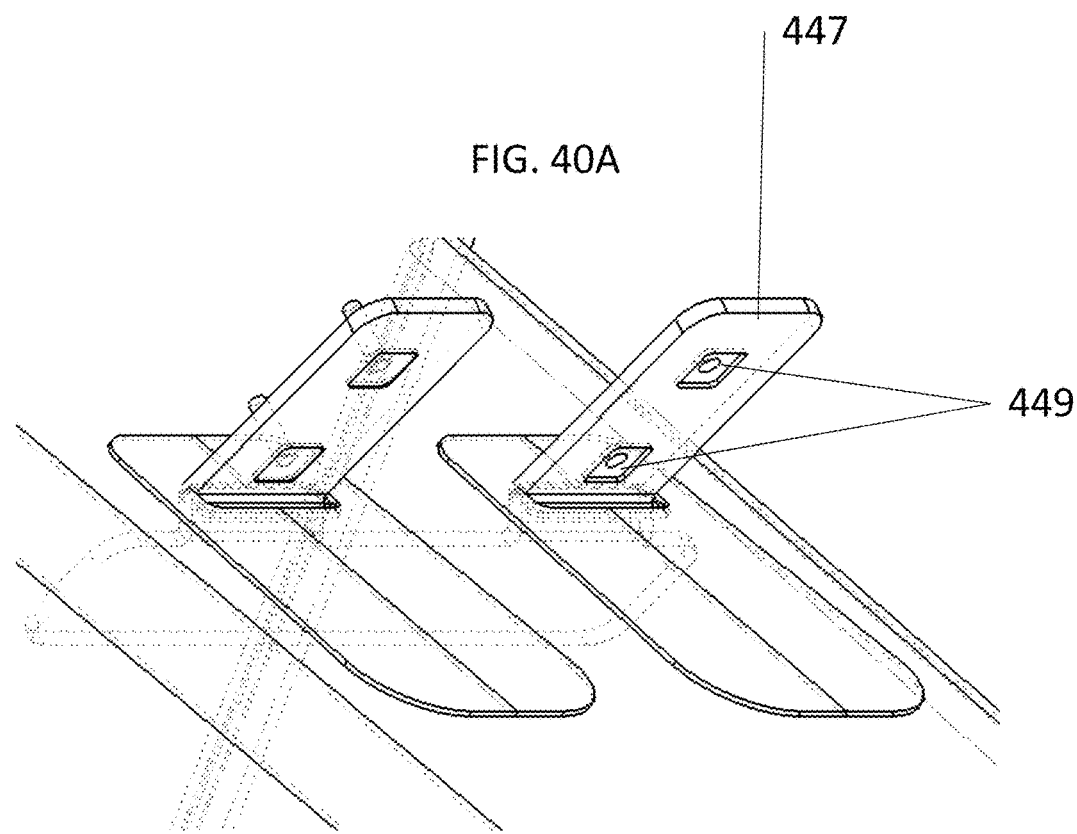
FIG. 40A is a perspective view of the rear of the lower section of the mounting plate of FIGS. 38A and B.
Figure 40B:
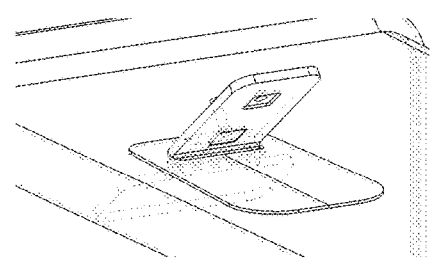
FIG. 40B is a perspective view of the rear of the lower section of the mounting plate of FIGS. 38C and D.
Figure 40C:
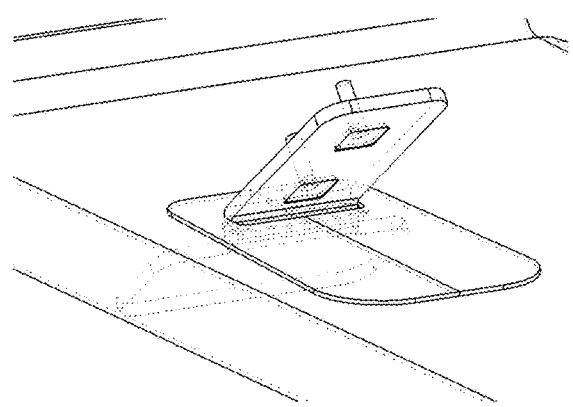
FIG. 40C is another perspective views of the rear of the lower section of the mounting plate of FIGS. 38C and D with studs inserted.

FIG. 39A is a front view of the plate of FIGS. 38A and B.
FIG. 39B is a side view of the plate of FIGS. 38A and B.
FIG. 39C is a rear view of the plate of FIGS. 38A and B.
FIG. 39D is a front view of the plate of FIGS. 38C and D.
FIG. 39E is a rear view of the plate of FIGS. 38C and D.
FIG. 39F is a front perspective view of the plate of FIGS. 38A and B.
FIG. 39G is a rear perspective view of the plate of FIGS. 38A and B.
FIG. 39H is a front perspective view of the plate of FIGS. 38C and D.
FIG. 39I is a rear perspective view of the plate of FIGS. 38C and D.
FIG. 39J is a rear bottom perspective view of the plate of FIGS. 38A and B.
FIG. 39K is a bottom view of the plate of FIGS. 38A and B.
FIG. 39L is a front bottom perspective view of the plate of FIGS. 38A and B.
FIG. 39M is a rear bottom perspective view of the plate of FIGS. 38C and D.
FIG. 39N is a bottom view of the plate of FIGS. 38C and D.
FIG. 39O is a front bottom perspective view of the plate of FIGS. 38C and D.

Figure 41A:
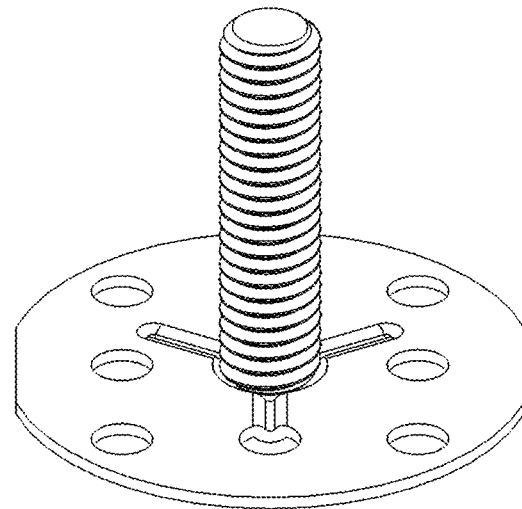
FIG. 41A-C are various views of a PRIOR ART exemplary stud used with the present invention.
Figure 41B:
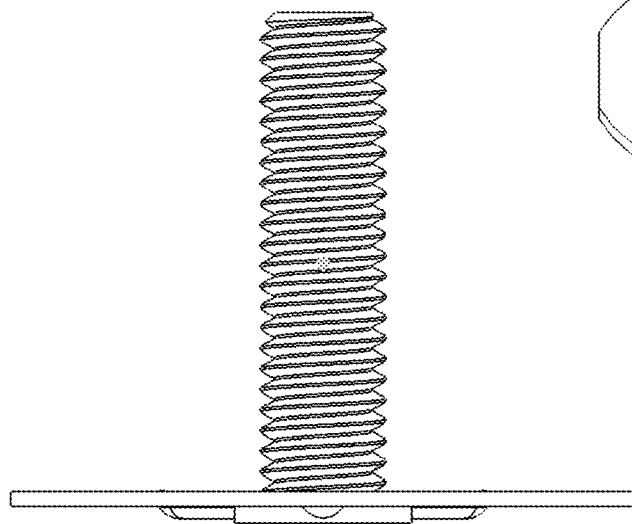
Figure 41C:
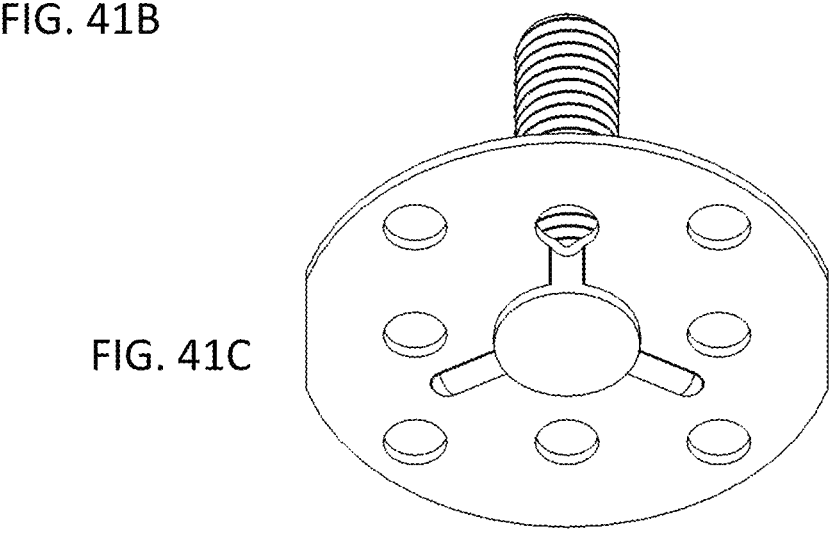
Figure 42A:
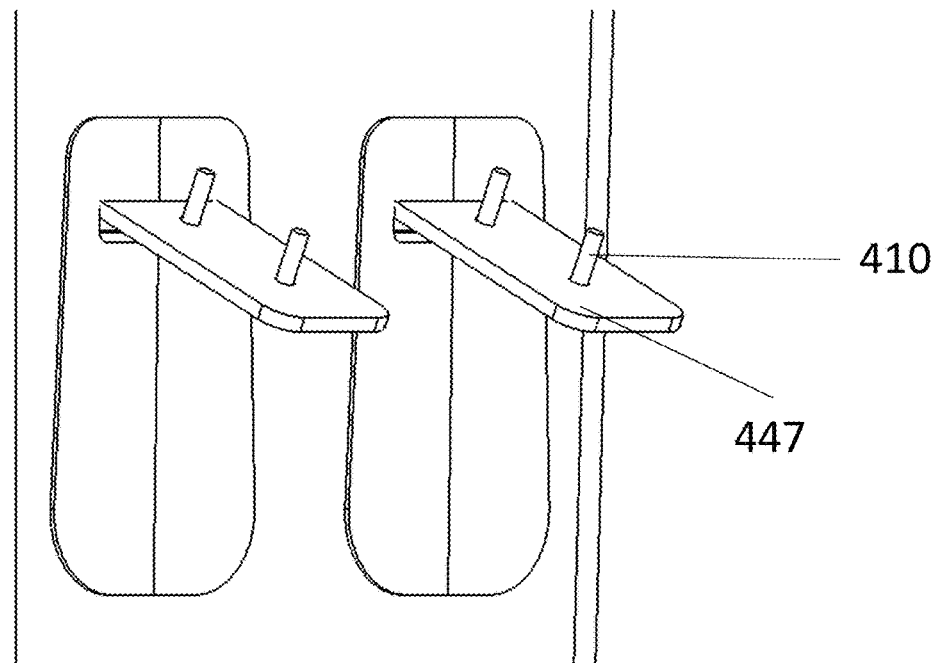
FIG. 42A is a perspective view of the lower section of the mounting plate of FIGS. 38A and B with studs installed.
Figure 42B:
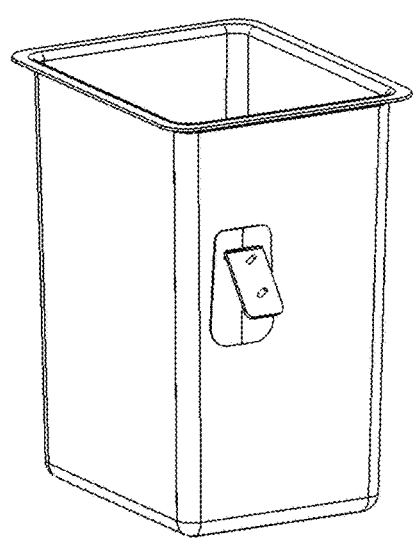
FIG. 42B is a perspective view of the lower section of the mounting plate of FIGS. 38C and D installed in a platform and with studs installed.
Figure 42C:
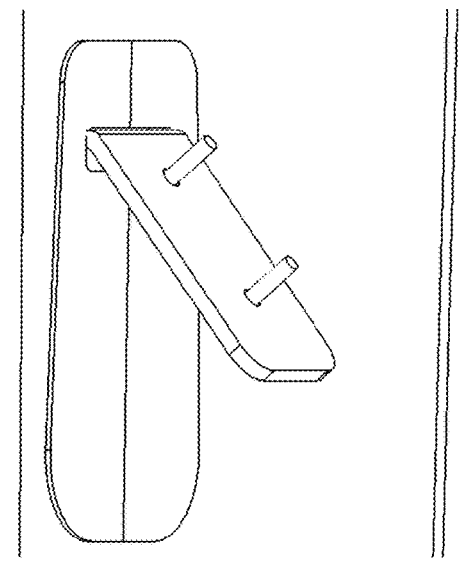
FIG. 42C is a close-up perspective view of the lower section of the mounting plate of FIGS. 38C and D installed in a platform and with studs installed.
Figure 43A:
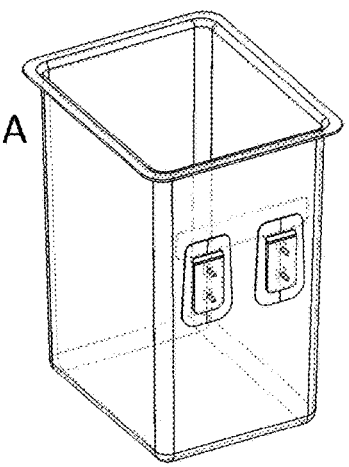
FIG. 43A is a perspective exterior view of the mounting plate of FIGS. 38A and B installed in a transparent platform.
Figure 43B:
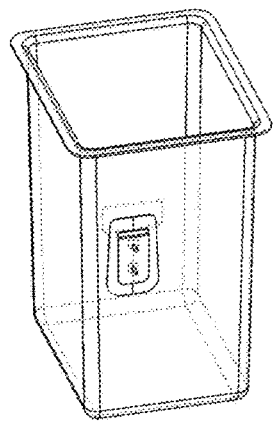
FIG. 43B is a perspective exterior view of the mounting plate of FIGS. 38C and D installed in a transparent platform.
Figure 43D:
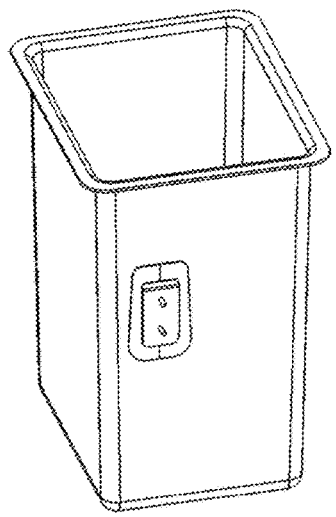
FIG. 43D is a perspective exterior view of the mounting plate of FIGS. 38C and D installed in an opaque platform.
Figure 43C:
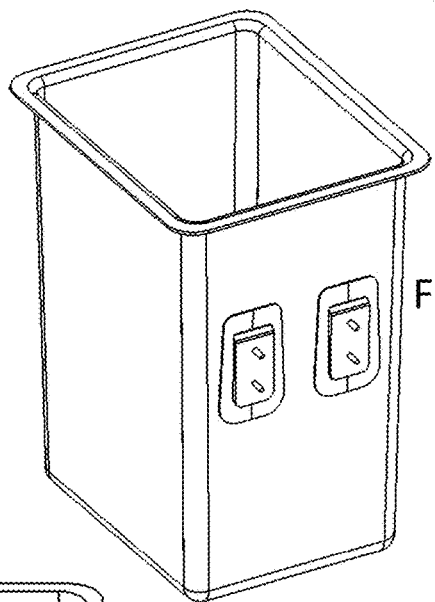
FIG. 43C is a perspective exterior view of the mounting plate of FIGS. 38A and B installed in an opaque platform.
Figure 43E:
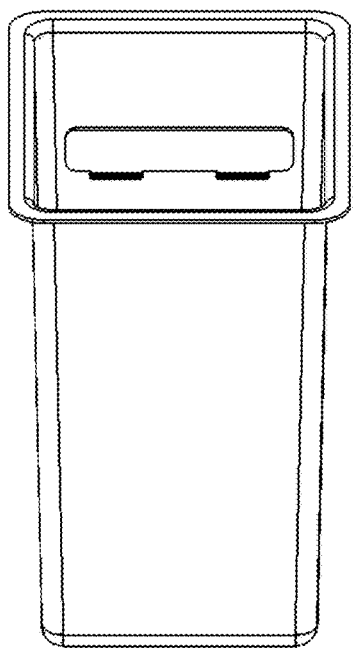
FIG. 43E is a perspective interior view of the mounting plate of FIGS. 38A and B installed in an opaque platform.
Figure 43F:
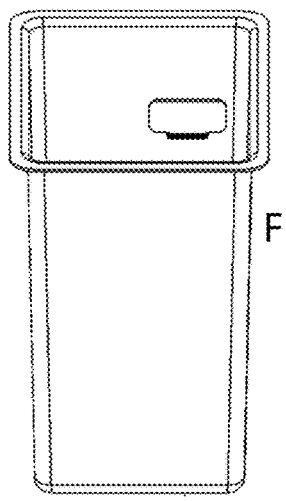
FIG. 43F is a perspective interior view of the mounting plate of FIGS. 38C and D installed in an opaque platform.

The bottom section 446 includes recesses 449 for stud heads (FIGS. 39C, 39E, 39G, 39I, 39J, 39M and 40A-C). In a preferred embodiment, the studs 410 are stud fasteners with large, flat heads (large-and-flat-headed stud fastener), such as stud anchor studs (FIGS. 41A-C). Preferably, the stud is formed from a bolt inserted through a large washer and welded to the washer to form the stud. Designs where the stud is formed by welding a threaded rod to a flat head, although acceptable, did not provide as much strength. The flat sides of the head help to prevent the stud from twisting. The heads are preferable perforated and non-circular so that when embedded in composite resin they do not turn when a nut or other fastener is being applied and tightened. The studs 410 are inserted through the holes in the bottom section 447 (FIGS. 42A-C) and the mounting plate is rotated into position (FIGS. 43A-F). FIGS. 43A and B show a transparent platform with the double- and single-mounting plates, respectively, in position. FIGS. 43C and D show an opaque platform with the single and double-mounting plate, respectively, in position. FIGS. 43E and F are interior views of the platform with double and single-mounting plates, respectively.

FIG. 44A-K shows a design that consists of vertically elongated rectangular reinforcement pieces with rounded corners 450 (the shape is also called stadium, discorectangle, or obrund) on the inside and outside of the platform wall. Big head studs penetrate the reinforcement pieces and platform wall and affix the reinforcement pieces to the wall. The elongated rectangular reinforcement pieces are oval in an alternative embodiment.

The reinforcement pieces 450 are bonded to the platform wall with an adhesive. The big head stud is inserted through a reinforcement piece on the inside of the platform, through the platform wall, and through a reinforcement on the outside of the platform. A non-conductive insulating cap 455 is placed over the stud heads on the inside of the platform to prevent any current from leaking through the platform wall. The insulating cap 455 is adhesively bonded in place or is connect via mechanical means. For example, the insulating cap is designed so it "snaps" into place over the stud heads when pressure is applied. The top and bottom of the reinforcement sections are rounded to reduce stress concentrations that is produced by sharp corners. The reinforcement sections on the inside of the platform extend up, past the reinforcement sections on the outside of the platform, by an inch or so. This further reduces stress concentrations by transferring more stress into the flange of the platform. All of the same materials proposed for previous designs are also used with this design.

The reinforcement sections preferably have a height-to-width ratio between about 3 and about 6. Whereas most prior art mounting plates have a height-to-width ratio between approximately 1 and 2, it was discovered that a greater height-to-width ratio was needed to prevent separation over time of the plate from the sidewall along the top and/or bottom edges.

In an example embodiment, the width of the plate 450 in FIG. 44A is about 3.5 inches wide and about 20 inches tall (area=70 square inches). The bolt head shown in FIG. 41 is 2 inches in diameter and the mounting stud is centered in the 3.5-inch-wide portion shown in FIG. 44A. Two plates with an approximately 8-inch margin above and below the top and bottom bolts do not separate when under a 175 lbs on a 6.5-inch moment arm. Thus, the example embodiment was able to support about 95 ft-lbs with two of the plates, with a combined area of 140 square inches, without separation, giving a separation support factor of about 0.68 ft-lbs/square inch. In contrast, a prior art mounting plate that was rated to support 40 lbs with an 8" moment arm (26.66 ft-lbs) had dimensions of about 11.5×16 inches (area=184 square inches), giving a separation support factor of 0.144 ft-lbs/square inch. By increasing the height to width ratio, the plate is able to several times more load without separation along the top or bottom edges.

Figure 44E:
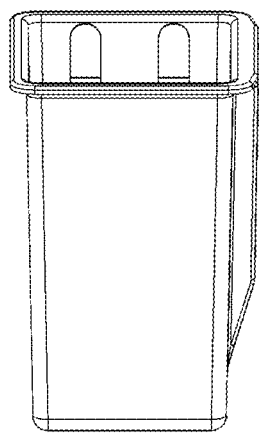
Figure 44F:
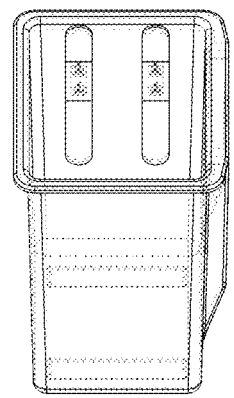
Figure 44G:
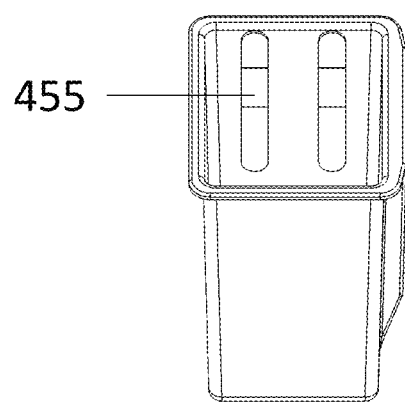
Figure 44H:
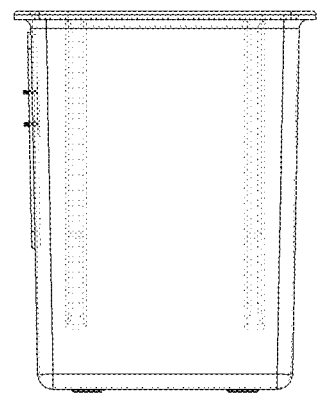
Figure 44I:
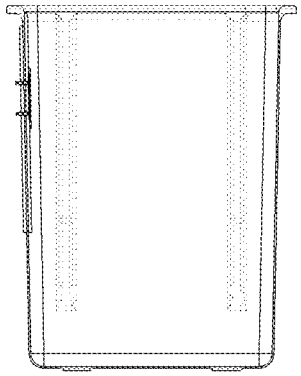
Figure 44J:
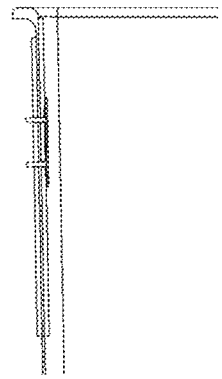
Figure 44K:

FIG. 44A is a front view of the design. FIG. 44B is a transparent front view showing the reinforcement sections and the studs. FIG. 44C is a front perspective, transparent view. FIG. 44D is a rear perspective transparent view. FIG. 44E is a rear perspective solid view. FIG. 44F is a top rear perspective transparent view. FIG. 44G is a top rear solid perspective view. FIG. 44H is a side transparent view. FIG. 44I is a cross sectional view. FIG. 44J is a side, cut-away detailed view of the design. FIG. 44K is a closer detailed of FIG. 44J.

Figure 45:
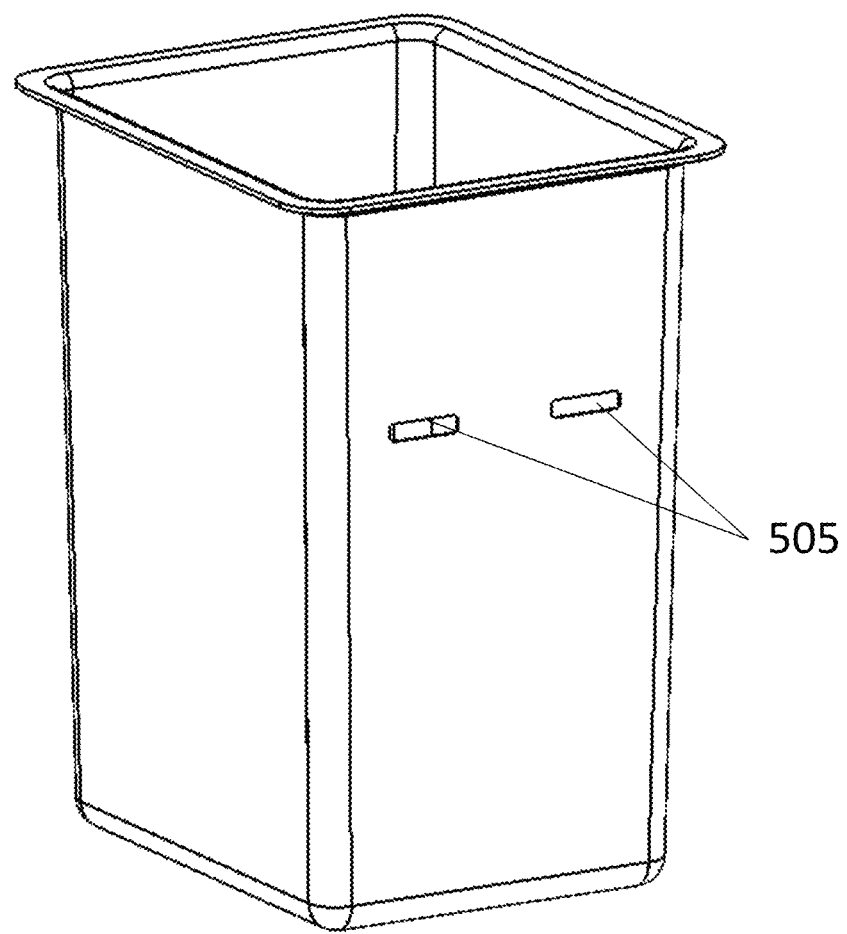
FIG. 45 is a perspective view of a platform with slots for mounting a mounting plate according to the present invention.
Figure 47A:
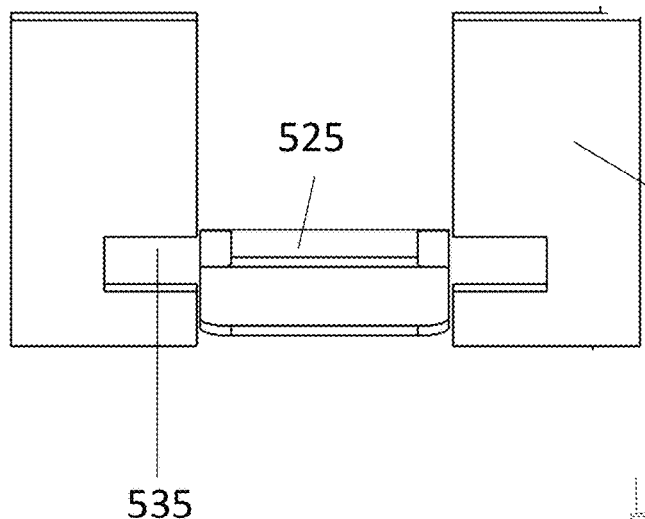
FIG. 47A is an interior view of a single-upper-section mounting plate with interior reinforcement components positioned for installment.
Figure 47B:
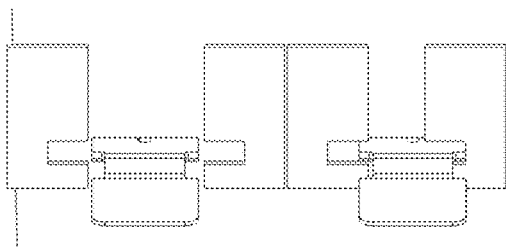
FIG. 47B is an interior view of a double-upper-section mounting plate with interior reinforcement components positioned for installment.
Figure 47C:
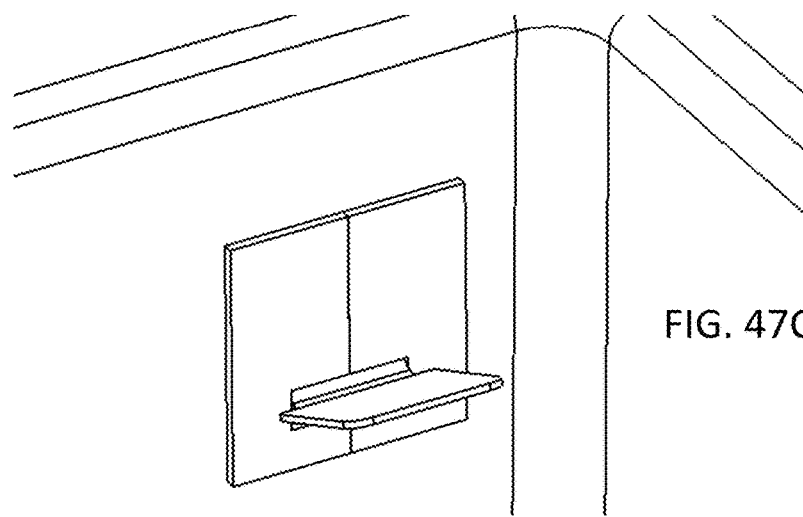
FIG. 47C is an interior view of a single-upper-section mounting plate with interior reinforcement components installed.
Figure 47D:
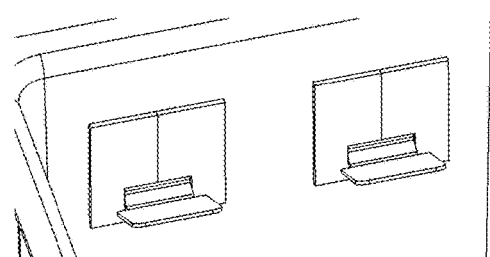
FIG. 47D is an interior view of a double-upper-section mounting plate with interior reinforcement components installed.

Yet another mounting system example embodiment is shown in FIGS. 45-48. In this system, slots 505 are created in the platform sidewall (FIG. 45). A plate 510, with at least one upper section 515 and a lower section 520 is provided (FIGS. 46A and B). The lower section has a horizontal dimension that is greater than the length of the slot, such that the platform cannot slide beyond the transition area 525. The lower section includes holes for studs 410. The plate is shown being inserted into a slot 505 in a transparent platform.

Figure 48A:
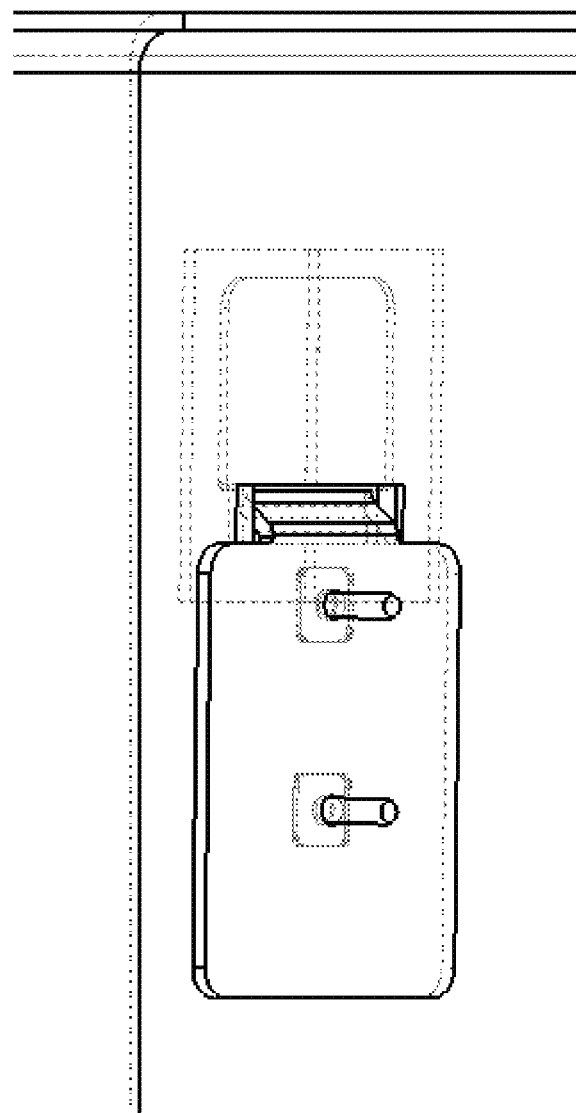
FIG. 48A is a perspective exterior view of the mounting plate of single-upper-section mounting plate installed in a transparent platform.
Figure 48B:
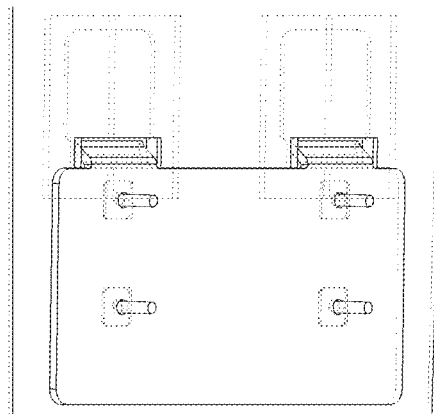
FIG. 48B is a perspective exterior view of the mounting plate of double-upper-section mounting plate installed in a transparent platform.
Figure 49A:
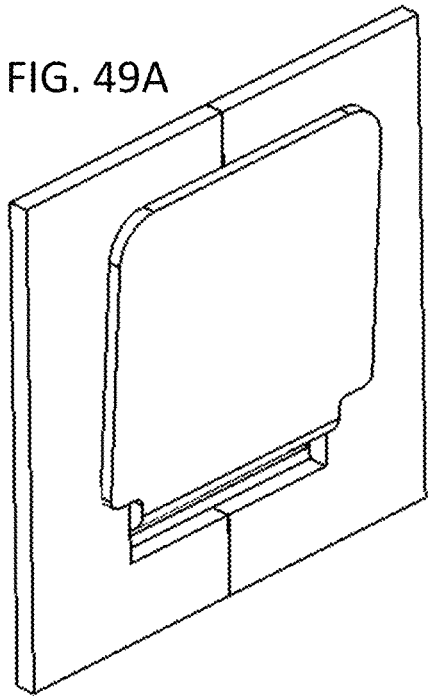
FIG. 49A is a perspective interior view of the single-upper-section mounting plate of FIGS. 45-48 installed in an opaque platform.
Figure 49B:
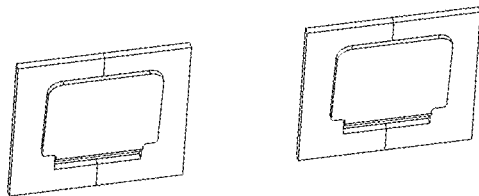
FIG. 49B is a perspective exterior view of the single-upper-section mounting plate of FIGS. 45-48 installed in an opaque platform.
Figure 49D:
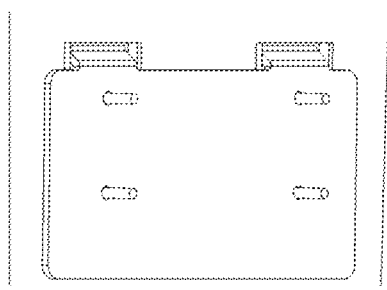
FIG. 49D is a perspective exterior view of the double-upper-section mounting plate of FIGS. 45-48 installed in an opaque platform.
Figure 49C:
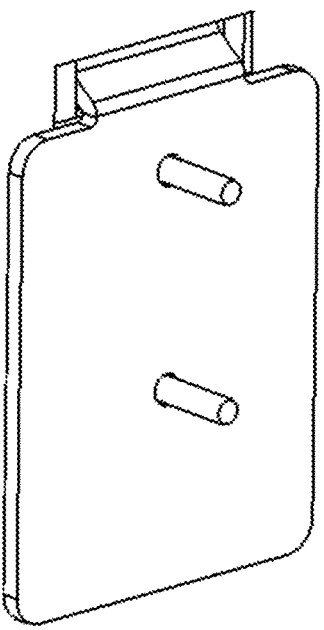
FIG. 49C is a perspective interior view of the double-upper-section mounting plate of FIGS. 45-48 installed in an opaque platform.

On the inside of the platform, two inner reinforcement components 530 are positioned between the upper section 515 and the platform. The reinforcement components are slotted 535 to receive the transition 525 (FIGS. 47A-D), so that the two reinforcement components contact one another when slid together and provide a reinforcement for the entire area of the upper section. FIGS. 48A and B show an exterior perspective view of the plate rotated into position in a transparent platform. FIGS. 49A and B show interior views, respectively, for a plate installed in an opaque platform. FIGS. 49C and D show exterior views, respectively, for a plate installed in an opaque platform.

Advantageously, these valve mounting systems eliminate the risk associated with using adhesives to mount the mounting plate to the platform. In particular, a tension force that is created at the top of the plate when the plate is loaded has the potential to separate the mounting plate from a platform wall. Mechanically interlocking the platform wall via a slot or cutout in the platform wall eliminates the risk of separation of the mounting plate from the platform wall. However, in some scenarios it is undesirable to cut slots or holes in the wall of the platform and/or for the platform to include interior components because a platform liner, used for dielectric insulation, may not fit in a platform that has extra mounting plate components taking up space inside of the platform. In these scenarios, it is desirable for the entirety of the mounting plate to remain on the outside of the platform.

Figures 51A, 51B, 51C, 51D:
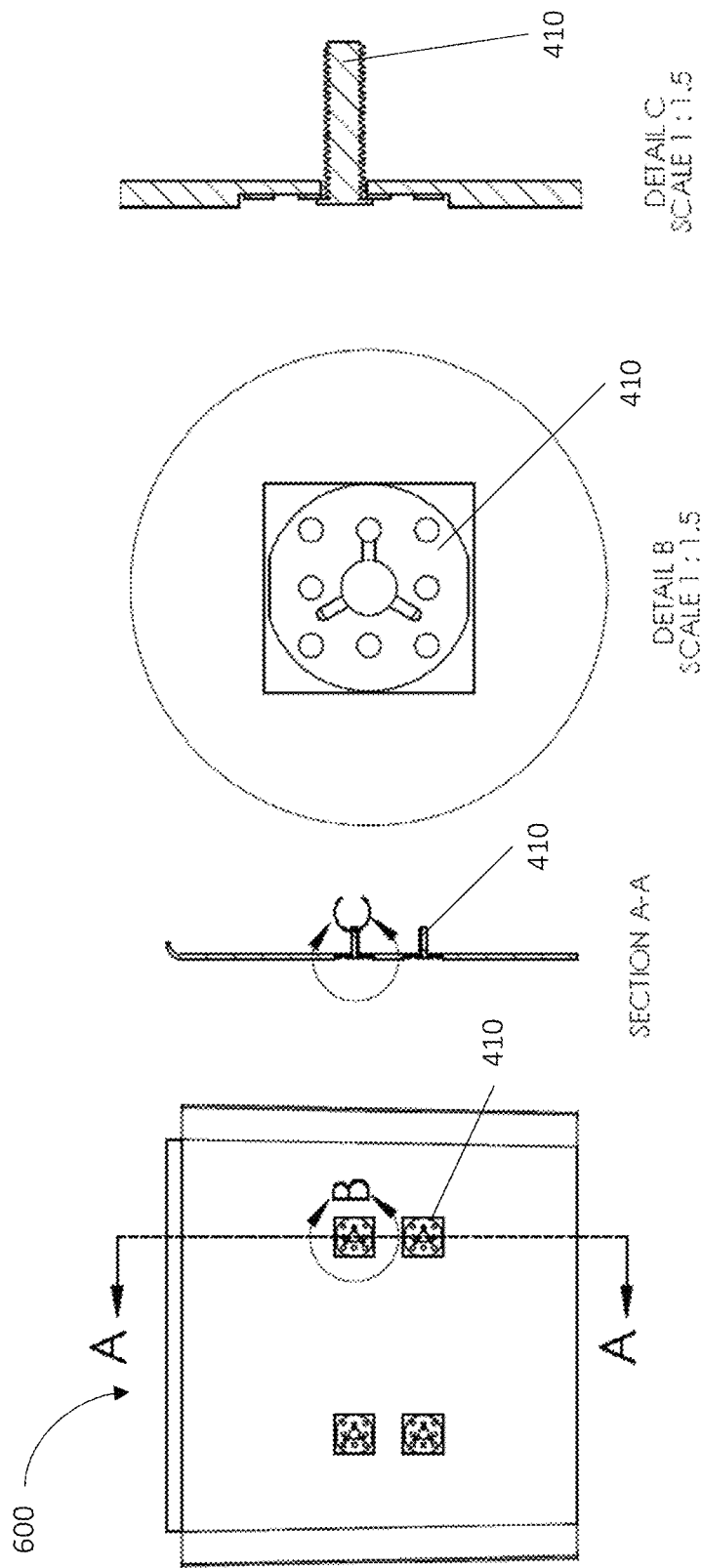
FIGS. 51A-D show detailed views of the embedded big-head studs in the mounting plate of FIGS. 50A-D.
Figure 52D:
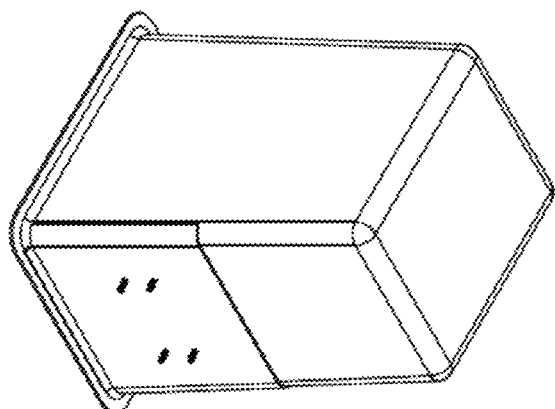
FIGS. 52A-D show the embodiment of FIGS. 50A-D mounted on a platform.
Figure 52C:
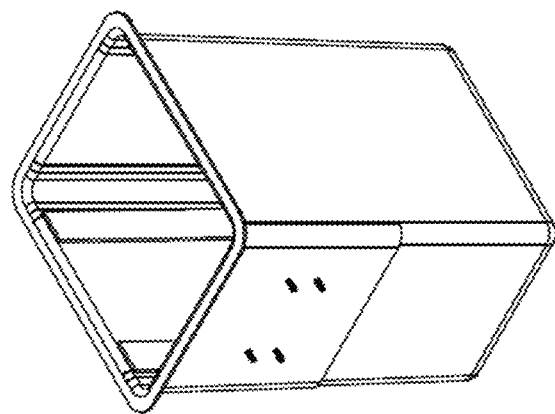
Figure 52B:
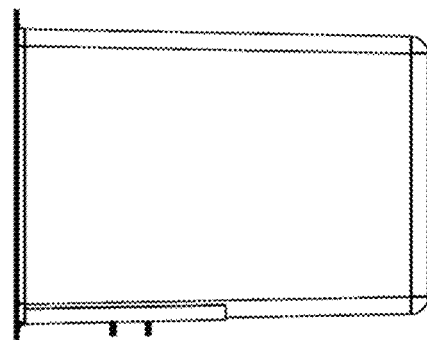
Figure 52A:
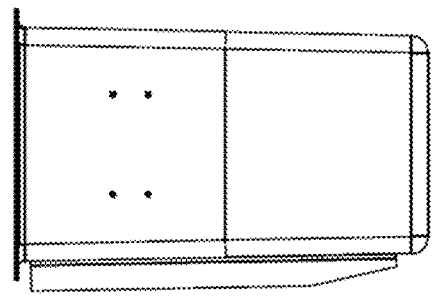

Such a mounting system according to the present invention includes a mounting plate that wraps around the sides of the platform and around the underside of the platform flange. FIGS. 50-52 show a valve mounting plate design, generally described as 600, with side tabs 605 that wrap around the sides of the platform, a top tab 610 that wraps against the underside of the platform flange, and a main support component 615 that substantially or matingly contacts and is adhered to the planar side of the platform. The tabs are non-parallel to the main support component. They are orthogonal to the main support component or at another angle and substantially or matingly contact the sidewall of the platform and/or the top flange of the sidewall. These tabs allow tension stress, which could induce peeling at the outer edges of the mounting plate, to be transformed into shear stresses. In the preferred embodiment, the top and side edges are tabbed. In an alternative embodiment, only the top edge is tabbed. Surprisingly, this mounting system configuration supports about four times the load of prior art mounting plates when a similar moment arm is used. Studs 410 (see FIG. 41) are inserted through the plate and other components affixed to the platform with them. FIGS. 51A-D show detailed views of the embedded big-head studs. FIGS. 52A-D show this embodiment mounted on a platform. FIG. 52A is a front view; FIG. 52B is a side view, FIGS. 52C&D are top and bottom perspective views, respectively The plate is made out of fiber-reinforced thermosets, unreinforced thermosets, fiber-reinforced thermoplastics, or unreinforced thermoplastics. The studs are adhesively or mechanically joined with the mounting plate. Alternatively, the studs are embedded in the mounting plate when it is manufactured.

Figure 54C:
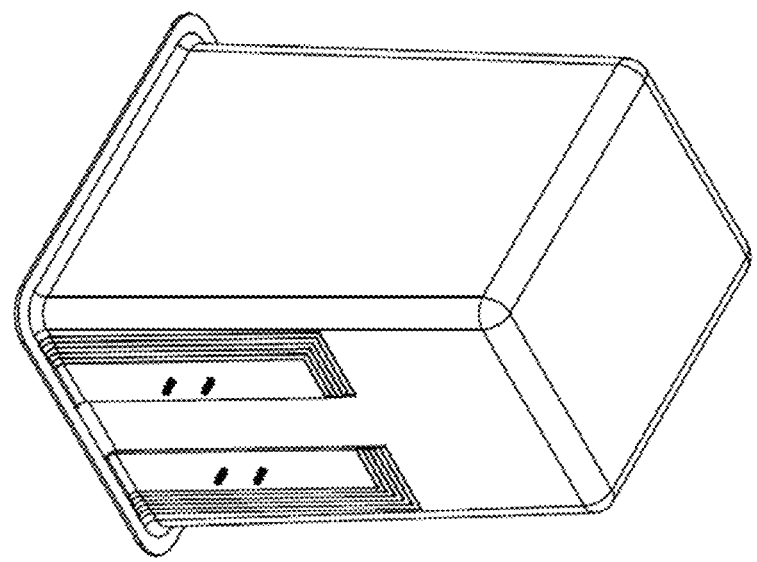
FIGS. 54A-C show the embodiment of FIGS. 53A-C mounted on a platform.
Figure 54B:
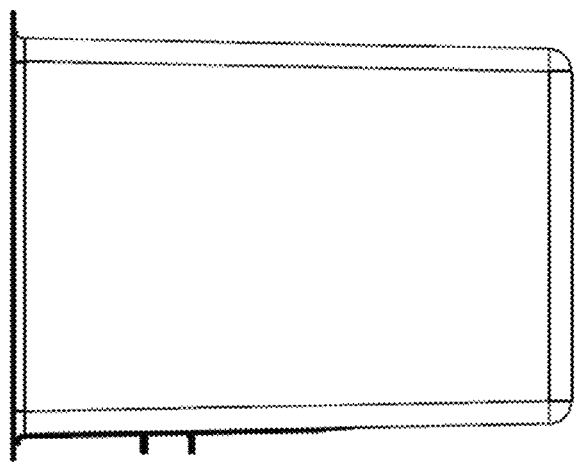
Figure 54A:
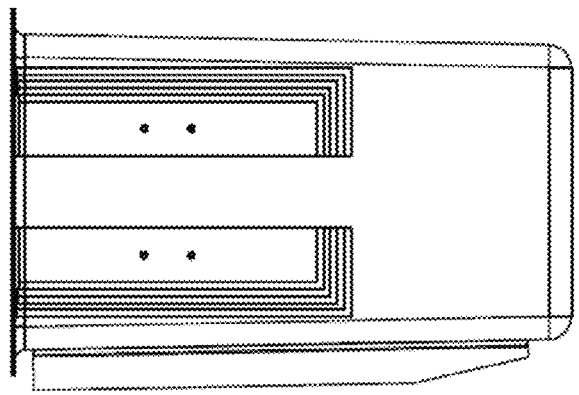

FIGS. 53A-C show another embodiment that utilizes edge modifications to change the tension stress at the edges into shear stress. In this embodiment the vertical sides are tapered or stepped 620 in order to transition the load to the platform wall more gradually and reduce stress concentrations. This design is lighter than the previous design due to its smaller size and reduced bonding area. This design uses the same materials and joining techniques as previously described. FIGS. 54A-C show the embodiment of FIGS. 53A-C mounted on a platform.

The present invention is thus directed to a mounting plate for an elevating platform. The mounting plate includes an interior reinforcement piece, an exterior reinforcement piece, and at least one fastener. The interior and exterior reinforcement pieces are vertically elongated with rounded corners, and positioned on the interior and exterior of the platform sidewall, respectively. The at least one fastener is inserted through the interior reinforcement piece on the inside of the platform, through the sidewall, and through the exterior reinforcement piece on the outside of the platform. The height-to-width ratio of the reinforcement pieces is between about 3 and about 6. The fastener is a mounting stud embedded in the interior reinforcement piece. In one embodiment, the interior reinforcement piece extends above the exterior reinforcement piece. In another embodiment, the exterior reinforcement piece is wider at the bottom than the top; and the interior reinforcement piece is wider at the top than the bottom. The bottom of the exterior reinforcement piece is between about 50% and about 100% wider than the top and the top of the interior reinforcement piece is between about 50% and about 100% wider than the bottom. The plate preferably includes a spacer positioned between the exterior reinforcement piece and the sidewall and a dielectric cover positioned over the interior reinforcement piece and a head of the at least one fastener; the spacer is silicone and the dielectric cover is a non-conductive thermoplastic. The mounting plate is made from fiber-reinforced thermosets, unreinforced thermosets, fiber-reinforced thermoplastics, and/or unreinforced thermoplastics.

Another mounting plate according to the present invention includes a wide planar section, narrow planar section and a transition. The wide and narrow planar sections are in parallel planes and not coplanar and the connects the wide and narrow planar sections. The narrow planar section is inserted through a slot in the sidewall. The wide planar section has a horizontal dimension that is greater than the length of the slot, such that the plate cannot slide through the slot beyond the transition area. The wide and narrow planar sections are parallel with and juxtaposed to the sidewall, providing a top planar section and a bottom planar section. At least one of the planar sections including at least one hole and at least one fastener, preferably a mounting stud, inserted through the hole to the platform exterior. In one embodiment, the mounting plate includes two inner reinforcement components positioned between the top planar section and the platform. The reinforcement components are slotted to receive the transition, such that the two reinforcement components contact one another when in position and seal the slot. The mounting plate is made from fiber-reinforced thermosets, unreinforced thermosets, fiber-reinforced thermoplastics, and/or unreinforced thermoplastics.

The present invention is also directed to a support for mounting components to a container. The support has a front, a back, a bottom edge, at least two side edges, a main support component, a top edge with a tab, and means for attaching components to the main support component, preferably mounting studs embedded in the main support component. The main support component is substantially parallel to the main planar surface of a first wall of the container and configured to substantially contact the main planar surface of the first wall of the container. The tab on the top edge is configured to substantially contact the projection of the container, thereby transforming the tension stress along the top edge of the mounting plate into shear stress. Preferably, at least one side edge and/or the bottom edge is tapered or stepped. In one embodiment, the support includes a first side tab along a first side edge of the support; the first side tab is configured to substantially contact the exterior of a second wall of the container that is non-coplanar with the first wall, thereby transforming the tension stress to shear stress along the at least one side edge of the support. Another embodiment includes a second side tab along a second side edge of the support, wherein the second side tab is configured to substantially contact the exterior of a third wall of the container that is non-coplanar with the first and/or second walls; thereby transforming the tension stress to shear stress along the second side edge of the support. In one embodiment, the support is a mounting plate, the container is an elevating platform with sidewalls, a top flange and a bottom, and the projection is the top flange. The support is preferably made from fiber-reinforced thermosets, unreinforced thermosets, fiber-reinforced thermoplastics, and/or unreinforced thermoplastics.

Certain modifications and improvements will occur to those skilled in the art upon a reading of the foregoing description. All modifications and improvements have been deleted herein for the sake of conciseness and readability but are properly within the scope of the following claims.

The invention claimed is:

1. A mounting rib on an elevating platform with at least one sidewall cutout comprising:
   a rib component that includes at least a stem connected to a first arm and a second arm, wherein each arm includes a sidewall contact portion;
   wherein the first arm and the second arm extend in opposite and horizontal directions relative to a bottom of the elevating platform;
   wherein the sidewall contact portion of the first arm is positioned inside of the elevating platform and contacts an inner surface of the platform sidewall;
   wherein the sidewall contact portion of the second arm is positioned outside of the elevating platform and contacts an outer surface of the platform sidewall;
   wherein the sidewall contact portion of the first arm and the sidewall contact portion of the second arm create a mechanical interlock holding the rib in place;
   wherein the stem extends through the at least one sidewall cutout in the platform sidewall and joins with the second arm on the outside of the platform sidewall;
   wherein the second arm is adjacent to a part of the stem that extends through the at least one sidewall cutout, and wherein the second arm extends vertically beyond the at least one sidewall cutout;
   wherein the rib component extends away from the platform sidewall such that the rib component provides a removably mountable boom attachment point; and
   wherein the rib component supports the elevating platform by bearing a load from the elevating platform.

2. The rib of claim 1, wherein the stem has a notch at the top and/or bottom, such that the stem and the first arm extend vertically beyond the top and/or bottom of the at least one sidewall cutout.

3. The rib of claim 1, wherein the first arm of the rib is attached to the stem to form a T-shaped component.

4. The rib of claim 1, wherein the first arm of the rib is attached to the stem to form an L-shaped component of the rib and the second arm is attached to the stem to form a second L-shaped component of the rib.

5. The rib of claim 1, wherein the sidewall contact portions and the sidewall cutout are operable to engage and secure the rib to the platform sidewall.

6. The rib of claim 5, wherein the first arm and the second arm are different integral parts of the rib component, wherein the rib component is a single component.

7. The rib of claim 5, wherein the stem comprises first and second components extending from the first arm and the second arm respectively, the first and second components are joined to each other to, wherein the first arm is positioned completely inside of the platform sidewall and the second arm is positioned completely outside of the platform sidewall, and wherein the rib component and the platform sidewall are permanently joined via chemical bonding, physical bonding, and/or mechanical attachment.

8. The rib of claim 5, wherein the rib and platform sidewall cutout are configured such that when the rib is positioned in the elevating platform, the rib completely covers the cutout in the platform sidewall, thereby closing it.

9. The rib of claim 8, wherein the rib seals the cutout; and wherein sealing the cutout completely seals the sidewall such that there are no drain holes or access openings on the sidewall.

10. The rib of claim 1, wherein the rib is formed of reinforced thermosets, unreinforced thermosets, reinforced thermoplastics, and/or unreinforced thermoplastics.

11. The rib of claim 10, wherein the stem and the first arm extend beyond the cutout in the vertical direction at the top and/or bottom.

12. The rib of claim 1, wherein the stem includes a plurality of holes on a surface extending away from the elevating platform.

13. The rib of claim 1, wherein the second arm extends vertically beyond the stem.

* * * * *